United States Patent [19]
Beck et al.

[11] Patent Number: 5,586,322
[45] Date of Patent: Dec. 17, 1996

[54] WORKGROUP ORGANIZED NETWORK MANAGER WITH WORKSTATION COMPARISON SYSTEM

[76] Inventors: Robert E. Beck, 1105 E. Mayfair Rd., Arlington Heights, Ill. 60004; Ronald L. Schoenberger, 37 Oxford, Clarendon Hills, Ill. 60514

[21] Appl. No.: 459,528

[22] Filed: Jun. 2, 1995

Related U.S. Application Data

[63] Continuation of Ser. No. 986,116, Dec. 4, 1992, abandoned, which is a continuation-in-part of Ser. No. 898,191, Jun. 11, 1992, Pat. No. 5,440,739.

[51] Int. Cl.⁶ ............................ C06F 13/00; C06F 17/00
[52] U.S. Cl. ................ 395/616; 395/200.03; 395/200.19
[58] Field of Search .................................... 395/650, 600, 395/200.19, 200.03; 364/DIG. 1

[56] References Cited

U.S. PATENT DOCUMENTS

| | | | |
|---|---|---|---|
| 4,905,162 | 2/1990 | Hartzband et al. | 364/513 |
| 4,999,766 | 3/1991 | Peters et al. | 364/200 |
| 5,019,963 | 5/1991 | Alderson et al. | 364/200 |
| 5,228,137 | 7/1993 | Kleinerman et al. | 395/500 |
| 5,276,879 | 1/1994 | Barry et al. | 395/650 |
| 5,278,946 | 1/1994 | Shimada et al. | 395/62 |
| 5,440,739 | 8/1995 | Beck et al. | 395/650 |
| 5,450,606 | 9/1995 | Shiga et al. | 375/800 |
| 5,473,772 | 12/1995 | Halliwell et al. | 395/650 |

OTHER PUBLICATIONS

"Info World", Dec. 30, 1991/Jan. 6, 1992, vol. 13, Issue 52/vol. 14, Issue 1, Networking, article by Mark Brownstein: *About Time Update Ships*.

UNIX On–line Documentation of IBM RS6000 computer *rdist command*, Mar. 9, 1992, 3 pp., copyright 1990 IBM Corporation.

UNIX On–line Documentation of IBM RS6000 computer *distfile File*, Mar. 9, 1992, 4 pp., copyright 1990 IBM Corporation.

*Primary Examiner*—Thomas G. Black
*Assistant Examiner*—Jean R. Homere
*Attorney, Agent, or Firm*—Fitch, Even, Tabin & Flannery

[57] ABSTRACT

A workgroup organized network manager for controlling the operation of individual workstations within a computer network. The workgroup organized network manager organizes workstations into workgroups and controls the distribution of information to each of the workstations within a defined workgroup. The tasks each workstation performs are defined by a specification consisting of programs. A library of programs is maintained on a host workstation designated as a controlling workstation within the workgroup. The host workstation keeps track of activity occurring on the individual workstations within the workgroup. A file maintenance and inventory system compares the attributes of files, directories, and software located on the workstation to check for discrepancies between files, directories, or software intended to be identical and for locating missing or extra files, directories, and software.

15 Claims, 27 Drawing Sheets

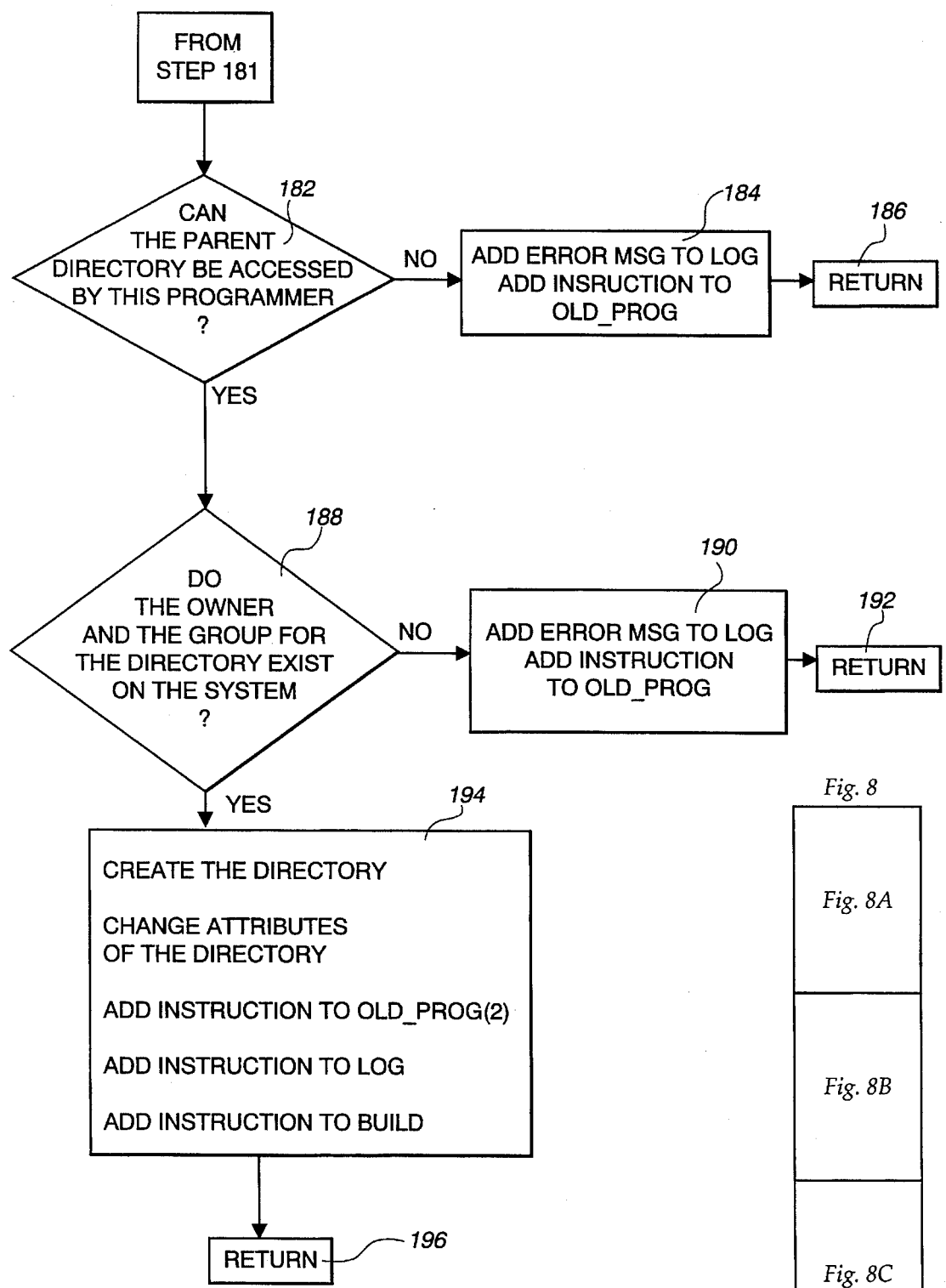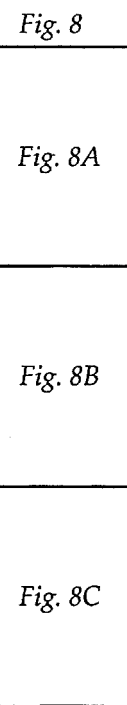
Fig. 8C

WORKGROUP ORGANIZED NETWORK MANAGER WITH WORKSTATION COMPARISON SYSTEM

CROSS-REFERENCE TO RELATED APPLICATION

This application is a continuation of application Ser. No. 07/986,116 filed Dec. 4, 1992, now abandoned, which is a continuation-in-part of U.S. patent application Ser. No. 07/898,191, filed on Jun. 11, 1992, now U.S. Pat. No. 5,440,739.

FIELD OF THE INVENTION

The present invention relates to computer software for controlling the operation of individual workstations within a computer network. In particular, the invention relates to a workgroup organized network manager which organizes people into groups and computers into workgroups. As used within this invention, a workgroup represents an organization of people and a group of computers connected together by a network. The host computer controls the workgroup. A user at the host computer creates specifications for controlling the operation of the computers in the workgroup. The present invention acts as an agent for the user and implements the specifications on the clients. The invention implements the specifications either periodically or on command. The workgroup organization limits how individuals may use the invention to manipulate the computers in the workgroup. The invention also limits which computers are controlled.

BACKGROUND OF THE INVENTION

Networks consist of a number of interconnected computers which can include a centralized computers connected to remote terminals, a number of individual mini-computers or microcomputers linked to each other, or a combination thereof. In each instance, however, the function of the network is to provide a means for communicating information throughout the network. The minicomputer or microcomputer based centralized file server or a centralized computer typically includes a large central database of information which is accessed by the users at either remote terminals or computer stations. Economies of scale are achieved in these types of systems by storing the massive amounts of information contained in the central database in one central location.

Computer networks consisting of linked mini-computers or personal computers are not necessarily dedicated to accessing information from a large central database of information. These networks, called distributed systems, instead can be directed to the sharing of information created and maintained at each of the mini-computers or workstations within the network. While the distributed system type of network does not lend itself to the control of large amounts of information, as does the central database type of network, it is usually more flexible in the type and variety of tasks that it can perform. Each individual workstation can communicate with other workstations on the network and files can be shared therebetween. This flexibility, however, also means it is more difficult to control the computers so that they will operate in a similar fashion and produce similar results.

A communication software package or a device driver controls transmission of data or information from one workstation to another over communication lines. In addition to the communication software package, other software packages are available which operate to provide additional features not present in the standard communication software packages.

For instance, a time and schedule management software package allows users to view, track, and schedule time-related activities. Users can manage a personal schedule and other users' schedules as well. Permissions can be granted to allow a user to view or modify the scheduler of another user. In addition, permissions can be tailored to suit each user on a network. Users can be defined as parts of a group, with groupwide clearances assigned to all members of a particular group. In addition, defaults can be set for each group or new user, and when a user is added, the setup for that user will not require modifications. While this type of software package can organize workstations into groups having group wide clearances assigned to all members of a group, the tasks performed by the workstation is limited to the performance of calendar or scheduling type tasks and cannot be used for any other purpose.

Another type of software package for use on a network maintains identical copies of files on multiple computers. The files to be copied, the destination of those files, and the operations performed for updating files are all specified at a source workstation. Whenever files are updated, the file is updated at the source workstation and then sent from the source workstation to the various destination workstations. While this type of software makes updating files a simpler task than previously available, this type of software package cannot control the distribution of information to predefined workgroups nor is there any organizational structure to limit access to particular users. In addition, the destination workstation cannot trigger the source computer to update destination workstation files and therefore cannot be guaranteed the latest versions of the files when they are needed. These packages also do not allow the execution of non-file related commands over the network and do not provide for delayed execution of processes if stations are not available at the time of an update. The stations in the workgroups cannot, therefore, be controlled as a group.

SUMMARY OF THE INVENTION

The present invention is a system of computer programs to organize networked computer workstations into workgroups that are controlled by specifications. The workgroups consist of groups of computers on the network and the people who use the invention to manage them. The computers on the network can include but are not limited to mainframes, minicomputers, servers, and personal computers. For ease of discussion, these machines are referred to as workstations hereinafter. The specifications are the commands that are executed to accomplish the desired results.

Typically, workgroups consist of two or more workstations, in which one workstation is designated to be a host workstation and the remaining workstations are designated to be client workstations. A workgroup is not limited to any maximum number of workstations and a workstation may be part of many workgroups. Workgroups also consist of groups of people, with varying responsibilities, that operate the workgroup. The responsibilities may be distributed between several different people or may be allocated to one person.

The host workstation provides the means for setting up the workgroup and for defining the responsibilities of the people who operate the workgroup. The specifications are also developed on the host and are implemented by installing them in the host workgroup library. As part of the workgroup setup, the workstations which may become clients are defined and then may be addressed by the specifications. A client station administrator defines workstations to be a client by entering the host station name into a client copy of the invention which resides in the client workstation. The client station administrator thus prevents the invention from making changes on the client, if specified. Either a host station or a client station can initiate the execution of the specification on a client since the client and host station are linked together through the software.

The people who operate the invention are designated as station administrators (both host and client), workgroup leaders, workgroup programmers and client users. The administrators install and maintain the invention, define rules of operation and set up the workgroups. The workgroup leaders designate the workgroup programmers and define the limits they operate under. The workgroup programmers write the specifications which actually control the workstations. The client users (engineers, accountants, draftspersons, etc. who actually use the stations) use the files and environment provided through the invention.

Specifications define how a programmer manages client workstations. The invention implements the specifications automatically on all of the client workstations having defined specifications. The effort required to manage a workgroup is reduced to planning and writing specifications instead of repeating similar tedious defining actions on each client workstation. In addition, the invention provides log files showing the history of each workgroup and audit trails showing all implemented specification statements.

Each individual client workstation within a workgroup operates according to a specification defined by a program or programs on the host workstation. The specification defines the parameters within which the workstations and workgroups operate. Because workstations are controlled by the specification, individual workstations can be automatically configured for individual tasks.

Specifications are programs containing specification statements that have been entered into a workgroup library. Programs may be written separately or may be modified at a later time. The client only executes specification statements it has not executed before. The statements are active as long as they remain in the library.

Specification statements typically are equivalent to several commands in the native operating system. The invention checks to see that all of the native commands can be completed successfully before executing the specification statement. This prevents the clients from being left in an intermediate state because some of the native commands did not succeed.

Some specifications may pend. Pending specifications are specifications that will not execute until some condition or conditions are satisfied on the client. When the conditions are satisfied, then the specification statements are executed.

Active specifications (those entered into the workgroup library) may be referenced at any time. If a new workstation is added to the workgroup, the specification can be referenced immediately and the workstation set to the same configuration as the other stations in the workgroup. If a client station is disconnected when the host requests that the clients implement the specification, then the station will not be in the correct configuration. Since the invention on the client station recognizes which computer is the host within its workgroup (and thus the location of the workgroup library), the invention on the client can implement the specification when the client rejoins the network.

Before a client station implements the workgroup's specification contained in the library, the invention on the client must retrieve a copy of the workgroup library. The invention uses a single computer account, that exists on all stations, for sending files and other computer network communication. A workgroup's specification can have several programmers. When the invention executes each specification command on a client, the command is executed as if by the command's programmer. It is similar to the programmer logging on to the client and then executing the command. The invention does not use the programmer's computer account or password, thereby enabling the programmer, on the host computer, to control and modify the clients in his workgroup simply by placing specification commands in the workgroup library. The invention tightly controls access to workgroup libraries. Only clients who are members of the workgroup can access the workgroup's library and only clients can access it through the invention.

In addition, the present invention includes a workstation comparison system for comparing the files and directories that are located on the individual workstations to determine whether any discrepancies exist between files or directories that are intended to be the same, to determine if extra files exist or if files are missing from a workstation. For instance, if all workstations within a workgroup are loaded with an identical file or directory, the present invention can determine if the file or directory has been properly loaded on each workstation. In this way, errors are located by comparing the files or directories which are common on some or all of the workstations.

The present invention collects the attributes of the files or directories from workstations of interest at the host workstation. The attributes of a file include the type of file, mode or protection of the file, number of links, owner and group that the file belongs to, the date, the size, and checksum. Once these attributes are collected by host workstation, the attributes associated with the workstations of interest are compared. Any difference is noted and flagged as a potential source of a problem. While the workstation comparison system is currently written for a UNIX system for use with the Workgroup Organized Network Manager, the workstation comparison system can exist by itself and can be written for other computer systems and in other languages for analyzing the files or directories on other computer workstations. Once differences between files or directories are located, extra files are located, or files are found to be missing, the present invention includes the means to change the incorrectly programmed workstation to one which is programmed correctly.

BRIEF DESCRIPTION OF THE DRAWINGS

FIGS. 8A–8C is a flow diagram of a directory function module.

DETAILED DESCRIPTION OF THE PREFERRED EMBODIMENTS

Figure 1:
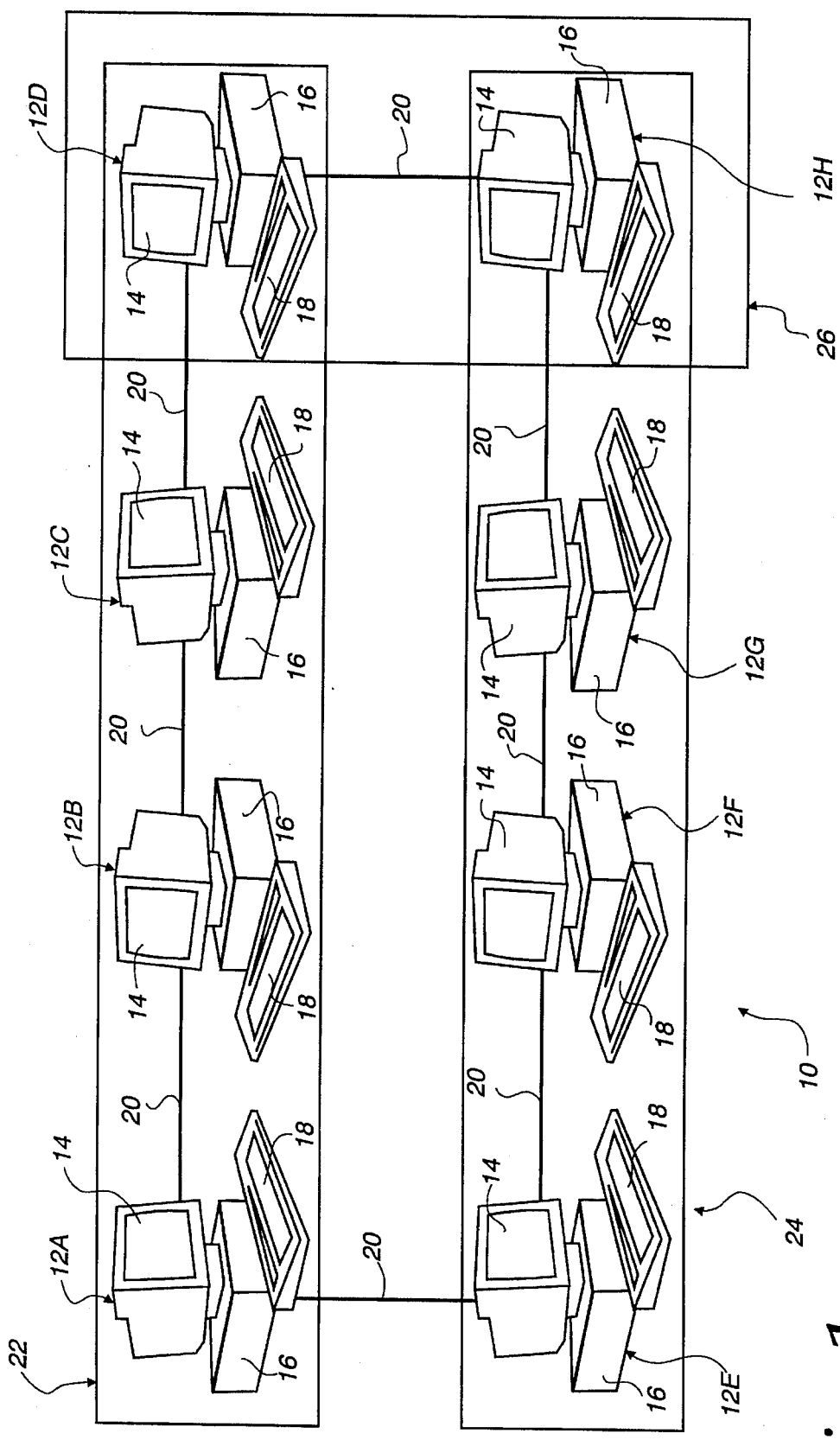
FIG. 1 is a schematic diagram of a networked computer system organized into workgroups.

FIG. 1 illustrates a networked computer system 10 containing a plurality of workstations 12. Each workstation 12 is further identified by a letter, A through H, to aid in the later discussion. Each workstation comprises a video display terminal 14, a computer 16 and a keyboard 18. Each workstation 12 communicates to other workstations 12 via the network as is understood by those skilled in the art.

The present invention is a system of computer programs that organizes and manages workstations 12 within the network 10. While the present invention is written in the C language and UNIX scripting languages and is directed to be used on a UNIX operating system, the present invention is not limited to UNIX and other embodiments will become apparent to those skilled in the art. The present invention controls as many workstations as are contained within the network and is not limited to the number illustrated here.

The workstations 12 of the network 10 are organized into workgroups consisting of workstations selected to be within the organized workgroup by an administrator. For instance, as illustrated in FIG. 1, the network 10 is divided into a first workgroup 22 consisting of workstations 12A through 12D, a second workgroup 24 consisting of workstations 12E through 12H, and a third workgroup 26 consisting of workstations 12D and 12H.

Workgroups correspond most directly to the organization of workgroups in a business, manufacturing, or design environment or other organization such as sections, departments, and projects. For instance, in a manufacturing facility, the workgroup 22 might consist of the electrical engineering department, the workgroup 24 might consist of the mechanical engineering department, and the workgroup 26 might consist of one electrical engineer and one mechanical engineer chosen to work on a specific project.

The workgroups and the individual workstations comprising the workgroups are selected by the administrator according to the individual requirements of each workgroup. As each workgroup is dedicated to the production of a certain type of work product in the case of an engineering design firm, the invention manages each workstation within the workgroup according to specifications that can be defined within the invention. Of course, the present invention has many other applications, for instance, delivering software to various departments within a business organization, analyzing computers in a network, and determining disk space on the workstations.

Before the present invention is operational, the system of programs comprising the invention must be installed on every workstation in the network 10 and certain variables must be defined to give structure to the network according to the individual requirements of the workgroups and workstations.

Once the invention is installed, workgroups can be defined. The definition of a workgroup includes designating one of the workstations 12 to be a workgroup host, designating a number of individual workstations to be workgroup clients, and designating a group of people having defined responsibilities that use the invention to manage the workstations. This and other information is put into a number of files on the workgroup host.

Figure 2:
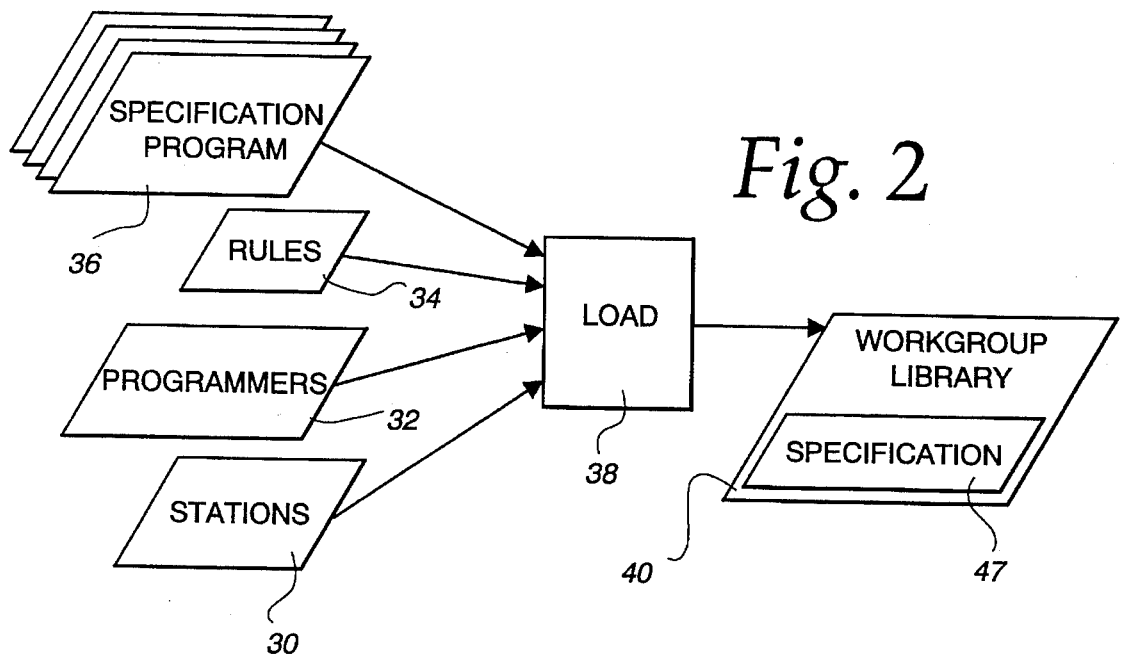
FIG. 2 is a block diagram illustrating the creation of a library file by a load program with a plurality of files as input.

FIG. 2 illustrates a block diagram of certain files on the workgroup host which are created to run the present invention. The files which are created are the stations file 30, the programmers file 32, the rules file 34 and the specification program file 36. These files are input to a load program 38, which checks and adds the specification program file to the workgroup library file 40. Each workgroup has one each of the stations file 30, the programmers file 32, and the rules file 34, but can have many specification program files 36. The stations file 30 contains a list of labels that specify combinations of workstations used by the workgroup. For instance, each label for workgroup 22 as shown in FIG. 1, would be limited to stations 12A, 12B, 12C, and 12D. Each label is saved in the stations file 30. Once the stations have been defined and stored in the stations file 30, the programmers given authority to create the specification programs are defined.

Programmers are individuals who are given the authority to act as a programmer within a defined workgroup. Once each of the programmers has been chosen, each programmer is defined to have the capability of performing certain specification commands on assigned workstations. This information is saved in programmers file 32. The specification commands the programmer may be allowed to use include a copy command, a directory command, a remove file command, a remove all command, a refresh command, an execute command and a remove directory command. Each of these commands typically is equivalent to several commands in the UNIX operating system. The details of these commands will be described later. In addition to the station file and the programmer file, the rules file needs to be defined.

The rules file 34 is established by the workgroup leader and the system administrator. The rules file 34 contains rules used by the load program 38 to check specification programs written by the programmer before adding the specification programs to the workgroup library 40. The rules provided with the invention maintain various levels of security in addition to that provided by UNIX. A mechanism is also provided to allow the host administrator to add to or modify the rules to meet security or other requirements.

A specification program file 36 is a file which is created by a programmer previously defined in the programmers file 32. The workgroup programmers develop specification programs using the specification programming language provided by the present invention. In addition, the invention contains a create_prgm 46, shown in FIG. 3, that can automatically generate specification commands for files in a list, thereby relieving the programmer of much effort when creating new programs. The create_prgm 46 provides a choice of refresh or copy instructions to move files. The generate program will be discussed later.

The specification program file 36 contains individual specification commands written by the programmer to manage the client computers in a workgroup. The load program 38 checks these commands according to the rules file 34. When the programmer loads a specification program, the program is written into the workgroup library 40. Loading the specification program makes the commands within the program active. The present invention implements the specifications 47 contained in the workgroup library 40 on the client computers or stations. Once loaded, the specification program is active and may be referenced by the invention on any workgroup client as long as it remains in the workgroup library 40. How clients implement the specification in the workgroup library 40, will be discussed later. The present invention includes eight specification commands with various options. These instructions are shown in the following Table 1. The instructions are copy, refresh, direct, rm_file, rm_dir, rm_dir, rm_all, execute and #.

TABLE 1

```
copy [m] -h host_file -c client_file -o owner -g group
  -p protection -s labels -d date
refresh [-m] -h host_file -c client_file -o owner -g group
  -p protection -s labels -d date
dir -c client_directory -o owner -g group -p protection
  -s labels -d date
execute -h host_file -l shell -s labels -d date
rm_file -c client_file -s labels -d date
rm_dir -c client_directory -s labels -d date
rm_all -c client_directory -s labels -d date
# comment
```

As seen in TABLE 1, each of the commands begins with the name of the command and is followed by a list of parameters assigned by a workgroup programmer. The copy command starts with the word "copy" and is followed by -h host_file, which specifies a certain file contained on the host, -c client_file, specifying the name given to the file on the client, -o, the owner of the file, -g, the group in which the file will be contained, -p, the protection of the file, -s, the labels, and -d, the date that the command was created. The copy command copies a file from the host to the clients. In addition, the copy command can also change the mode, the owner, and the group of the file, if the programmer has the privileges required by the client computer. Copy also has a maintain option -m, which means that if the file changes on the host, the new file will be transmitted to the clients. This feature will be described in more detail later. The copy command is similar to the sequence of UNIX instructions cp, chmod, chown, and chgrp. The copy command is not executed until all UNIX instructions necessary to implement the copy command can all be performed. This prevents the copy command from being partially executed on a client. This is a trait of all specification commands.

As seen in Table 1, the refresh command has the parameters previously cited for the copy command. The refresh command copies a file from the host to the clients. The refresh command is different from the copy command in that the present invention will not execute the refresh command unless a copy of the file already exists on the client. Such a feature is useful when the programmer does not know which computers or stations have a copy of the file. For instance, the programmer can create a refresh command that updates shell scripts or design references files on all computers in a workgroup. Only those computers with the file will be updated. This is different than the copy command, which will only execute if the file's parent directory exists on the client.

The directory command creates directories on the client. The mode, owner and group are specified. The directory command is not executed unless the directory's parent exists on the client. If the parent directory doesn't exist, the present invention waits for it to appear and then executes the directory command.

The execute command runs UNIX programs on the clients. The execute command has several features that simplify running UNIX programs on many stations on the network. Output from the executed UNIX program can be put into a host log of the present invention. Messages can be mailed to the owner of the individual programs. The present invention places the standard output and standard error in a temporary file on the client.

The rm_file command removes a file from the individual client and it is quite similar to the rm command in UNIX. If the file is not present on the client or if the command would fail, the present invention ignores the command and does not attempt to execute it later.

The rm_dir command removes the directory from the client and is similar to the rmdir command in UNIX. Like UNIX, the directory must be empty for the command to succeed. If the directory is not present on the client or if the command would fail, the present invention ignores the command and does not attempt to execute it later.

The rm_all command removes a directory and its files and subdirectories from the clients. The rm_all command is different from the UNIX "rm-r" command in that it first checks to see if all files and directories can be removed before beginning. The rm_all command works only if it can successfully remove all the directories and files as instructed. If the command cannot succeed on the client, the present invention ignores the command and does not attempt to execute it later.

Finally, the last command is the # command which allows one line of comment to be inserted into the program.

The meaning of the available options for each of the prior instructions is listed in the following Table 2 and is shown as previously discussed.

TABLE 2

| | |
|---|---|
| -m | This maintain option means that if host_file changes on the host, the command will re-execute on the client. |
| -h | host_file<br>Use host_file as the source host file for the command |
| -c | client_directory or client_file<br>Use client_file (client_directory) as the target client file (directory) for the command. |
| -o | owner<br>Make owner the owner of the target directory or file (client_directory or client_file) on the client. |
| -g | group<br>Make the target directory or file (client_directory or client_file) belong to the UNIX group on the client. |

TABLE 2-continued

-p  protection
    Set the protection of the target directory or file
    (client_directory or client_file) to protection where
    protection is of the form "rwxrwxrwx". These three sets of
    letters represent read, write,and execute
    permissions for the UNIX owner, UNIX group, and
    others.
-s  labels
    Labels specify combinations of stations used by the
    workgroup. The present invention executes the
    command on the stations represented by labels.
    Labels can be several labels separated by commas.
-d  date
    The date and time the command line was written or
    last modified. Date uses the following format:
    mm/dd/yy-hh:mm:ss
-1  shell
    Use shell when executing host_file on the client. Shell
    can be any common UNIX shell - sh, ksh, csh.

Once the stations file 30, the programmers file 32, the rules file 34 and the program file 36 have been completed, the programmer uses the load program 38 to place the specification program and the stations file 30 into the workgroup library 40. The workgroup library 40 contains individual instructions defined by the programs, which include not only those instructions which have been defined by the programmers, but also include additional information generated by the load program 38.

To illustrate the operation of the load program 38, an example using the copy instruction will be discussed. The copy instruction used as an example is shown in Table 3.

TABLE 3 copy -m -h /usr/ron/build -c /usr2/ron/build2 -o
ron -g proj_100 -s elect -d 05/28/92-17:10:09

As seen there, -m is included, which means that if the host file changes, the changed file will be automatically copied to the client station. The host file -h, which is identified here as /usr/ron/build, is the source host file for the command. The client file -c, which is identified here as -c/usr2/ron/build2, is the target of the copy command. The owner -o is identified here as ron. The group -g is identified as proj_100, which makes the target file belong to the proj_100 UNIX group on the client. The label -s, which is identified here as elect, represents stations in the electrical group previously shown as workgroup 22 in FIG. 1. Finally, -d indicates the date and time that the command was written or last modified. The load program 38 first checks the syntax of the copy command and then identifies the protection, owner, and group for the file/usr/ron/build and the directory/usr/ron. It also gets the date when the build file was last modified. This information comes from the operating system and is used to perform certain checks. The present invention will not load the command into the library file 40 if any of the checks fail.

The load program 38 uses the rules file 34 to check the specification program. It uses the stations file 30 to make certain that elect is a valid label. The load program 38 uses the programmers file 32 to see whether or not ron can use the copy command and whether or not ron can use the elect label. In addition, the load program checks to see whether or not ron can access the file build and, in addition, the file build is checked to make certain that it is an ordinary file and can be read by others. Of course, other checks can also be implemented into the load program at the option of the individual person using the present invention. The present embodiment determines whether a condition is satisfied by using standard conditional test statements known to those skilled in the art. After passing these tests, the present invention calculates the check sum for the build file and assigns values to the following copy parameters shown in Table 4:

TABLE 4

-U ron -G proj_100 -K check_sum -P /usr/ron/prg.mp
-M modify_date

The load program assigns these values to the copy parameters if all the tests have been passed. As seen in Table 4, -U ron indicates that ron is the UNIX user who loaded the program into the workgroup library. -G proj_100 indicates the UNIX group that the programmer belonged to when the program was loaded into the library. -K check_sum indicates the value of the check sum for the particular file indicated. -P /usr/ron/prg.mp indicates the name of the program file and its directory. -M modify_date indicates the date that the file was last modified. In addition, certain other optional checks can be performed by the present invention. These checks establish additional levels of security. For instance, one check that could be performed is to determine whether or not the file build is owned by ron. Also, does the file build belong to the proj_100 UNIX group, and is the directory/usr/ron owned by the programmer ron. If these checks are implemented, then these additional checks limit access. Of course, these are not the only optional checks that can be included and additional checks can be made as is understood by those skilled in the art according to the teachings presented herein.

Once the load program 38 has determined that the copy command passes each of these checks, then the present invention creates a new copy instruction which the load program 38 writes to the PROJ workgroup library.

The copy command is contained in the library 40 as shown in Table 5:

TABLE 5 copy -P /usr/ron/prg -m -h /usr/ron/build
-c /usr/ron/build2.mp -o ron -g proj_100 -s elect -d
05/28/92-17:10:09 -U ron -G proj_100 -K
check_sum -M modify_date This copy command includes the particular parameters which have been generated by the load program based on the rules and based on the information previously programmed into each of the files.

Table 6 illustrates a basic configuration of the library 40:

TABLE 6

!<LIBRARY>
!STATION HEADER -d last_modify_date
STATION DATA

!STATION FOOTER
!PROGRAM HEADER -P program -d date_loaded -U USER
-G GRP
PROGRAM COMMANDS

!PROGRAM FOOTER -P program

.
.
!PROGRAM HEADER -P program -d date_loaded -U USER
-G GRP
PROGRAM COMMANDS

!PROGRAM FOOTER -P program

As shown, the library is labeled in the beginning as a library. Following that, there is an indication of a station header and a station footer, which contains the definition of labels that can be used by the -s option of program commands. Following that is a program header including certain parameters which are defined in Table 7:

TABLE 7

| | | |
|---|---|---|
| -d | last_modify_date | |
| | The date when the STATION DATA was last modified by the workgroup leader. | |
| -d | date_loaded | |
| | The date when program was loaded into the library. | |
| -P | program | |
| | The name of the program file and its directory. | |
| -U | USER | |
| | The name of the programmer that loaded the program into the library. | |
| -G | GRP | |
| | The UNIX group that the programmer belonged to when the program was loaded into the library. | |

Following the program header are individual program commands. It is here that the individual program commands are listed as generated by the load program 38. For instance, the program command copy, shown in Table 5, would be contained within this section of the program commands. PROGRAM COMMANDS contains any number of specification commands previously written by the programmer which have passed all the tests which the load program 38 performed.

Following the program commands is a program footer delineating the end of the program. The library may contain additional specification programs each consisting of program headers, followed by specification commands and program footers.

Eight types of commands used in the present invention are contained within the program sections of the library. These commands are the same as those previously used by the programmer to generate the individual programs for each of the files. Table 8 lists these commands, which have been modified by the load program 38 to include additional information not previously shown when the programmer programmed the individual commands in the first place.

TABLE 8

```
copy -P program [-m] -h host_file -c client_file -o owner
    -g group -p protection -s labels -d date -M modify_date
    -K check_sum -U USER -G GROUP
refresh -P program [-m] -h host_file -c client_file -o owner
    -g group -p protection -s labels -d date -M modify_date
    -K check_sum -U USER -G GROUP
dir -P program -c client_directory -o owner -g group
    -p protection -s labels -d date -U USER -G GROUP
execute -P program -h host_file -1 shell -s labels -d date
    -M modify_date -K check_sum -U USER -G GROUP
rm_file -P program -c client_file -s labels -d date
    -U USER - G GROUP
rm_dir -P program -c client_directory -s lables -d date
    -U USER -G GROUP
rm_all -P program -c client_directory -s labels -d date
    -U USER -G GROUP
# comment
```

Table 2 lists the meanings of the arguments for most of the above commands, while Table 9 lists the same information for the -P program, -U user, and -G group arguments:

TABLE 9

| | | |
|---|---|---|
| -P | program | |
| | The name of the program file and its directory. | |
| -U | USER | |
| | The name of the programmer that loaded the program into the library. | |
| -G | GROUP | |
| | The UNIX group that the programmer belong to when program was loaded into the library. | |

Figure 3:
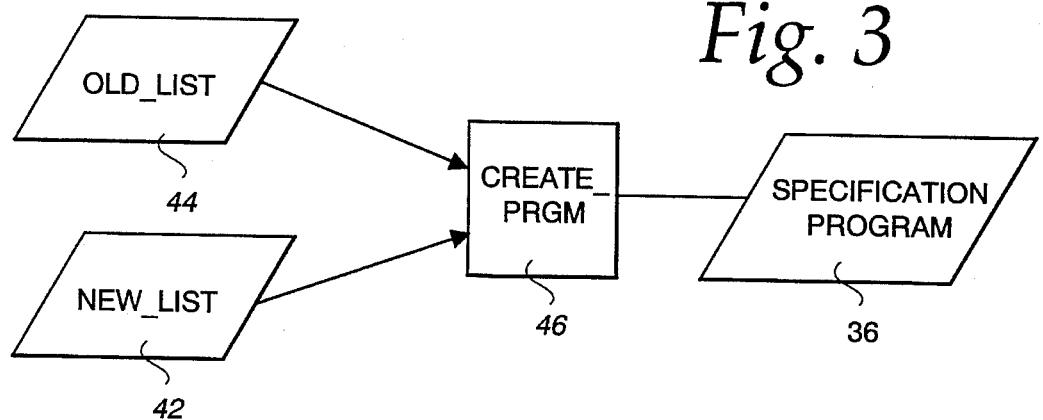
FIG. 3 is a block diagram illustrating the creation of a program file by a program called create_prgm.

FIG. 3 illustrates an additional feature of the present invention in which the program file 36 is automatically created by create_prgm program 46. The create_prgm 46 creates a specification program based on the data in new_list 42 and old_list 44.

Table 10 shows the create program instruction which is generated by the programmer. The programmer inserts the information necessary into the appropriate locations shown in the create program instruction of Table 10.

TABLE 10

```
create_prgm -c {copy | refresh} [-m] -s labels
    [-o old_list] -d source_dir -t target_dir
    -i new_list
```

The create_prgm 46 will create a copy or refresh 40 command for the files in the new_list, depending on whether the copy or refresh command has been selected. The create_prgm 46 will also create dir commands for the files' parent directories if the copy command is used. If the -o option is used, in which the old_list is shown, then the program will also contain remove commands. It will have a rm_file command for each file listed in the old_list that is not also listed in the new_list. Similarly, it will have a rm_dir command for each directory in the old_list that is not also in the new_list. The various options are defined and shown in Table 11 for the create_prgm 46.

TABLE 11

| | | |
|---|---|---|
| -i | new_list | |
| | File new_list contains a list of directories and files used to create the program. Each record in new_list can only have one directory or file. | |
| -c | {copy \|refresh} | |
| | Use the copy or refresh command. | |
| -M | Use the maintain option in the copy or refresh commands. | |
| -s | labels | |
| | Use labels in each command to specify which computers should execute the commands on. Labels can be several labels separated by commas. | |
| -d | source_dir | |
| -t | target_dir | |
| | If the source directory (source_dir) and target directory (target_dir) differ, the copy and refresh commands will send the files and create directories from the source directory on the host to the target directory on the clients. | |
| -o | old_list | |
| | File old_list contains a list of directories and files. The present invention will generate rm_dir and rm_file commands for all directories and files listed in old_list but are not in new_list. Each record in old_list can only have one directory or file. | |

First, the create_prgm checks for mandatory options which are the -c, -d, -t, -s and -i options. If the -o is used, the create_prgm finds the directory and file entries in the old_list that are not in the new list. The selected entries are sorted in reverse order to process file entries before directory entries. Then, for each entry, the create_prgm generates an rm_file command if it is a file, or an rm_dir command if it is a directory. The operating system is used to determine these definitions.

Next, the create_prgm 46 builds a command for each directory and file in the new list. Entries are sorted in the new_list to create dir commands before the copy commands. If the entry is a directory and the -c option is copy, then a dir command is created. The create_prgm 46 includes the directory's owner, UNIX group, and protection in the dir command. This data is obtained from the operating system. The dir command also requires a date, which create_prgm 46 obtains from the operating system.

If the entry is a file and the -c option is copy, then the create_prgm creates a copy command automatically for the new file. This command requires the file's owner, the UNIX group, and protection which is obtained from the operating system. This command also requires a date, which is also obtained from the operating system. If the entry is a file and the -c option is refresh, the create_prgm 46 program creates a refresh command. This command requires the file's owner, UNIX group, and protection which create_prgm 46 obtains from the operating system. A date is also required, which is obtained from the operating system.

If source_dir and target_dir differ, then the -c option in each command will have target_dir in place of source_dir.

Each workgroup has its own library. The workgroup library contains a number of specification programs written by workgroup programmers. The programs combine to form a specification for the workstation. This specification defines and limits the operation of each individual workstation within the workgroup.

The present invention in no way limits access to files or information which are on the network and which do not fall within the previously defined parameters of the specification programs. In fact, the present invention is almost transparent to the user in that the user can create and maintain his own files without interference from the present invention.

Figure 4:
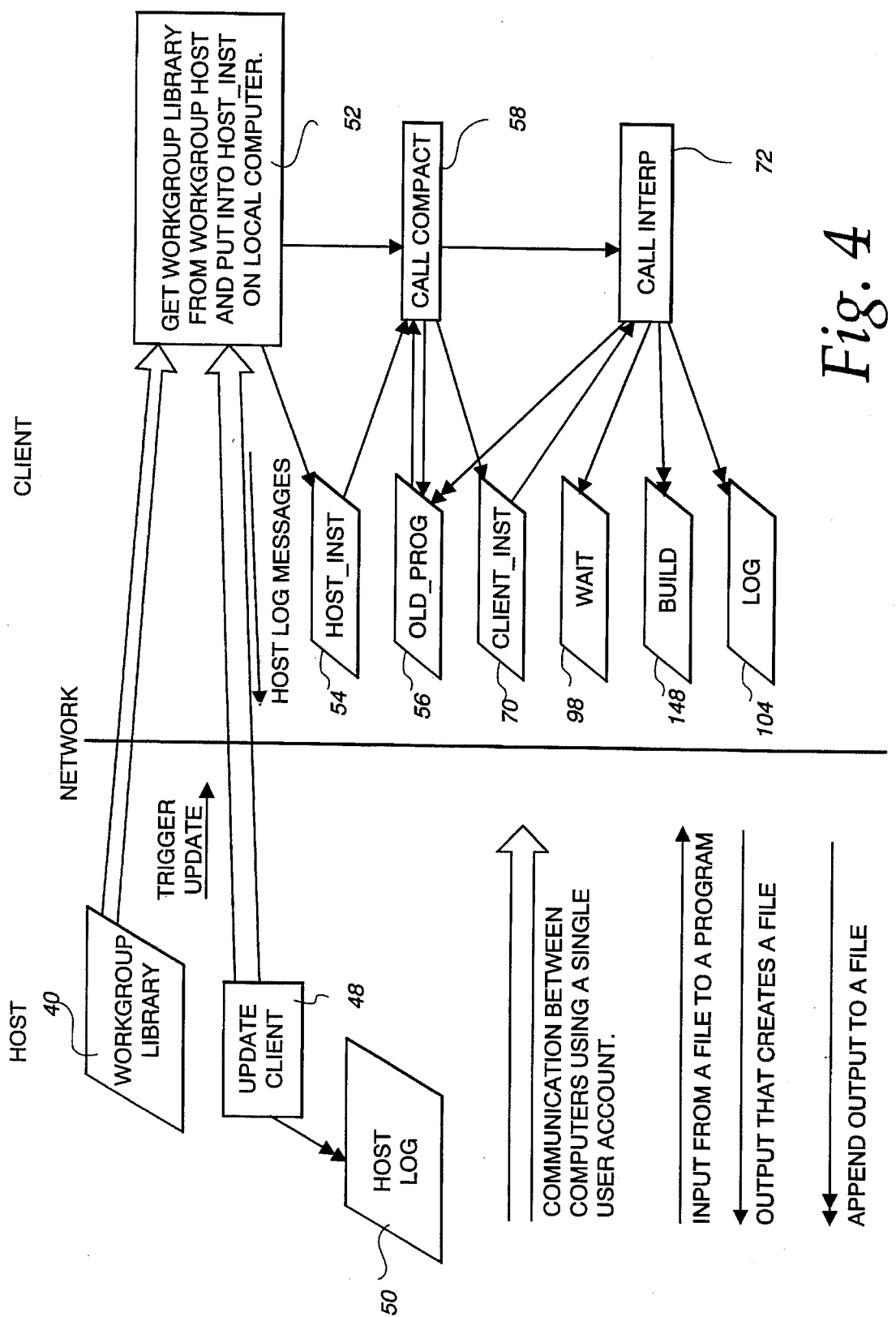
FIG. 4 is a block diagram illustrating a number of program modules and their interaction with and creation of a number of files.

FIG. 4 illustrates a plurality of files and program modules which are used once the workgroup library has been completed. After the load program 38 adds specification programs 36 to the workgroup library 40, the invention on the client can implement the specification programs.

The host update client program 48 establishes contact with a client workstation and executes a first program 52 on the client to implement the workgroup specification 47. Contact between the host and the client is maintained during execution of program 52 so that output from program 52 can be put into the host log 50. The invention uses a single computer account, that exists on all stations, for transferring files and other network communication. If, however, a client workstation initiates the implementation of workgroup specifications for itself, the invention on the client establishes contact with the workgroup host and executes the client update program 48 which, as described above, executes the client program 52 on the client. Client workstations initiate implementations of workgroup specifications through the update client program 48 to maintain the host log 50.

When the workgroup host initiates the implementation of workgroup specifications for client workstations, the invention executes the update utility that updates the workgroup library, described later, and then calls the update client program 48 for each client. The present invention does not call the next client until the current client completes implementation of the specification.

There are various instances when the workgroup client implements the specifications in the workgroup library. Implementation at a client can occur upon power-up of the individual client, at the user's request on the client workstation, at the programmer's request on the workgroup host or at times specified by the workgroup leader on the workgroup host.

Program module 52 gets the workgroup library 40 from the workgroup host and puts the workgroup library 40 into the host_inst file 54, which exists on the client. The host_inst file 54 reflects the current status of the library as contained in the workgroup host.

The client workstation keeps track of specification commands that have been previously implemented on this particular workstation in another file called the old_prog file 56. The old_prog file 56 is both input to and receives output from the compact program 58. Consequently it is convenient to talk of old_prog(1) as the input into compact 58 and old_prog(2) as the output from compact 58.

Figure 5:
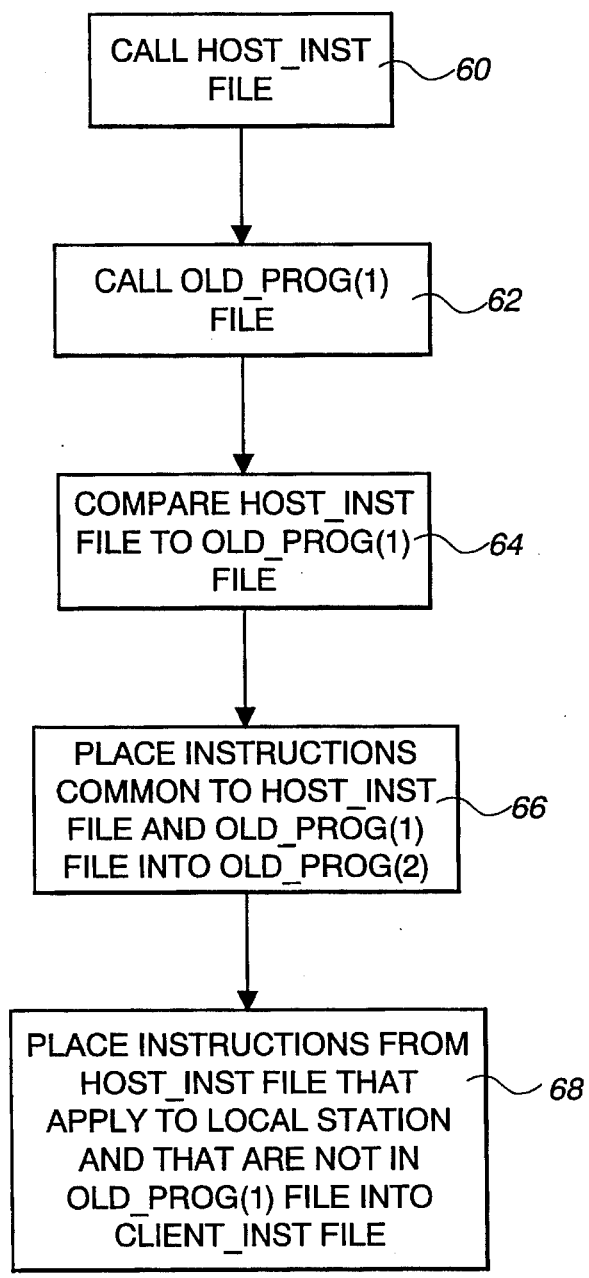
FIG. 5 is a flow diagram of the compact program module.

The updating of the old_prog 56 is performed by a program module called compact program module 58. FIG. 5 illustrates the operation of the compact program module 58. Initially, at step 60, the compact program module 58 calls the host_inst file 54. At step 62, the compact program module 58 calls the old_prog (1). At step 64, the compact program module 58 compares the host_inst file 54 to the old_prog (1) file. At step 66, specification commands which are common to the host_inst file 54 and to the old_prog (1) file, are put into the old_prog (2) file. The common commands are those commands in the workgroup library 40 which have been implemented on the present workstation.

Specification commands in the workgroup library 40 that apply to the client and have not yet been implemented are put into a client_inst file 70. The client inst file 70 contains instructions from the host_inst file 54 that apply to the local station and that are not in the old_prog (1) file. These include pending commands, described later, and new specification commands. After operation of the compact program module 58, the old_prog (1) file 56 has been replaced with old_prog (2) file 56, and client_inst file 70 contains specification commands that the present invention using a program module called interp 72 executes on the client computer.

Figure 12:
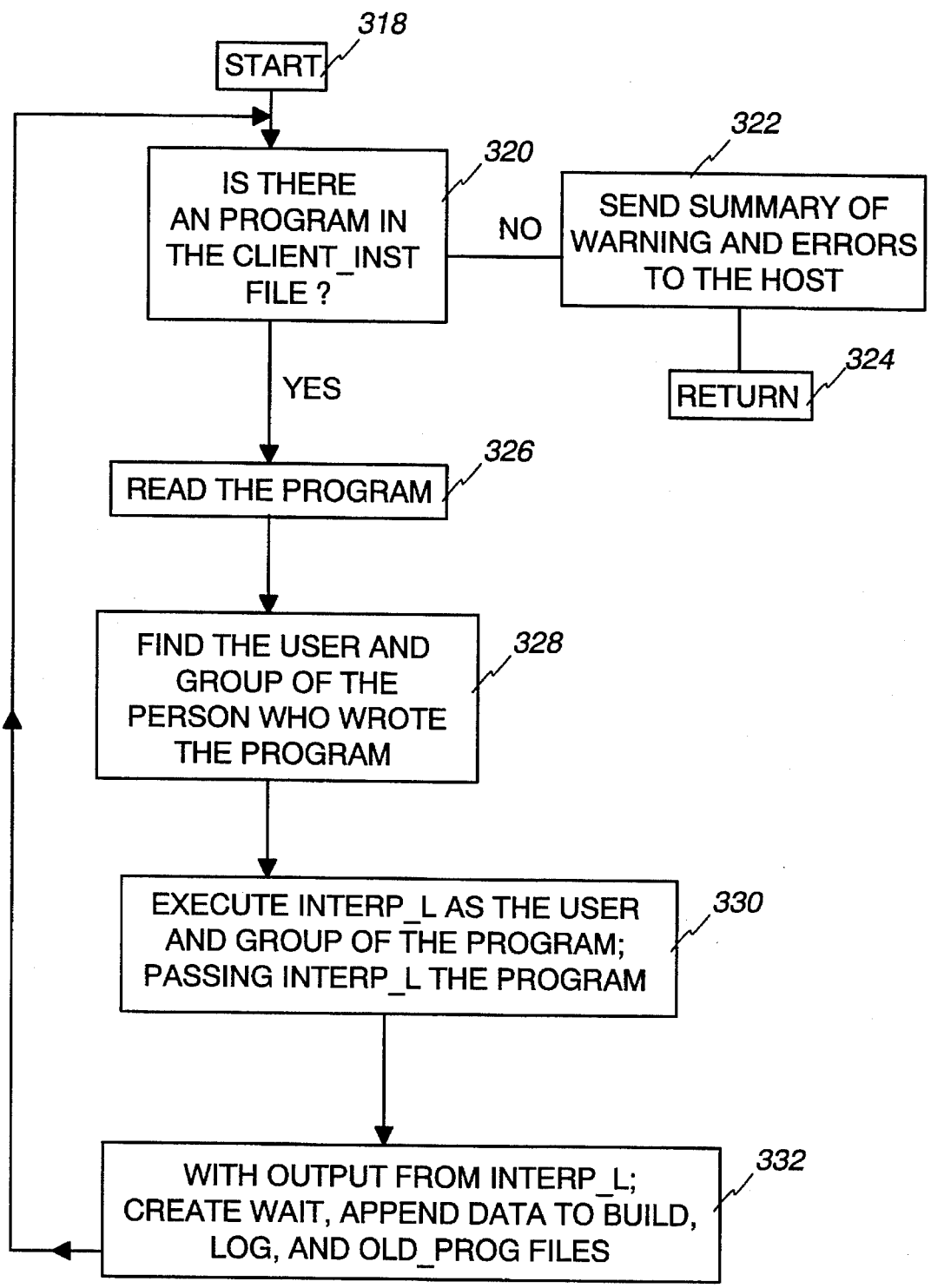
FIG. 12 is a flow diagram of the interp function module.

FIG. 12 describes the operation of the interp program 72. The interp program starts at block 318. Block 320 checks to see if there are any programs in the client_inst file 70. If there are programs in the client_inst file 70, then the next program is read at block 326 and the UNIX user and group of the programmer are determined at block 328. In block 330, the invention executes interp_1 as though it was executed by the programmer of the specification program and passes it the specification program. Output from interp_1 is used to create the wait file 98 that contains pending commands, adds implemented instructions and instructions that cause warnings or errors to the old_prog file 56, adds implemented instruction to the build file 148, and adds warning messages, error messages and implemented instructions to the log 104 in block 332. Following block 332 the programs loops back to block 320. When the client inst file 70 is empty, then a summary of warnings and errors is sent to the workgroup host by block 322 and the routine exits at block 324.

Figure 6:
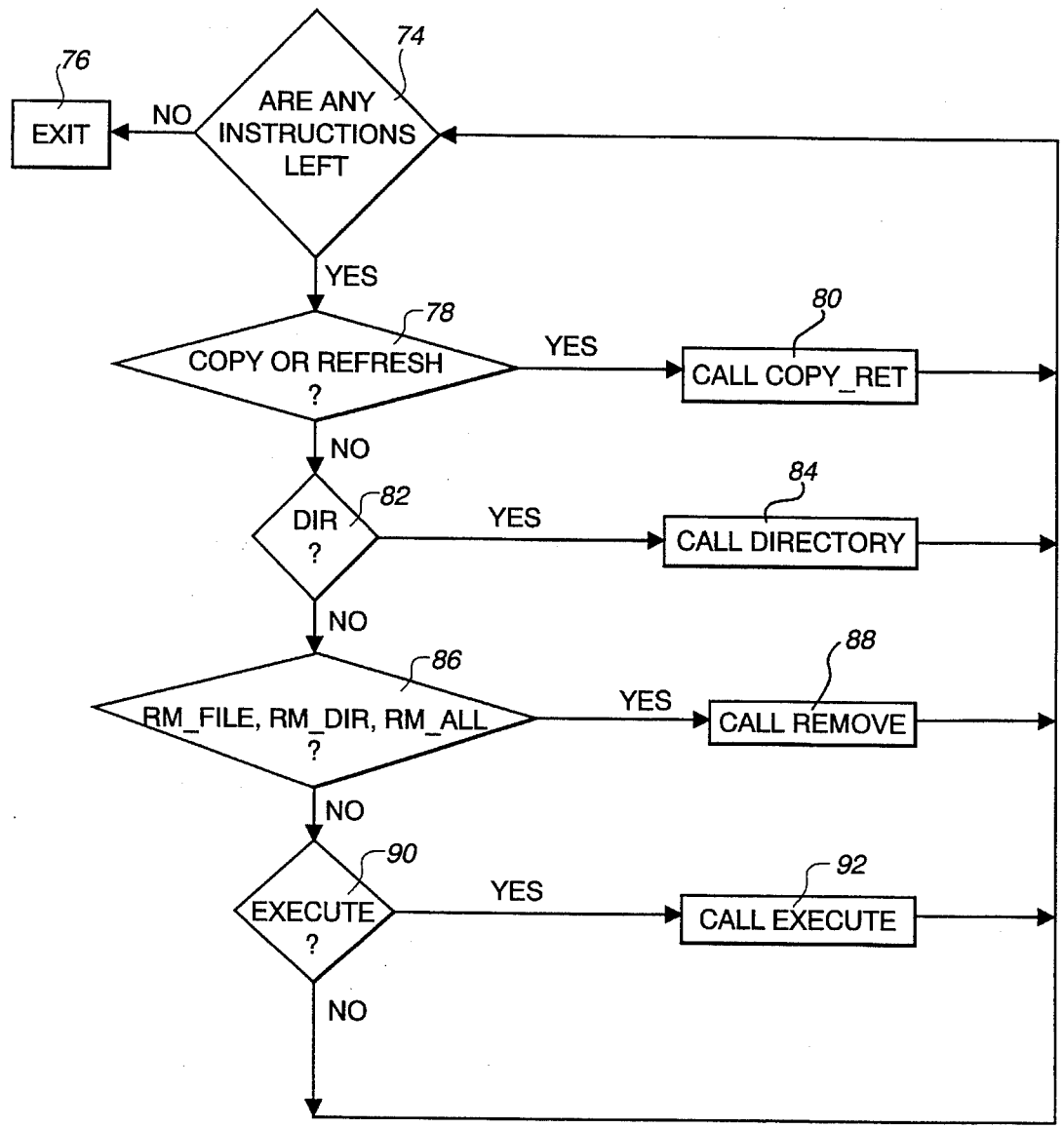
FIG. 6 is a flow diagram of the interp_1 program module.

FIG. 6 illustrates the operation of the interp_1 program. The interp_1 program parses each command and passes arguments to the appropriate function, where execution of the instruction is attempted. Step 74 determines whether there are any more instructions. If no instructions are left from the client_inst 70 file, the interp_1 program exits at step 76.

If client_inst file 70 contains instructions to be executed, each instruction is examined to determine what type of instruction it is. If the instruction is a copy or refresh instruction at step 78, then the copy_ref program is called at step 80. If the instruction is not a copy or refresh instruction, it is checked to determine whether or not it is a dir instruction at step 82. If it is a dir instruction, the directory program is called at step 84. If not a dir instruction, as determined at step 82, then at step 86 it is determined whether or not the instruction is a rm_file, a rm_dir file, or a rm_all instruction. If it is any one of these three instructions, then a remove program is called at step 88. If at step 86 it is determined that it is not a remove type of instruction, then it is determined whether or not it is an execute instruction at step 90. If yes, the execute program is called at step 92. If not, the program returns to determine whether or not there are any instructions left at step 74.

Figure 7A:
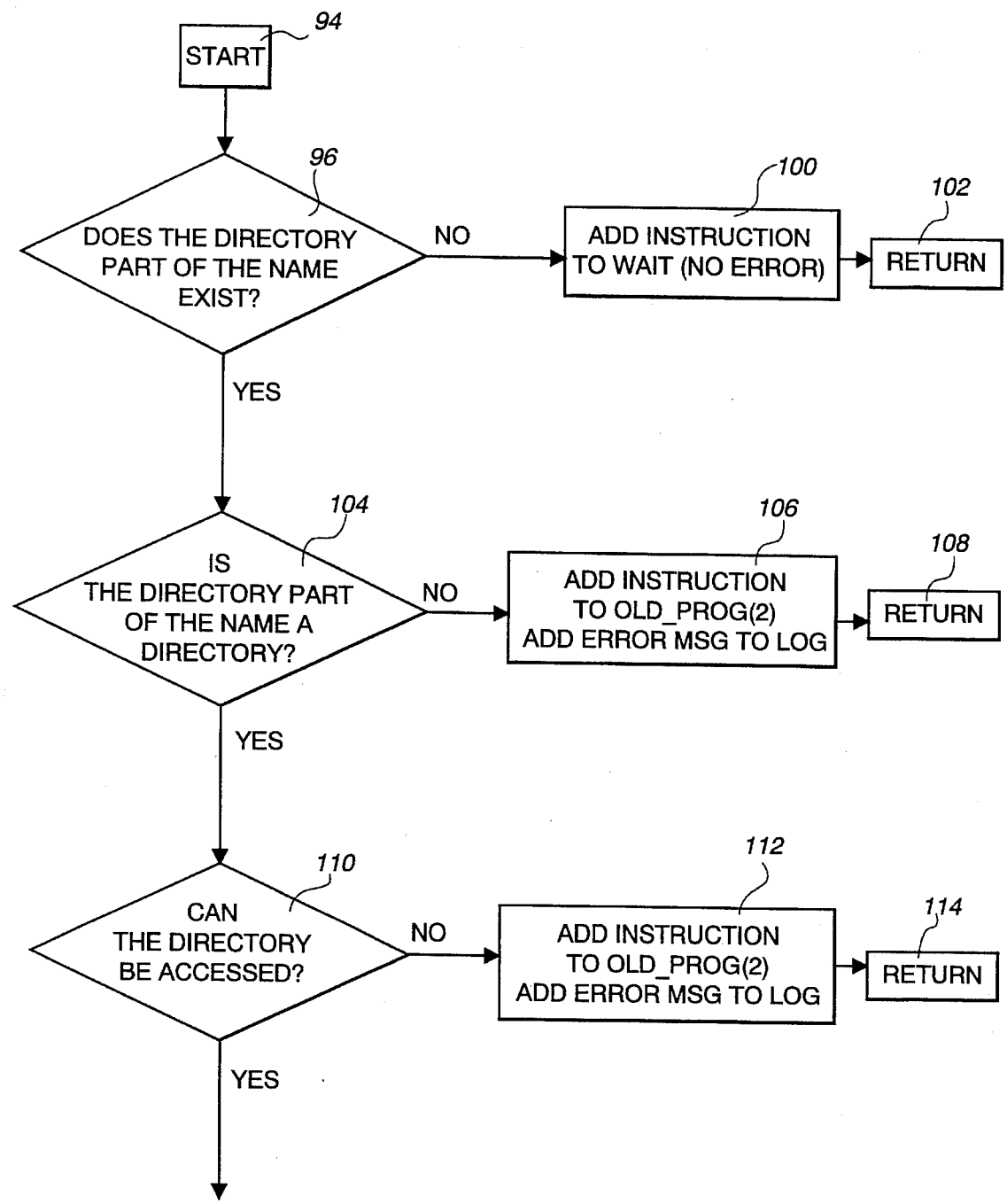
FIGS. 7A–7C is a flow diagram of a copy_ref function module.
Figure 7B:
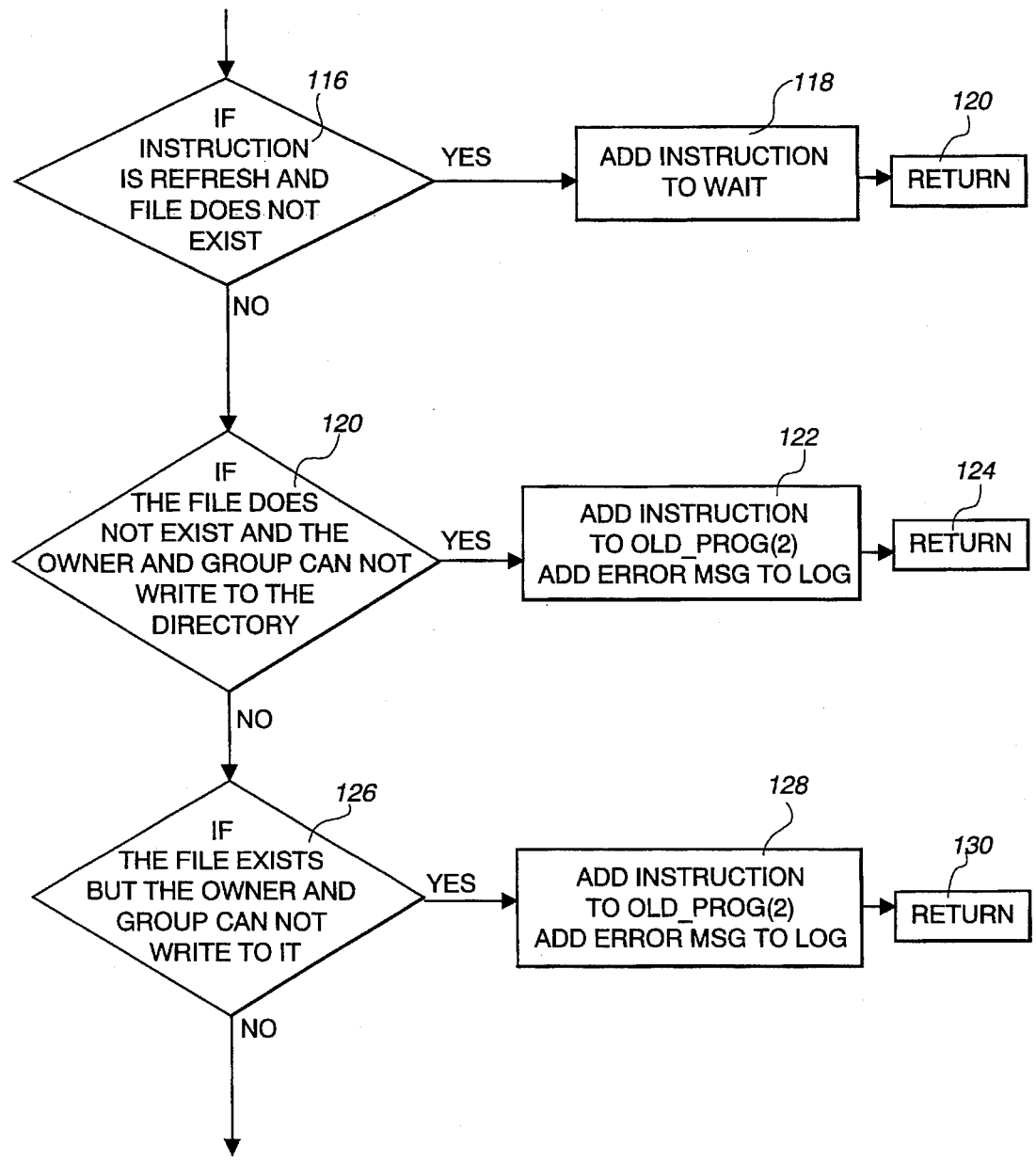
Figure 7C:
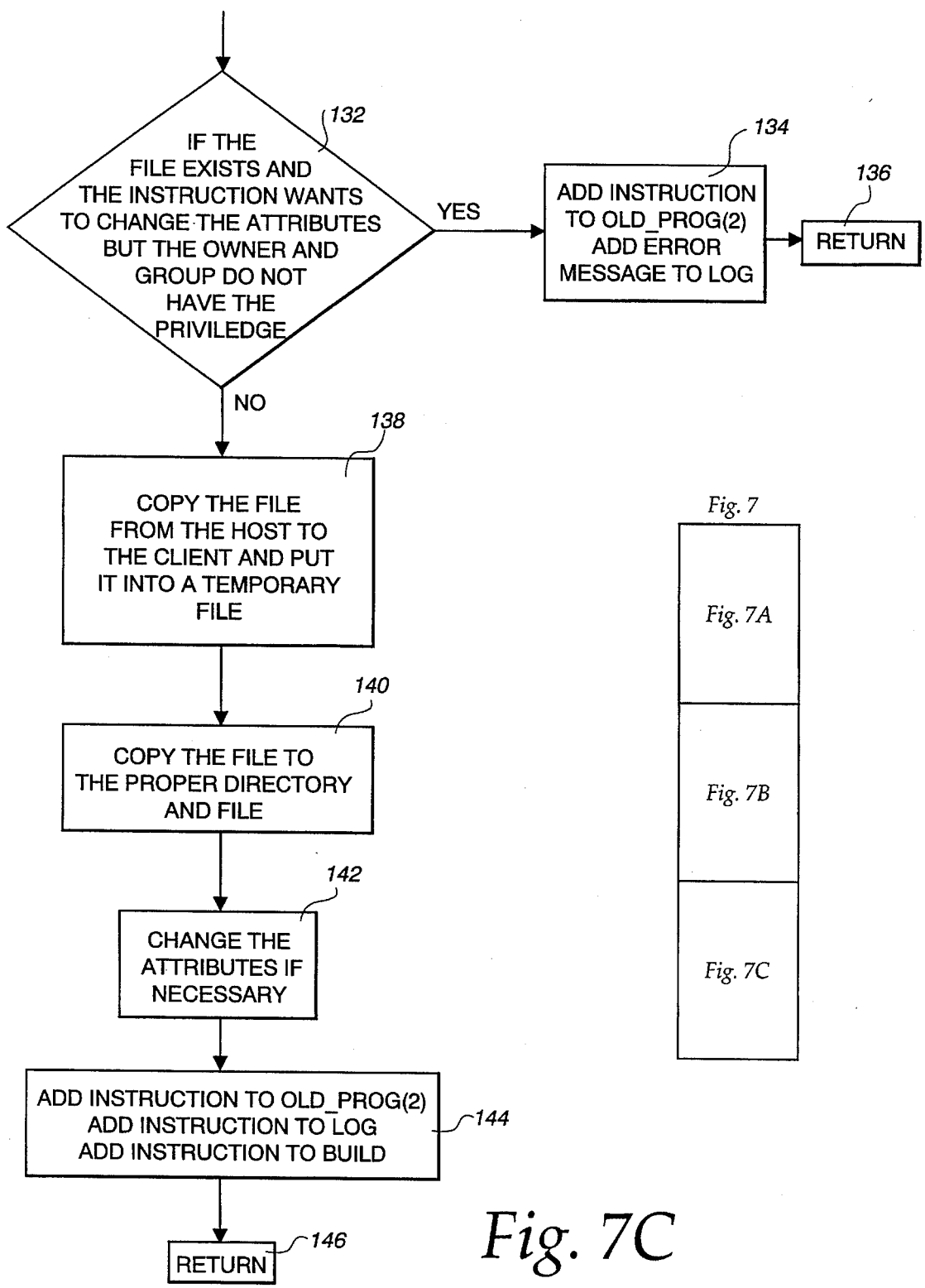

FIGS. 7A–7C illustrate the copy_ref subroutine, which is called at step 80 by the interp_1 subroutine. The copy and the refresh commands copy a file from the host workstation to the client workstation, if the owner and group of the program have permission within UNIX to do so. Both of these commands can also change the attributes of the file on a client if they have the privileges within UNIX to do so. The copy_ref subroutine begins at step 94.

At step 96, it is determined whether the directory that will contain the file exists on the client. If it does not exist, this particular instruction is added to a wait file 98, as seen in FIG. 4. The wait file contains instructions which are waiting to be executed but cannot be executed at this time. They are called pending instructions. Once the instruction is added to the wait file 98, at step 100, the copy_ref subroutine returns at step 102 to the interp_1 subroutine shown in FIG. 6. If, however, the directory part of the name does exist on the client, then at step 104 a determination is made as to whether the directory part of the name is a directory. If not a directory, an instruction is added to the old_prog (2) file 56 and an error message is added to the log file 104 at step 106. Once added, this subroutine returns to the calling subroutine at step 108.

If the directory part of the name is a directory as determined at step 104, the subroutine then determines whether or not the directory can be accessed at step 110. If it cannot be accessed at step 110, then the instruction is added to the old_prog file 56 and is also added as an error message to the log file 104 at step 112. The subroutine then returns to the calling program at step 114.

If the directory can be accessed, as determined at step 110, then the subroutine at step 116 determines if the instruction is a refresh instruction and if the file does not exist. If yes, the refresh instruction is added to the wait file 98 at step 118 and at step 120 the present subroutine returns to the calling subroutine. If step 116 is not satisfied, step 120 checks to see if the file does not exist and that the owner and the group cannot write to the directory. If step 120 is satisfied, this instruction is added to the old_prog file 56 and an error message is added to the log file 104 at step 122. After adding the error message to the log file 104, the subroutine returns at step 124 to the calling subroutine.

If step 120 is not satisfied, then at step 126 if the file exists but the owner and group specified cannot write to that particular file, then the instruction is added to the old_prog file 56 and an error message is added to the log file 104 at step 128. Thereafter, the subroutine returns at step 130 to the calling subroutine.

Step 132 follows from a negative decision at step 126. If the file exists and the instruction wants to change the attributes, but the owner and group cannot, then the instruction is added to the old_prog file 56 and an error message is added to the log file 104 at step 134. Upon completion of step 134, the subroutine returns at step 136 to the calling subroutine.

If step 132 is negative, then it is acceptable to copy the file from the host to the client at step 138, at which point the host file is put into a temporary file at the client location. This illustrates the trait that specification commands are not performed until all necessary UNIX operations can be completed. The file is then copied to the to the proper directory and file at step 140. If necessary, attributes are changed at step 142. Once the attributes have been changed, the instruction is added to the old_prog 56 file, the log file 104, and the build file at step 144. When step 144 is completed, the subroutine returns to the calling subroutine at step 146.

As seen by the description of the copy_ref subroutine, the interp routine outputs some commands to a wait file 98. These commands are pending commands. Pending commands are not executed until some condition on the client is satisfied. Pending commands are not put into the old_prog file 56, so the invention will check to see if they can be implemented the next time update client block 48 on FIG. 4 is called. The old_prog file 56 contains all executed commands, whether they succeeded or caused errors or warnings. The wait file 98 can be viewed by users on the client to see what commands are pending. In addition, the log file 104 keeps a record of the result of all executions. This is used for bookkeeping purposes.

In addition to the wait file 98 and the log file 104, a build file 148 is also accessed by the interp subroutine. The build file 148 is maintained on the client workstation only. This build file is an audit trail of all instructions that are successfully executed on the client. The present invention appends the implemented commands from each workgroup to the same build file.

Specification programs are normally left in the library. The present invention keeps track of the commands that have been attempted and does not re-execute those that were successful or those that caused an error or a warning. As long as the specification remains in the workgroup library, the invention can implement the specification on any new workstations that may be added to the workgroup and on workstations that may have been off-line. In addition, the specification must remain in the library for pending commands to be implemented.

The copy and the refresh command may not execute and may not cause an error. These pending commands will be attempted again as long as they are left in the library.

Pending commands allow the programmer to write specifications that respond to differences between clients and to changes on a client. This is often needed when setting up projects or distributing software to the individual workstations. For example, if a programmer wants to configure some software, he can write a specification without knowing which computers in a group have or will have the software.

Returning now to FIG. 6, if the interp_1 routine determines at step 78 that the instruction is not a copy or refresh command, it proceeds to step 82 where it determines whether or not the command is a dir command. If it is a dir command, at step 84 the directory subroutine is called.

Figure 8A:
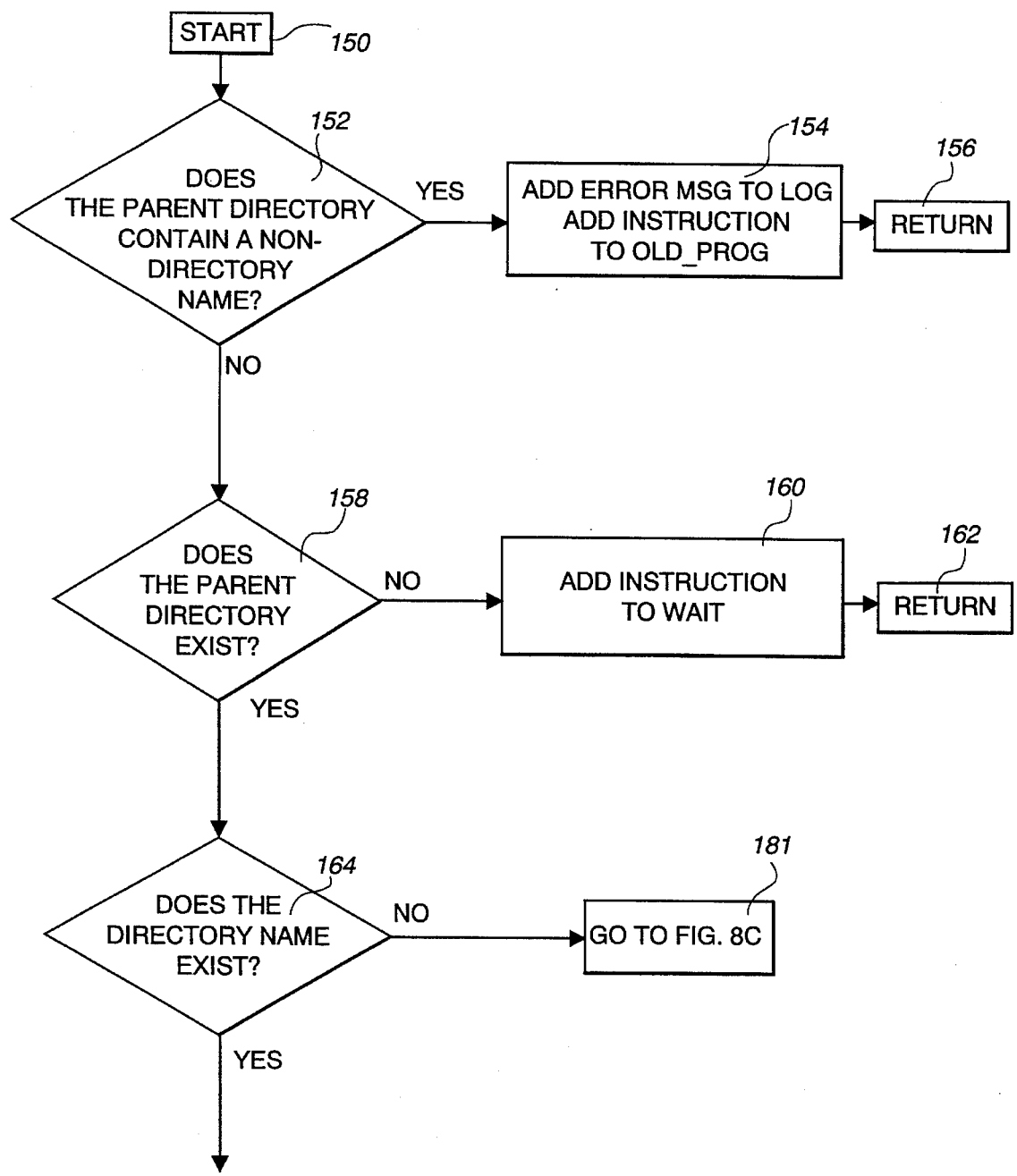
Figure 8B:
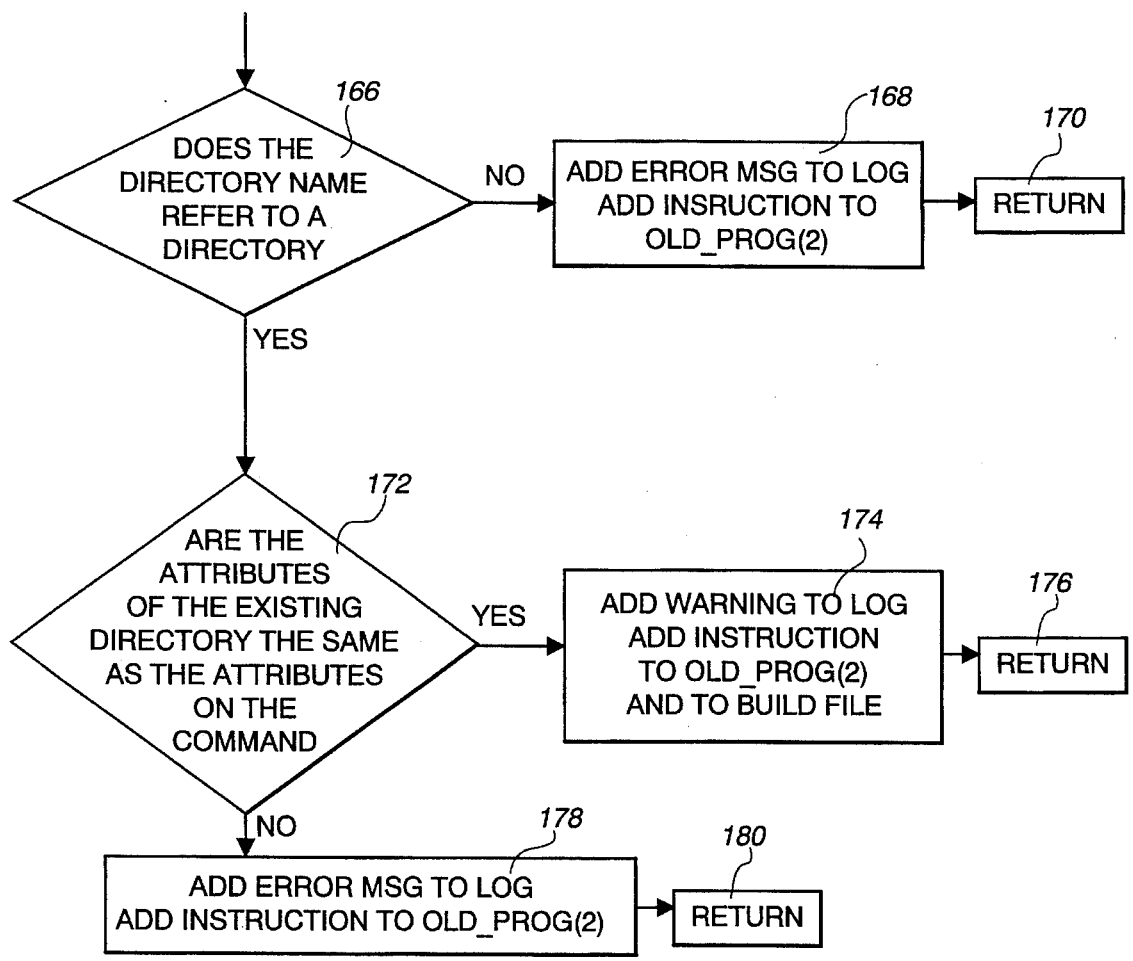

FIGS. 8A–8C illustrate the operation of the directory subroutine. The directory function 84 creates a directory on the client, using the data that is in the dir command. At step 150, the directory subroutine begins. At step 152, the directory subroutine checks to see if the parent directory name contains a non-directory. If so, an error message is added to the log file 104 and the instruction is added to the old_prog file 56 at step 154. Subsequently, at step 156 the subroutine for the directory returns to the interp_1 program.

If, however, all parts of the parent directory name that exist are directories, then the directory subroutine checks at step 158 to see whether or not the parent directory exists. If the parent directory does not exist, the command pends and at step 160, the instruction is added to the wait file 198. At step 162, the directory subroutine then returns to the calling program.

If, however, the parent directory does exist, then at step 164 the subroutine checks to see whether or not the directory name exists. If the directory name does exist, then the directory proceeds to FIG. 8B, at which point the subroutine checks at step 166, to determine if the directory name refers to a directory.

If the directory name does not refer to a directory, at step 168 an error message is added to the log file 104 and the instruction is added to the old_prog file 56. At step 170, the subroutine returns to the calling program.

If, however, the directory name does refer to a directory, then at step 172 the subroutine determines whether or not the attributes of the existing directory are the same as the attributes on the dir command. If these attributes are the same, then at step 174 a warning is added to the log file 104, this instruction is added to the old_prog file 56 and the command is added to the build file 148, whereupon the subroutine returns to the calling routine at step 176.

If, however, the attributes are not the same, then an error message is added to the log file 104 and the instruction is added to the old_prog file 56 at step 178 and upon completion, returns to the calling program at step 180.

Returning now to FIG. 8A, at step 164 the check determines whether or not the directory name exists. If it does not exist, the subroutine continues at step 181 to the program shown in FIG. 8C, where, at step 182, the directory subroutine determines whether or not the parent directory can be accessed by the programmer of the dir command (refer to Table 9). If the parent directory cannot be accessed by this programmer, at step 184 an error message is added to the log file 104 and the instruction is added to the old_prog 56 and then the routine returns at step 186.

If, however, the parent directory can be accessed by the user and group of the programmer of the dir command, at step 188 the subroutine asks whether or not the owner and the group for the directory exist on the system. If the owner and the group for the directory do not exist on the client, at step 190 an error message is added to the log file 104 and the instruction is added to the old_prog file 56, whereupon the subroutine returns at step 192 to the calling program.

If the owner and the group for the directory do exist on the system, as determined at step 188, the program at 194 completes a number of tasks. At 194, the directory is created, the attributes of the directory are changed to match attributes stated in the dir command, the instruction is added to the old_prog file 56, the instruction is also added to the log 104, and the instruction is added to the build file 148, signifying that it is a command which has been completed. After completion of step 194, the program returns to the calling program at step 196.

Returning again to FIG. 6, if the interp_1 subroutine determines that the instructions are not a copy instruction, a refresh instruction or a directory instruction, it proceeds to step 86 where it is determined whether or not the instruction is a remove file instruction, remove directory instruction or a remove-all instruction. These are rm_file, rm_dir and rm_all. If the interp_1 subroutine determines that it is a remove instruction, the remove subroutine is called at step 88.

Figure 9A:
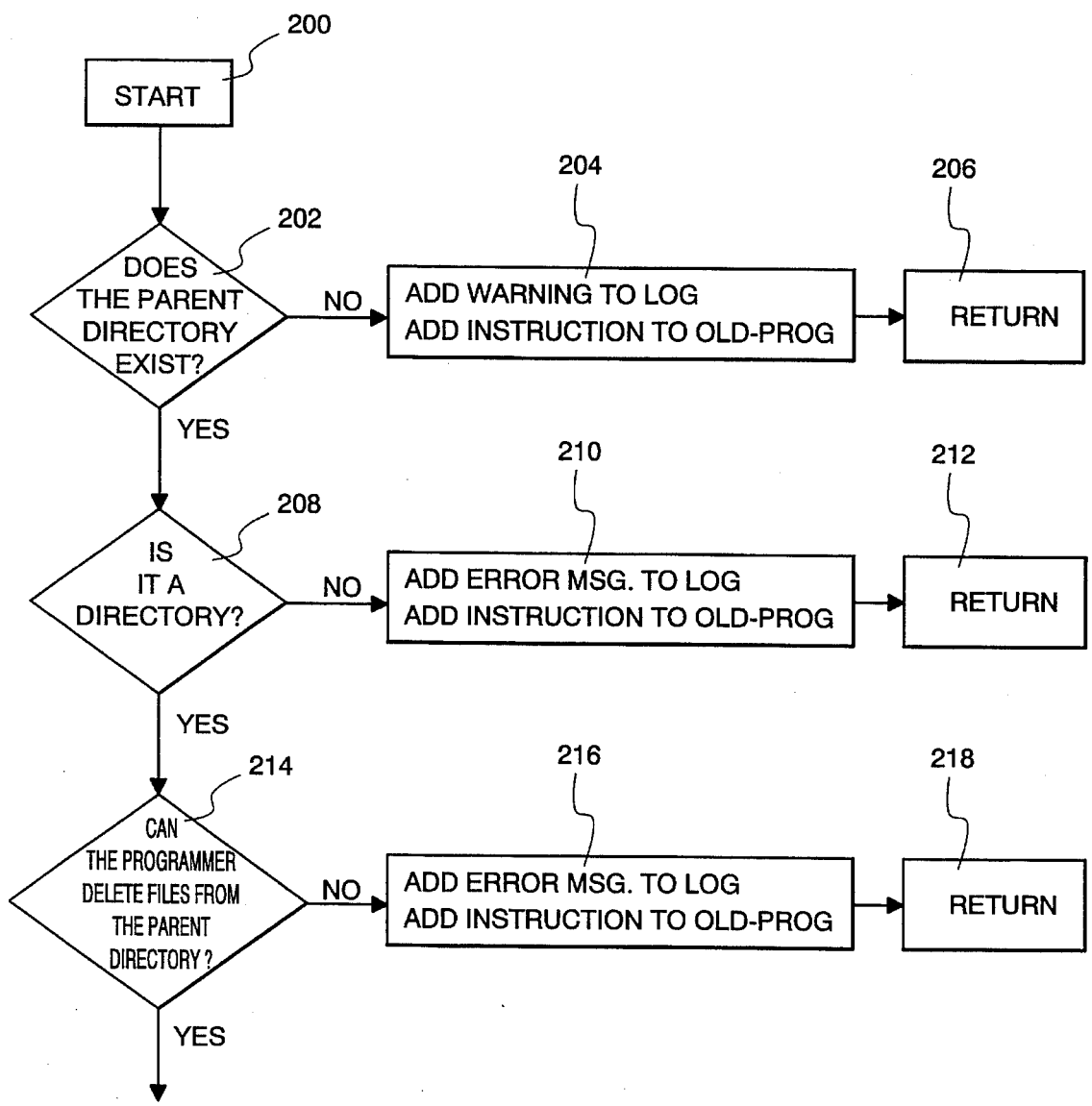
FIGS. 9A–9B is a flow diagram of a remove function module.
Figure 9B:
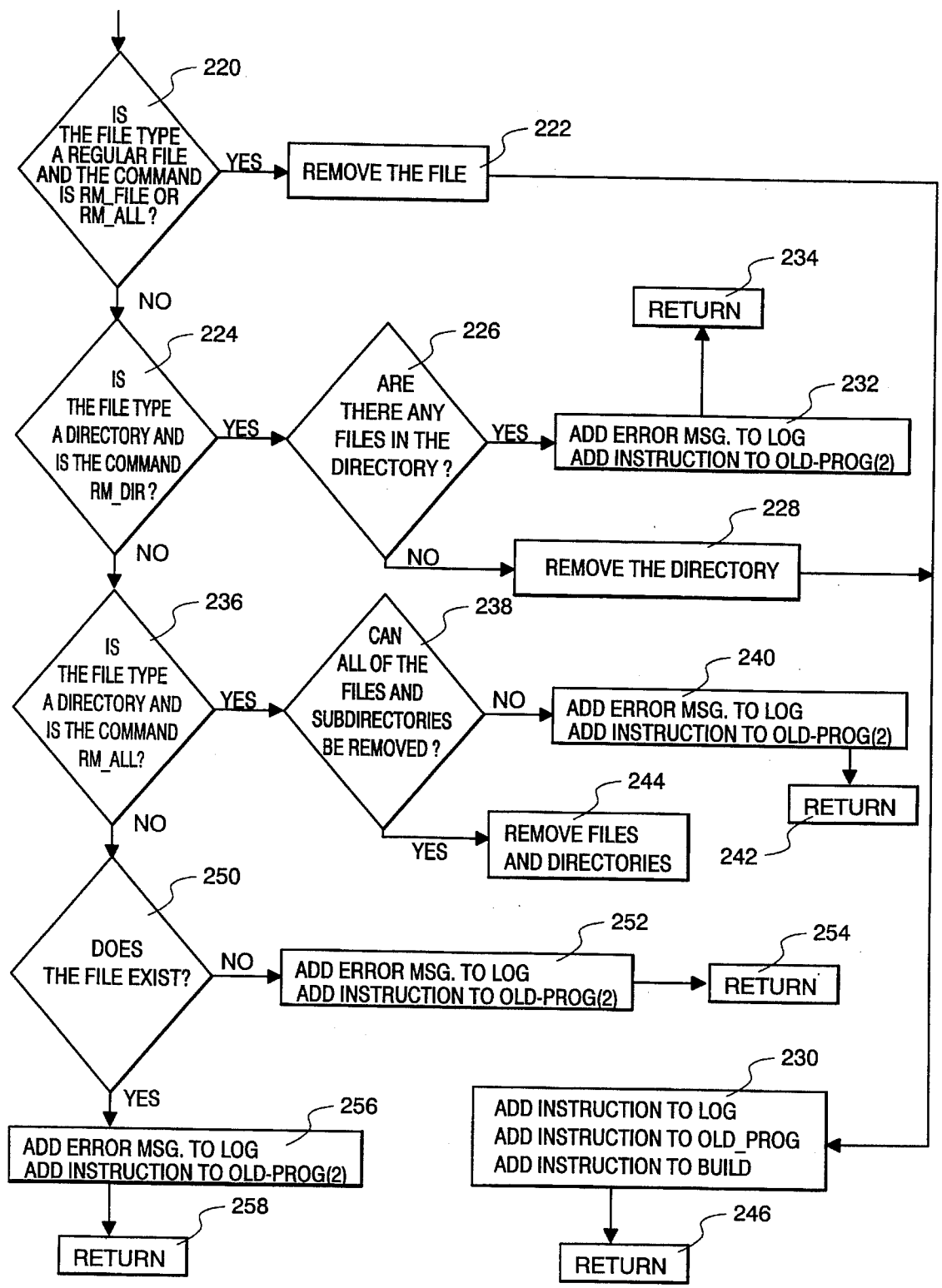

FIGS. 9A and 9B illustrate the operation of the remove subroutine. The remove subroutine begins at step 200, whereupon at step 202 the remove subroutine checks whether or not the parent directory exists. If the parent directory does not exist, at step 204 a warning is added to the log file 104 and the instruction is added to the old_prog file 56, upon which time it returns at step 206.

If, however, the remove subroutine does determine that the parent directory exists, at step 202 the subroutine proceeds to step 208, where it is checked to see whether or not it is a directory. If it is not a directory, at step 210 an error message is added to the log file 104 and the instruction is added to the old_prog 56 and returns at step 212.

If it is a directory, however, at step 214 a check is made to determine whether or not the programmer can delete files from the parent directory. If the programmer does not have the ability or authorization to delete files from the parent directory, at step 216 an error message is added to the log file 104 and the instruction is added to the old_prog file 56 and returns at step 218.

If the programmer does have authorization to delete files from the parent directory, as determined at step 214, the subroutine continues to step 220, shown in FIG. 9B. In step 220, it is determined whether or not the file type is a regular file and whether the command is a rm_file or a rm_all. If it is, at step 222 the file is removed. At step 230, the command is added to the log file 104, the old_prog file 56 and the build file 148. It continues to step 246 where it returns to the calling routine.

If, however, the file type is not a regular file or the command is not a rm_file or a rm_all file, then at step 224 a check is made to determine if the file type is a directory and whether or not the command is a rm_dir file. If the file type is a directory, and the command is an rm_dir command, then at step 226 a determination is made to see whether or not the directory is empty. If empty, the directory is removed at step 228. At step 230, the command is added to the log file 104, the old_prog file 56 and the build file 148. It continues to step 246 where it returns to the calling routine.

If there are, however, files in the directory, an error message is added to the log file 104 and the instruction is added to the old_prog 56 at steps 232 and returns at step 234. If the file type is not a directory or the command is not rm_dir, the routine proceeds to step 236, where a check is made to determine if the file type is a directory and if the command is an rm_all command. If yes, the subroutine proceeds to step 238 and a determination is made as to whether or not all of the descendant files and the subdirectories can be removed.

If they cannot be removed, at step 240 an error message is added to the log file 104 and the instruction is added to the old_prog 56, whereupon the subroutine returns at step 242. If the decision at step 238 is yes, at step 244 the files and the directories are removed. At step 230, the command is added to the log file 104, the old_prog file 56 and the build file 148. It continues to step 246 where it returns to the calling routine.

If it was determined at step 236, however, that the file type was not a directory or the command was not an rm_all command, then at step 250 it is determined whether or not the file exists. If the file does not exist, at step 252 a warning is added to the log file 104, the instruction is added to the old_prog file 56, and the subroutine returns at step 254.

If the file does exist at step 250, an error message is added to the log file 104 and the instruction is added to the old_prog file 56 at step 256 and returns at step 258.

Returning again to the interp_1 subroutine, as shown in FIG. 6, if it has been determined that the command is not a copy or a refresh command, is not a dir command, and is not a remove instruction, then step 90 determines if the command is an execute command. If there is an execute instruction at step 90, the execute subroutine is called at step 92.

Figure 10:
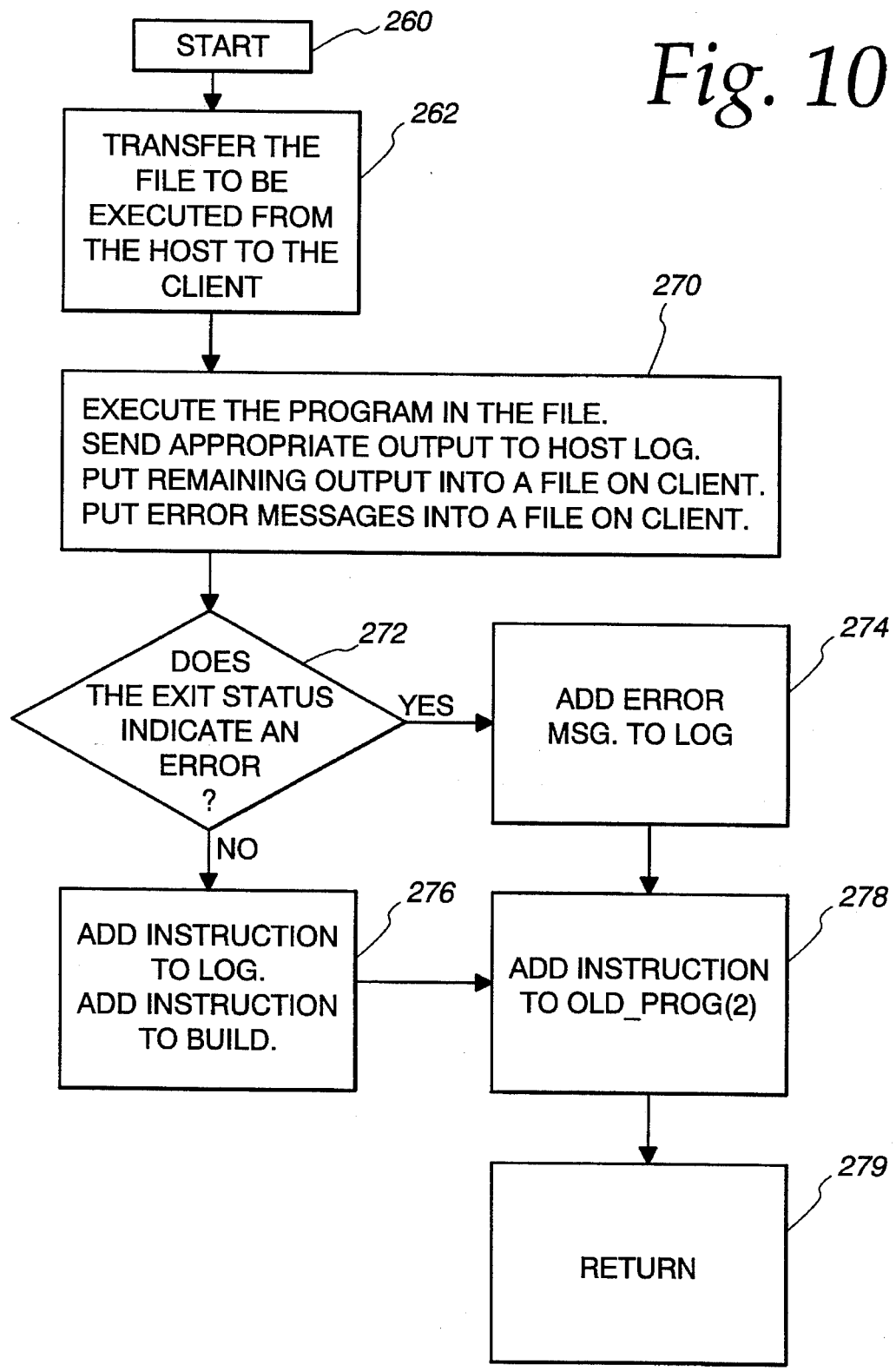
FIG. 10 is a flow diagram of an execute program module.

The execute subroutine is shown in FIG. 10. The execute routine begins at step 260. At step 262, the file to be executed is transferred from the host to the client. At step 270 the subroutine; (1) executes the program listed in the file, (2) sends the appropriate output to the host log, (3) puts the remaining output into a file on the client, and (4) puts error messages into a file on the client. Once these steps have been completed as shown in the box 270, the subroutine proceeds to step 272 to determine whether or not the exit status indicates an error.

If the exit status indicates an error, an error message is added to the log file 104 at step 274, at step 278 the instruction is added to the old_prog 56, and at step 279 it returns to the calling routine. If there are no error messages, then at step 276 the instruction is added to the log file 104 and the build file 148. Then at step 278 the instruction is added to the old_prog file 56 and at step 279 returns to the calling program.

Another feature of the present invention is the ability to check the current status of the host files specified by the copy, refresh and execute commands listed in the library. An update library utility (update), updates the commands in the library with the maintain option (-m). See TABLES 1 and 2. It detects errors in the copy, refresh, and execute commands caused by a change in the status of the host file. It also loads the current station label definitions into the library. The present invention executes the update utility at the times specified by the workgroup leader and prior to block 48, update client, started by a programmer on the host.

Figure 11:
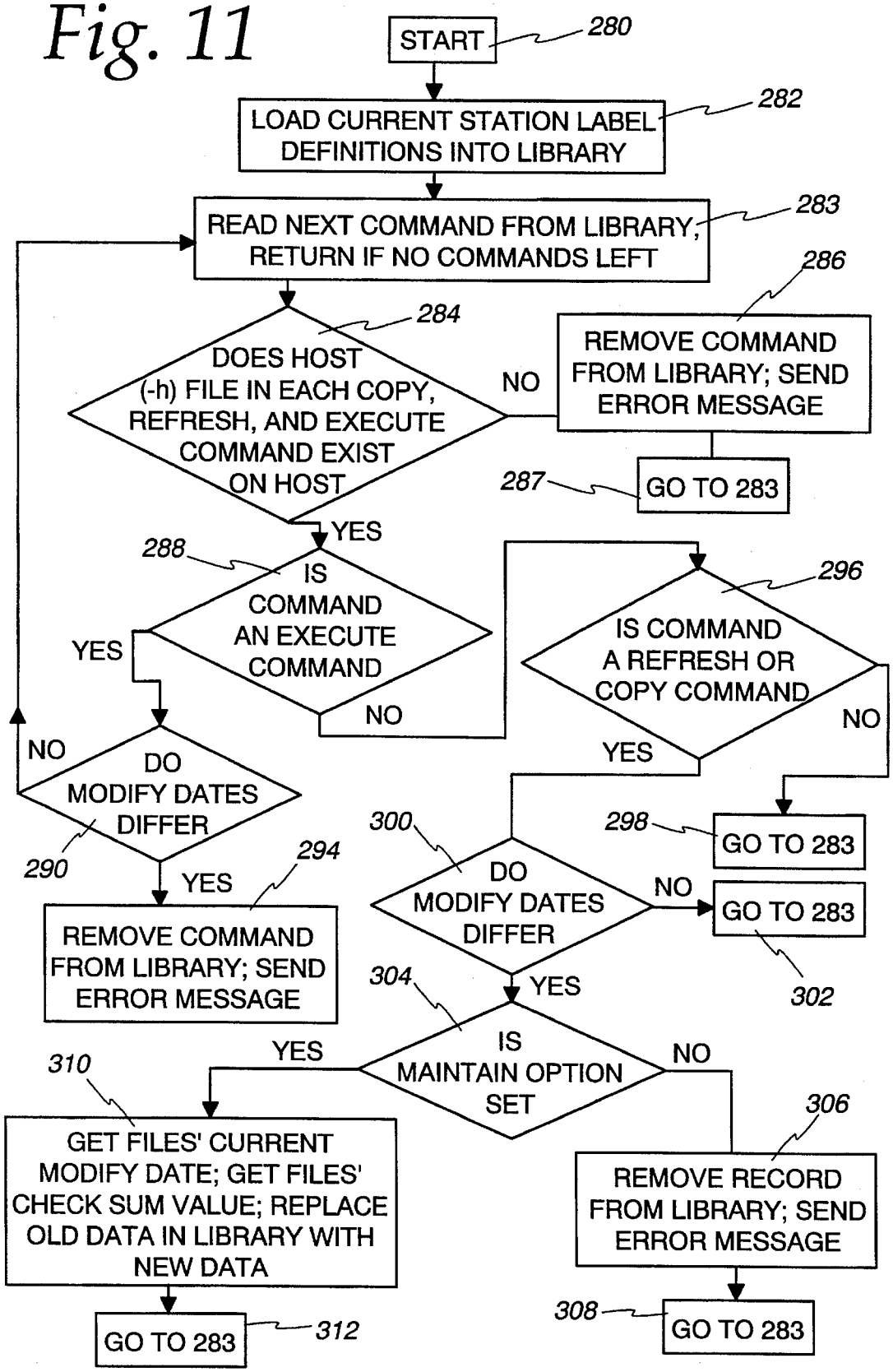
FIG. 11 is a flow diagram of a program update program module.

As shown in FIG. 11, the update utility starts a subroutine at step 280. At step 282, the command loads the current station label definitions into the library. Once the current station label definitions have been loaded, the subroutine reads the next command from the library at step 283, and returns if no commands remain. The subroutine then determines whether or not the host file in each copy, refresh and execute commands exist on the host at step 284. If the host files in each copy, refresh and execute commands do not exist on the host, then these commands are removed from the library and an error message is sent to the programmer at step 286, whereupon the subroutine at step 287 goes to step 283 to read the next command.

If, however, the host files in each copy, refresh and execute commands do exist on a host, then at step 288 the check is made to determine whether or not the command is an execute command. If the command is an execute command, at step 290 the subroutine determines whether or not the host file's modify date in the command differs from the file's actual modify date. If the modified dates do not differ, then it is known that the file has not changed and the subroutine returns at step 283 to read the next command.

If, however, the modified dates do differ, then the command is removed from the library and an error message is sent at step 294. If it is determined at step 288 that the command is not an execute command, then the command is checked to determine whether or not it is a refresh or a copy command at step 296. If the command is not a refresh command or a copy command, then the program returns at step 298 to step 283.

If the command is a refresh command or a copy command, then at step 300 the subroutine determines whether or not the host file's modify date in the command differs from the file's actual modify date. If the modified dates do not differ, then the subroutine returns at step 302 to step 283.

If, however, the modified dates do differ, then the command is checked to determine whether or not the maintain option has been set at step 304. If the maintain option is not set, then at step 306 the record is removed from the library and an error message is sent. Upon completion of these tasks, the program returns at step 308 to step 283.

If it is determined, however, at step 304 that the maintain option is set, then at step 310 the subroutine gets the file's current modify day, gets the file's check sum value and replaces the existing command with a new command using the new data. The subroutine returns at step 312 to step 283.

WORKSTATION COMPARISON SYSTEM

The Workgroup Organized Network Manager includes a workstation comparison system for comparing the files or directories that are located on the individual workstations to determine whether any discrepancies exist between files or directories that are intended to be the same, to locate extra files or directories, or to identify missing files or directories. The workstation comparison system operates in conjunction with the workgroup organized network manager described herein and in co-pending application Ser. No. 07/898,191, which is incorporated herein by reference. The workstation comparison system is used to compare aspects of computers that should be the same. For example, the electrical department might want all of their workstations to have the same software and want the software set up in the same way. The workstation comparison system compares the software maintained on each of the workstations to determine whether the software is in fact the same.

The workstation comparison system includes two types of programs. One type of program collects the data from each of the workstations and the other type analyzes the data that is collected. Data is collected by a workstation designated to be the collection workstation. The collection workstation can be any workstation so designated and can include the host or client workstation. The data collected includes the attributes of the files or directories located on the individual workstations. The attributes include the type of file, mode or protection of the file, number of links, owner and group that the file belongs to, the date, the size, and the checksum. Other attributes can also be used. As used hereinafter, "files" is defined to include files, directories, and software or any other collection of data having identifiable attributes.

Inv_collect is the attribute collection utility used in the present invention. It is similar to a ls–lR command in UNIX except that it collects more data and it treats symbolic links to directories as if the symbolic link is a directory and includes the checksum of the file. The inv_collect is run by an execute command in the workgroup organized network manager. It sets up the input for an inv_prog utility, runs the inv_prog utility, and sends output and error messages from inv_prog back to the workgroup host.

The inv_collect utility requires that a directory, -h host_directory, be created to receive the attributes collected by the inv_collect utility. This utility optionally includes a list, -d d_list, be created to identify the complete path names of directories and files that should be excluded from the data collection process. The inv_collect utility includes the option of preventing inv_collect from using symbolic links to find data. The parameters path1 path2 etc. indicate the point where a search begins. The path names can be either directories or files. More than one path can be given. In the present invention, this information is written as:

```
inv_collect -h host_directory [-d d_list] [-1]
    path1 path2 . . .
```

Figure 13:
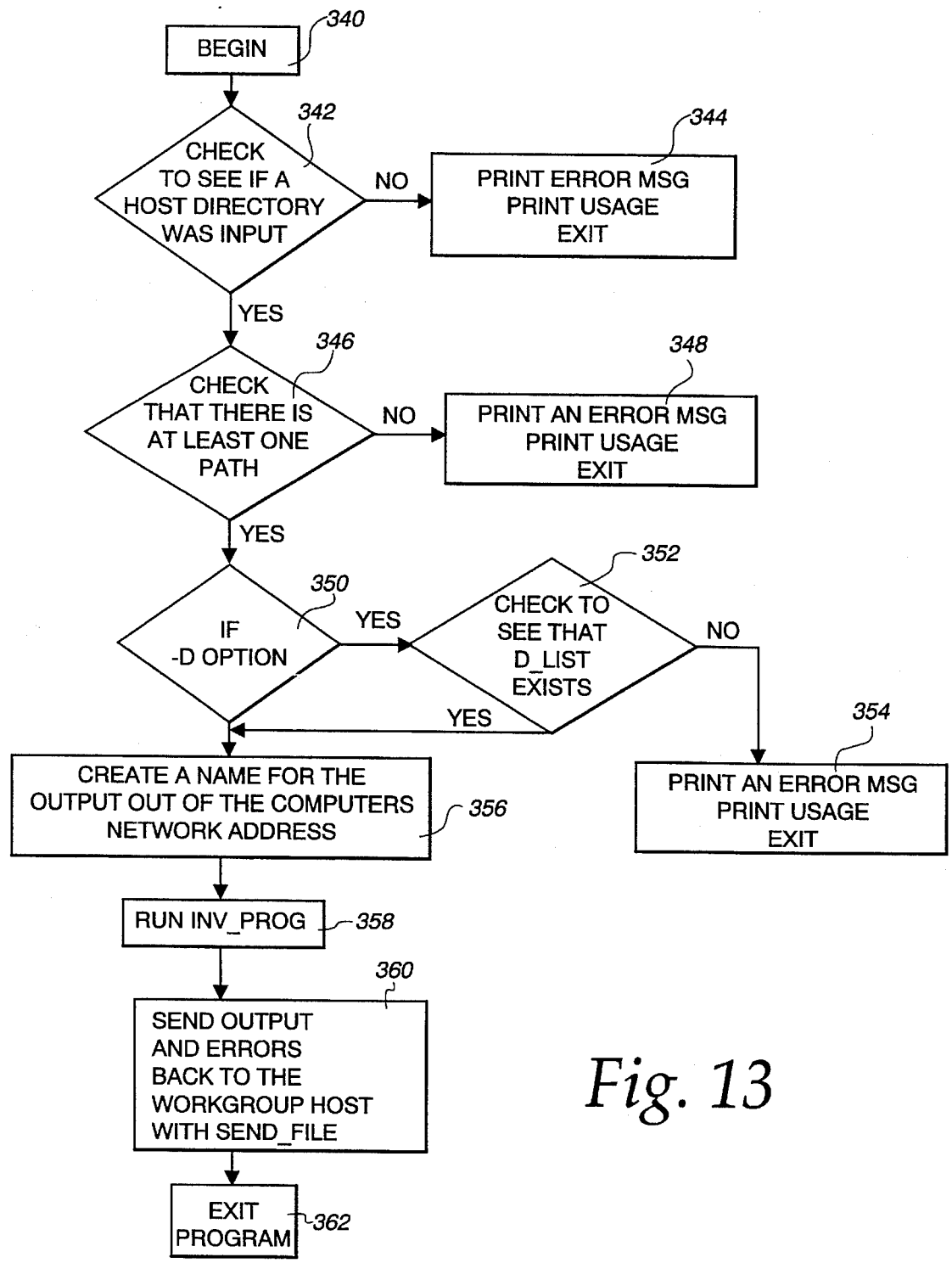
FIG. 13 is a flow diagram of an inventory collect program for collecting attribute data of files and directories.

FIG. 13 is a flow chart illustrating the operation of the inv_collect utility. The inv_collect utility begins at block 340.

At step 342, a check is made to determine whether a host directory has been input. The host directory is created prior to executing the inv_collect command and receives output and error messages from inventory program (inv_prog) to be described later. If not, an error message is printed at step 344 including the proper usage of the inv_collect command and then the program exits. At step 346, a check is made to determine whether or not at least one path has been specified. If a path has not been specified at 346, at block 348, an error message is printed, and the program exits. If there has been at least one path specified in step 346, at step 350, a check is made to determine if the -d option has been selected. As previously stated, the -d option indicates which files are to be deleted from the collection process. If the -d option has been selected, the routine proceeds to step 352 to make certain that a d_list exists. If a d_list does not exist, at step 354, an error message is again printed, and the program exits. If, however, at step 352, the d_list does exist, then, at step 356, a name of a workstation file is selected for the output. The workstation file is a file established to hold the records describing all the attributes of the files contained on a single workstation. The workstation file is given a unique name created out of the workstation's network address. This file will contain the attributes of files existing on a particular workstation.

Once step 356 has been completed, step 358 begins by running an inventory program. The inventory program is similar to a standard program which can be found in the following book: The C Programming Language by Kerningham and Ritchie, 2nd edition, published by Prentice-Hall, ©1988 modified to follow symbolic links and to compute the checksum of the file, as would be understood by one skilled in the art. Other derived attributes such as a cyclic redundancy check can also be used. The inventory program, at step 358, collects the attributes from the various files which are located on the workstations which have previously been selected. Once the inventory program is completed at step 360, the output and any errors are sent back to the work group host with the program send file. Send_file is a simple utility that sends files from a client computer to its host. The output and errors, which have been gathered by inventory program at step 358, are sent back to the host computer and saved in the directory that has been previously specified with the -h parameter host_directory.

The output of inventory collect is arranged in certain fields. The fields are as follows: device number, inode number, type of file (d=directory, -=regular, l=symbolic link, p=pipe, b=block special, c=character special and s=socket), mode of file, number of links, owner, group, size in bytes, date in seconds, since 00:00:00 Greenwich mean time, Jan. 1, 1970, checksum and path name. Data in this format is used by the analysis programs, comp_station and comp_model routines, in the present invention to determine similarities and differences between specified workstations. At step 362, the inventory collect program is exited.

Figure 14:
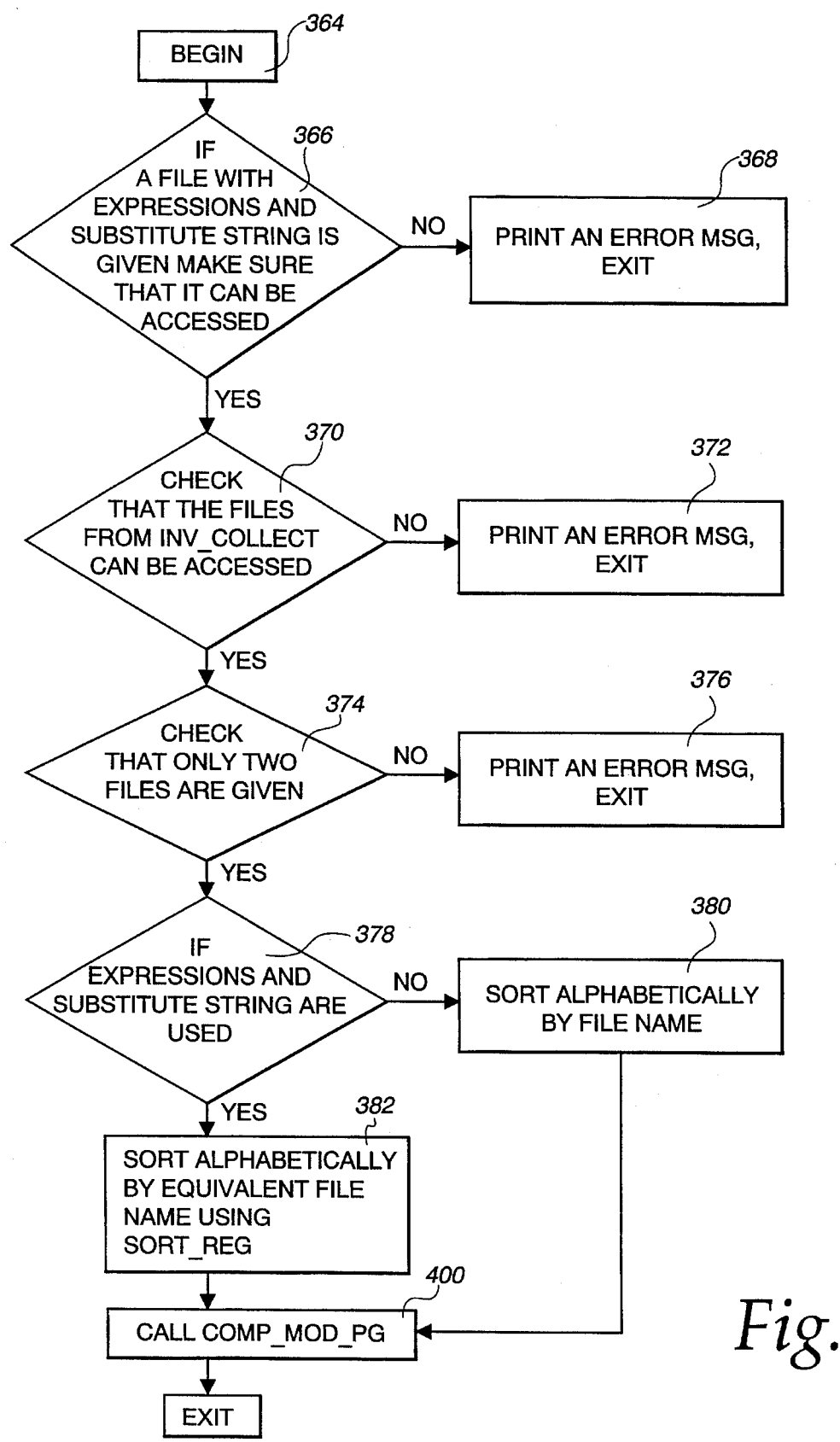
FIG. 14 is a flow diagram of a compare model program for comparing files located on a model workstation to a target workstation.

The comp_model program is illustrated in FIG. 14. The comp_model program uses data from the inventory collect routine. The comp_model program is used to compare the data collected from two workstations. Typically, one of the workstations is considered to be a model workstation and includes all the proper files, directories and software without any errors. The other workstation, to which the model workstation is to be compared, is called a target workstation. The target workstation is a workstation which the operator is checking to determine whether or not it is set up properly and operating correctly. Consequently, once the comp_model program has been completed, any differences between the two workstations indicate specific areas where problems may exist on the target workstation.

The comp_model program compares attributes of files, directories, and software common to the two computers. The attributes of one file, directory, or software are contained in a record. A report is generated based on a comparison of records indicating which files are missing from the target workstation. The report also indicates files that are extra on the target workstation and files that may have the same content on the model workstation. Finally, files with the same or equivalent names that have different attributes are also shown.

The comp_model program includes the means to define names of files that are equivalent and to compare the attributes of those files. An operator sets up the equivalence by constructing pairs of expressions and substitute strings. If the comp_model program finds a string in a file name that matches the expression, then the string is replaced with the substitute string to produce an equivalent name.

The comp_model program begins at block 364 of FIG. 14. At step 366, a check is made to determine whether or not a given file with expressions and substitute strings can be accessed. This file is an option and need not be specified. If this file cannot be accessed, at step 368, an error message is printed and the program exits. If, however, this file can be accessed, at step 370, a check is made to determine that the files from the inv_collect program can be accessed by the operator. If these files from the inventory program cannot be accessed, at step 372, an error message is printed and the program exits. If, however, the files which are collected by the inv_collect program can be accessed, at step 374, a check is made to determine that only two workstation files are given. Each workstation file corresponds to one workstation and includes the attributes of the files contained therein. If two workstation files are not given, however, at block 376, an error message is printed and the program exits.

If only two workstation files are given, as determined at step 374, step 378 checks to determine whether or not expressions and substitute strings are used for the files contained in the workstation file. If expressions and substitute strings are not used, then the files are sorted alphabetically by file name at step 380. Sorting files alphabetically by file name prepares the files for comparison so that the files from the model work station can be compared to the target work station. If, however, expressions and substitute strings are used, at step 382 a different type of sort routine is used which sorts alphabetically by equivalent file name. This sort routine is called sort_reg. Sort_reg is a short subroutine using the standard C language routine qsort, which uses comp_reg for comparison. Comp_reg compares equivalent file names rather than the file name itself. The equivalent file names are compared alphabetically. Once the files have been sorted alphabetically, either by equivalent file name using sort_reg or sorted alphabetically by file name if no equivalent file names are used, a program called compare model program (comp_model_pg) is called at step 400.

Figure 15A:
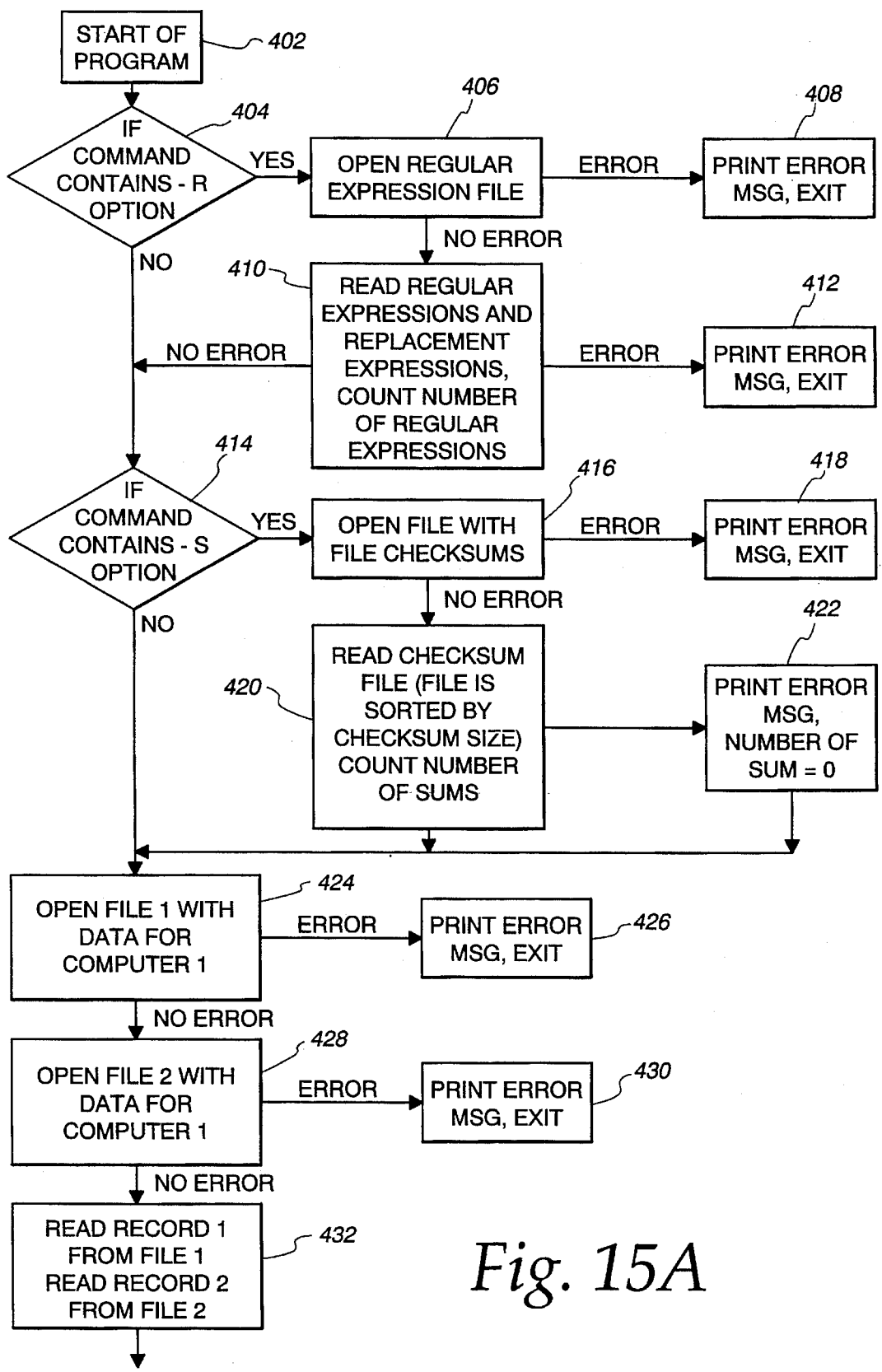
FIGS. 15A and 15B are a flow diagram of subroutine of the compare model program of FIG. 14 for determining similarities and differences between files located on a model workstation and a target workstation.
Figure 15B:
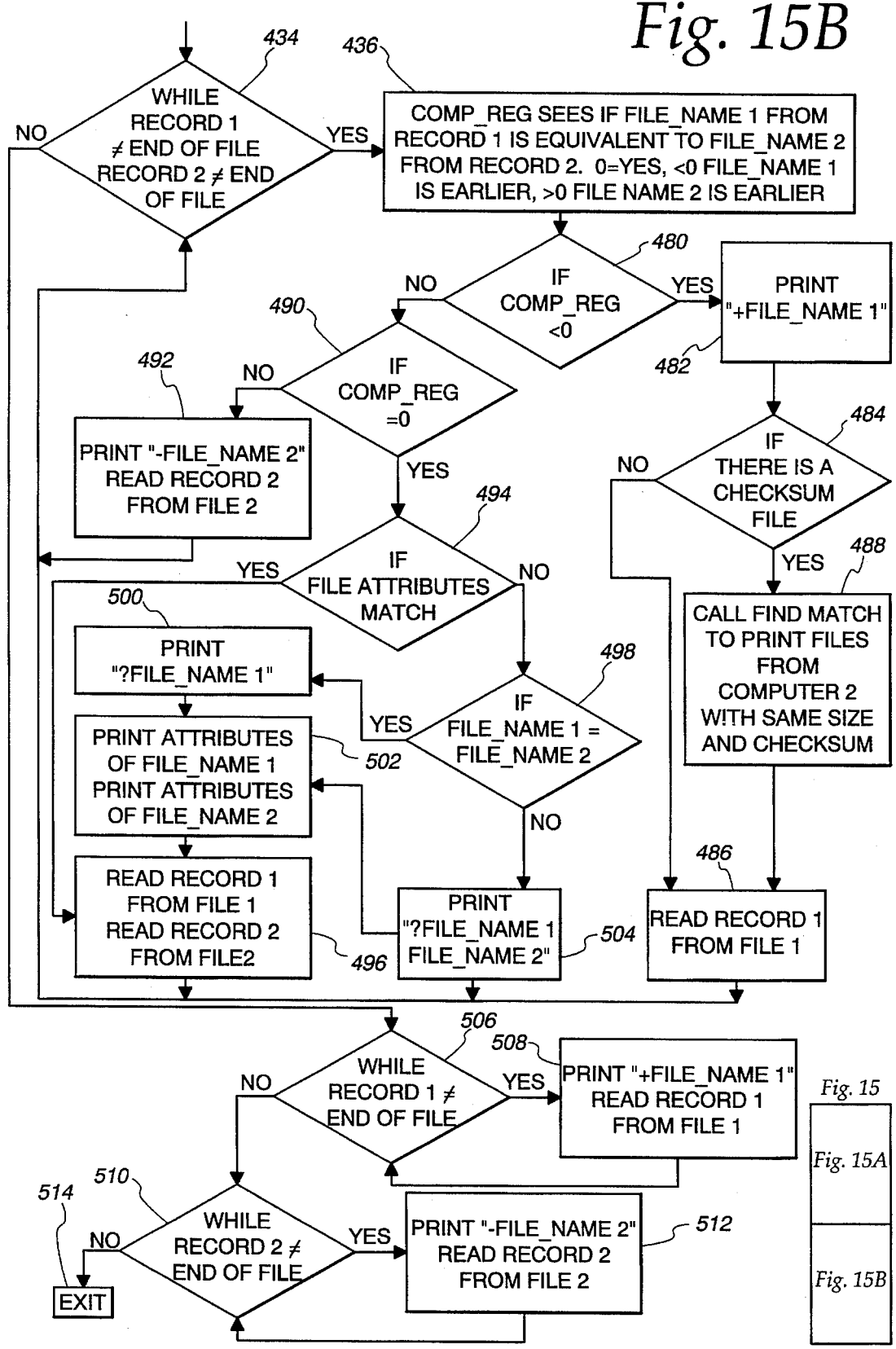

The compare model program 400 is shown in FIGS. 15A and 15B. The inputs for the comp_model program are the workstation file for the target computer which contains the record of attributes for each file, including names of each of the files. The files must be sorted alphabetically either by a sort routine, sort reg or another sort routine. Another input for the comp_model program is the workstation file for the model computer with records containing the attribute files located there. This workstation file must also be sorted by the sort_reg subroutine or some other sorting routine. If the sort_reg subroutine sorted the records based on a group of expressions in substitute strings, then a file with those expressions and strings must also be input to the comp_model program. Optionally, a checksum/size file derived from the workstation file for the model computer can exist which contains records with the size, checksum and name of the files. This checksum/size file is sorted by checksum and size.

The comp_model program compares attributes of the files, including attributes that reflect the file content and directories on the two computers. The comp_model program produces a report of files that are missing from the target computer. If a file is extra on the target, then files that may have the same content on the model are listed. In addition, files with the same or equivalent names but having different attributes are also listed. Comp_model can check files with equivalent names. Users set up equivalents by constructing pairs of expressions and substitute strings. If comp_model, as seen in FIG. 14, finds a string in a file name that matches the expression, then it is replaced with the substitute string.

As previously stated, the comp_model routine compares the files on a target station to the files on a model station. The files on the model station are assumed to be correct. Deviation from these files and directories are noted in the output of the comp_model routine. Comp_model checks for deviations based on size, checksum, owner, group, number of links and mode. It does not check for differences in the dates of the files but such a check is within the scope of the invention. Comp_model also notes files that are missing from the target station and files that are extra on the target station.

The comp_model subroutine includes two options. The first option being a -r regular list option. The -r option is used to compare files with different names. Each record listed in the file regular list (reg_list) contains a regular expression and a sub-stitute string. Comp_model looks for the regular expression in the complete path name of each file. If the regular expression matches part of the path name, then the substitute string replaces the match part during comparisons with other file names. The other option available is -s containing sizes, checksums and file name for files on the model computer. Fields are separated by tabs or blanks. The inputs to the comp model routine are the -r regular list, the -s option, the target file and the model file, an output of inventory collect, each containing lists of files and attributes for the target and model workstations, respectively.

Returning now to FIG. 15A, the start of the comp model program begins at block 402. A check is made to determine if the command contains the -r option at step 404. If it does contain the -r option at step 404, the routine opens a regular expression file at step 406. If there is an error, however, an error message is printed and the program exits to the calling program at step 408. If, however, there is no error at step 406, the program continues to step 410. Step 410 reads the regular expressions and the replacement expressions, and counts the number of regular expressions. If there is an error during this particular portion of the routine, an error message is printed and the program exits at step 412. If, however, there is no error at step 410, the program continues to step 414.

Step 414 determines whether or not the command contains the -s option. If it does contain the -s option, a checksum/size file is opened at step 416 containing file sizes, checksums, and file names. This file is sorted first by file size and then by checksum. Again, if there is an error at step 418, an error message is printed and the routine exits. If, however, there is no error, at step 420, the checksum/size file is read. This file, having been sorted by checksum and size, is used to locate files which may be the same file but have different names. A count of the number of sums is made. If an error occurs, at step 422, an error message is printed. Once either step 420 or step 422 has been completed, the program continues to step 424, in which a file 1 is opened to contain the data for a computer 1 or the target computer. If there is an error, however, it will be printed at step 426 and the program exits. If no error occurs, a file 2 is opened with data for computer 2 or model computer at step 428. Again, an error message is printed at step 430 if there is an error, and the subroutine exits. If no error occurs at step 428, record 1 from file 1 and record 2 from file 2 are read by the subroutine at step 432.

Referring now to FIG. 15B, a check is made to determine if the end of file 1 or file 2 has been reached. If it is determined at step 434 that file 1 is not at the end of file and file 2 is not at the end of file, then the program continues to step 436. At step 436, the subroutine compares file names, determines whether or not file name 1 from file 1 is equivalent to file name 2 from record 2 by calling a compare regular expression subroutine (comp_reg).

Figure 16:
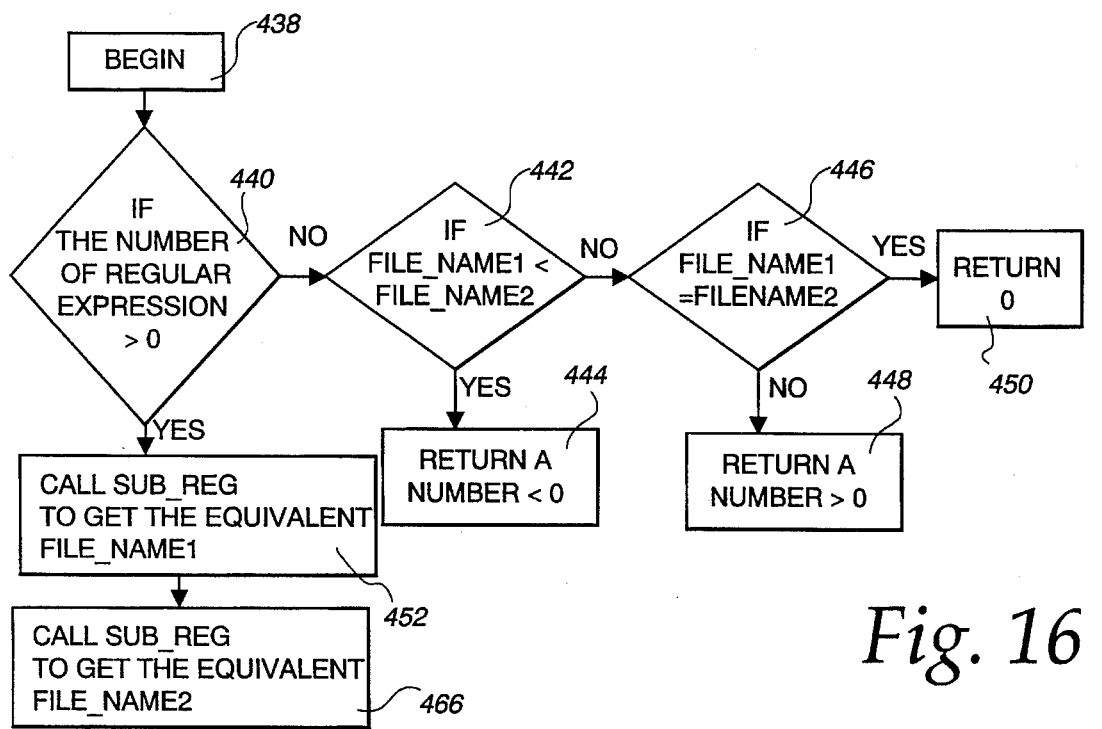
FIG. 16 is a flow diagram of a subroutine for determining whether file names have substitute or equivalent expressions.

The compare regular subroutine is illustrated in FIG. 16. The compare regular subroutine compares two file names. This particular subroutine first produces equivalent file names by calling a subroutine regular (sub_reg) subroutine illustrated in FIG. 17. The subroutine sub_reg matches parts of the file name with expressions. The expressions contain characters that must be matched or other symbols and syntax that represent choices of characters to match. If a matching string is found, it is replaced in the file name with an alternative string of characters. For example, if the matching expression is/usr*/and the alternative expression is /usr/, then the file name /usr2/abc is changed to /usr/abc.

As seen in FIG. 16, the subroutine compare_reg begins at step 438. At step 440, the subroutine determines whether or not the number of regular expressions is greater than zero. If the number of regular expressions is not greater than zero, then at step 442, a check is determined to see whether or not file name 1 is less than file name 2, that is, does file name 1 precede file name 2 alphabetically. If yes, at step 444, a number less than zero is returned to step 436 of FIG. 15B. If, however, file name 1 is not less than file name 2, then at step 446, a check is made to determine whether or not file name 1 is equal to file name 2. If they are not equal, the program returns to step 436 at FIG. 15B, a number greater than zero, shown by step 448, indicating file name 1, follows file name 2 alphabetically. If file name 1 equals file name 2, step 450 returns a zero to step 436.

If it is determined at step 440 that there are regular expressions, then the subroutine sub_reg is called to get the equivalent file name for file_name 1 at step 452.

Figure 17:
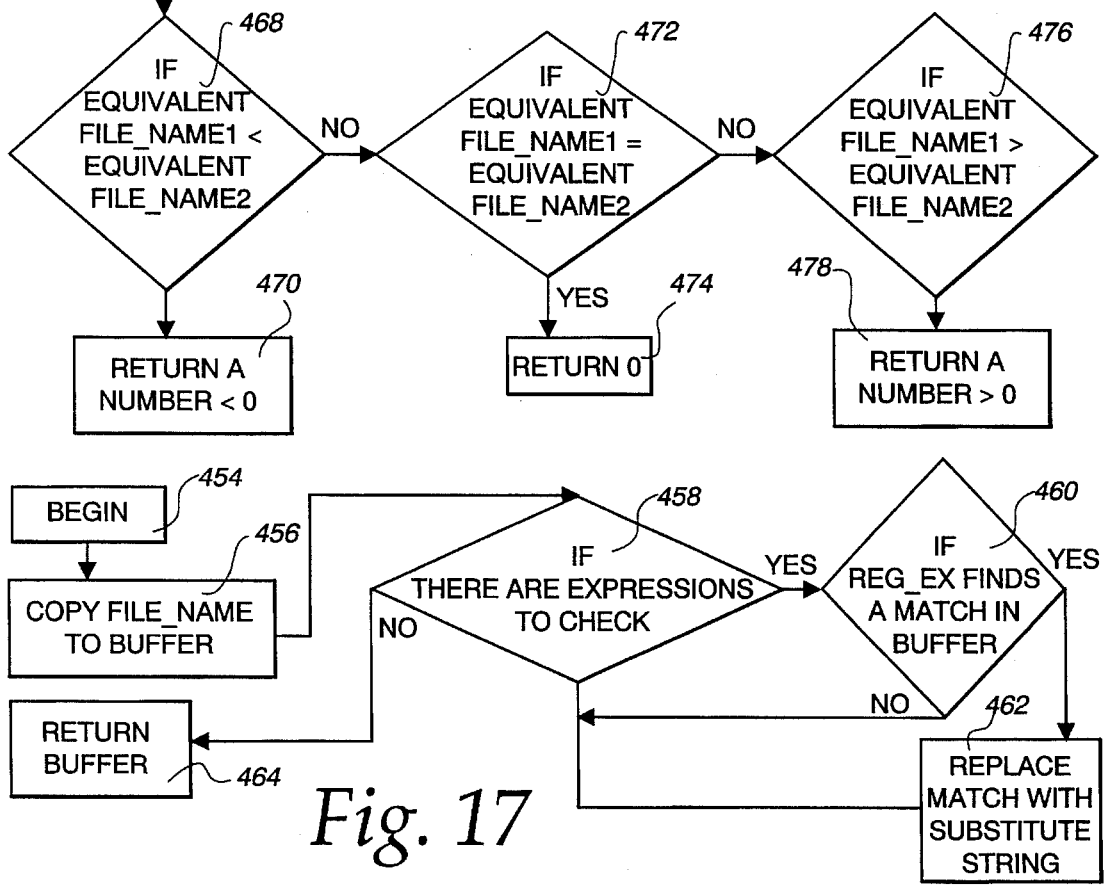
FIG. 17 is a flow diagram of a subroutine for replacing regular file names with substitute or equivalent expressions.

The subroutine substitute regular begins at step 454 of FIG. 17. At step 456, the file name is copied to a file buffer. At step 458, a check is made to determine whether or not there are any expressions to check which were read in at step 410 of FIG. 15A. If there are expressions to check, the routine continues to step 460, in which reg_ex looks for a string in the buffer that matches the expression. If there is a match, the matching characters are replaced with a substitute string at step 462. If there is not a match, the routine continues back to step 458 to see if there are additional expressions to check. If a match is found and is replaced with the substitute string at 462, the routine continues back to step 458 to look for any additional expressions to check. If there are no expressions to check, the routine at step 464 returns the equivalent file_name 1 to step 452 of FIG. 16.

At step 466, the substitute regular subroutine is called again to get the equivalent file name for file_name 2. The routine in FIG. 17 proceeds as it did before with step 452. Once equivalent file names have been found for the names in file_name 1 and file_name 2, the routine in FIG. 16 continues at step 468 and compares equivalent file names from file_name 1 to equivalent file_names from file_name 2. If equivalent file_name 1 is less than equivalent file_name 2, a number less than zero is returned to step 436 of FIG. 15B, as shown in FIG. 16 at step 470. If equivalent file_name 1 is not less than equivalent file_name 2, a check is made at step 472 to determine if equivalent file_name 1 is equal to equivalent file name_2. If they are equal, a zero is returned at step 474 to step 436 of FIG. 15B. If they are not equal, as determined at step 476, a number greater than zero is returned to the call in routine at step 478.

Returning now to FIG. 15B, once file name equivalence has been determined at step 436, and the numbers have been returned to this program to indicate whether equivalent file_name 1 is equivalent to file_name 2, equivalent file_name 1 comes before equivalent file_name 2, or equivalent file_name 1 comes after equivalent file_name 2. At step 480, if it is determined that the value returned to the comp_reg at 436 is less than zero, then "+file_name 1" is printed at step 482. This indicates that file_name 2 follows file_name 1 alphabetically and that an extra file exists on the target workstation. If "+file_name 1" is printed at step 482, the routine continues to step 484 to check whether or not there is a checksum file. If there is not a checksum file, at step 486, a new record 1 is read from file 1 and the routine returns to step 434 to check whether or not the end of file has been reached. If, however, there is a checksum file, at step 488, the routine find_match is called to print the names of the files from computer 2 that have the same size and checksum. This check is made to point out which files may have the same content but which have been named differently. Once this has been completed, a new record 1 is read from file 1 at step 486, and again we return to step 434 to check for the end of file.

If it is determined at step 480 that the comp_reg subroutine returns a value not less than zero, then at step 490, a check is made to determine if the comp_reg value is equal to zero. If it is not equal to zero, "-file name 2" is printed at step 492 and a new record 2 is read from file 2. "-file name 2" indicates a file is missing from the target computer. Once record 2 has been read from file 2, the routine returns to step 434 to determine whether or not the end of file has been reached. If, however, at step 490 the comp_reg value is equal to zero, at step 494, a check is made to determine if the attributes of the files having equivalent file names are different. If it is found that the file attributes do match, a new record 1 is read from file 1 and a new record 2 is read from file 2 at step 496. Once file 1 and file 2 have been read, the routine returns to step 434 to see if an end of file has been reached. If, however, it is determined at step 494 that the file attributes don't match, then at step 498, a check is made to determine if file_name 1 equals file_name 2. If file_name 1 does equal file_name 2, at step 500, "? file name 1" is printed and then at step 502, the attributes of file_name 1 and the attributes of file_name 2 are printed. At step 496, a new record 1 is read from file 1 and a new record 2 is read from file 2. If, however, it is determined that file name 1 does not equal file name 2 at step 498, then at step 504, "? file name 1 file name 2" is printed, indicating the equivalent file names were equal. Once printed, the routine goes to step 502 where the attributes of file_name 1 and file_name 2 are printed, and on to step 496 where a new record 1 is read from file 1 and a new record 2 is read from file 2. Once this has been completed, the routine continues to step 434 to determine if there is an end of file.

If it is found that file 1 does equal the end of file or record 2 does equal the end of file, the routine continues to step 506, which determines whether or not file 1 does not equal the end of file. At step 508, the subroutine prints "+file_name 1" to indicate extra files on the target workstation, and reads record 1 from file 1. Once the positive sign has been printed in front of the file name and a new record 1 has been read from file 1 at step 508, the routine returns to step 506 to determine whether or not record 1 does not equal the end of file. If record 1 does equal the end of file at step 506, then we continue to step 510, which checks to see whether or not record 2 does not equal the end of file. If it is not the end of file, at step 512, a negative sign is printed in front of file_name 2 to indicate files missing from the target and record 2 is read from file 2. Once printed, the routine returns to step 510 and continues to print a negative sign in front of the file names satisfying step 510. Once the end of the file is found, the program exits at step 514.

The present invention also includes a means for comparing a plurality of workstations at a time. A program entitled "compare station" takes the data from inventory collect on a number of computers and prepares it for a program called "compare station program." The compare station program looks for discrepancies between files existing on more than one computer. Compare station program compares the attributes of files on a number of computers and produces a report on files whose names are equal or equivalent. The report consists of two files, an index file and a data file. The index file contains a list of the files that have differences in their attributes. The data file contains a record for each computer with a file or equivalent file listed. The record contains all of the file attributes, the file name and the station name. The type of discrepancies compare station checks for depends on certain options which are used. The default is that compare station checks for all discrepancies, except for modify date. The following command illustrates how compare station is executed in the present invention:

usage: comp_sta[cmtogld]-r r_list sta_list index_file

The -c option checks for content differences by comparing the size and the checksum. The -d option checks for differences in the modify date. The check is to the second. The -g option checks for differences in the group. The -l option checks for differences in the number of links. The -m option checks for differences in the mode. The -o option checks for differences in the owner and the -t option checks for differences in the type. Of course, other options can also be included, as would be understood by those skilled in the art.

The argument -r reg_list is used to compare files with different names. Each record in the file reg_list contains a regular expression and a substitute string. Compare station looks for the regular expression in the complete path name of each file. If the regular expression matches part of the path name, then the substitute string replaces the match part during comparisons with other file names. The regular expressions used must follow the syntax of UNIX's regcmp utility. The argument sta_list is a file containing one record for every station that is to be compared. Each record has two fields. The first field is the name of the station, the second field is the name of the file that contains the input data for the station. The fields should be separated by tabs or blanks. The argument index_file is an output file that will contain a list of all the files that have a discrepancy. It is useful as an index into the output from comp_sta.

Figure 18:
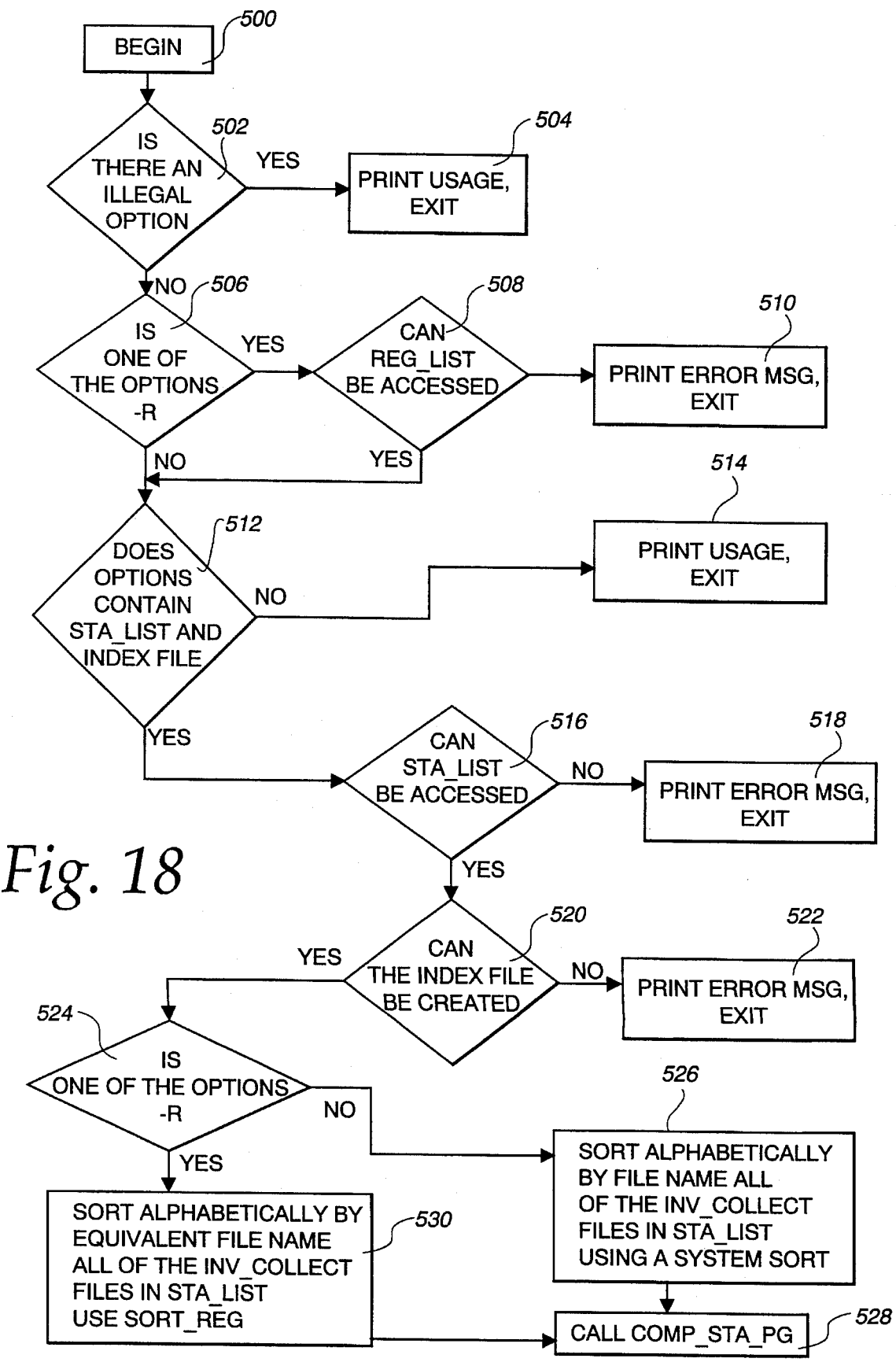
FIG. 18 is a flow diagram of a compare station program for comparing the files located on a number of computer workstations.

The program compare station is illustrated in FIG. 18 and begins at step 500. The program compare station initially checks to determine whether or not there is an illegal option at step 502. If there is, the usage is printed and the program exits at step 504. If there is no illegal option, at step 506, a check is made to determine if one of the options is -r. If one of the options is -r, at step 508, a check is made to determine whether or not the files listed in reg_list can be accessed. If they cannot be accessed, at step 510, an error message is printed and the program exits. If, however, they can be accessed, at step 512, a check is made to determine whether or not the options include a sta_list file and in an index file. If they do not, the usage is printed at step 514 and the program exits. If, however, the options do contain a sta_list file and an index file, at step 516, a check is made to determine whether or not a sta_list file can be accessed. If it cannot, at step 518, an error message is printed and the program exits. If, however, it can be accessed, at step 520, a check is made to determine if the index file can be created. If not, an error message is printed at step 522 and the program exits. If the index file can be created, at step 524, a check again is made to determine if one of the options is -r. If it is not -r, then at step 526, all of the files found in sta_list which have been collected by the inventory collect program are sorted alphabetically by file name, using a system sort.

Figure 19A:
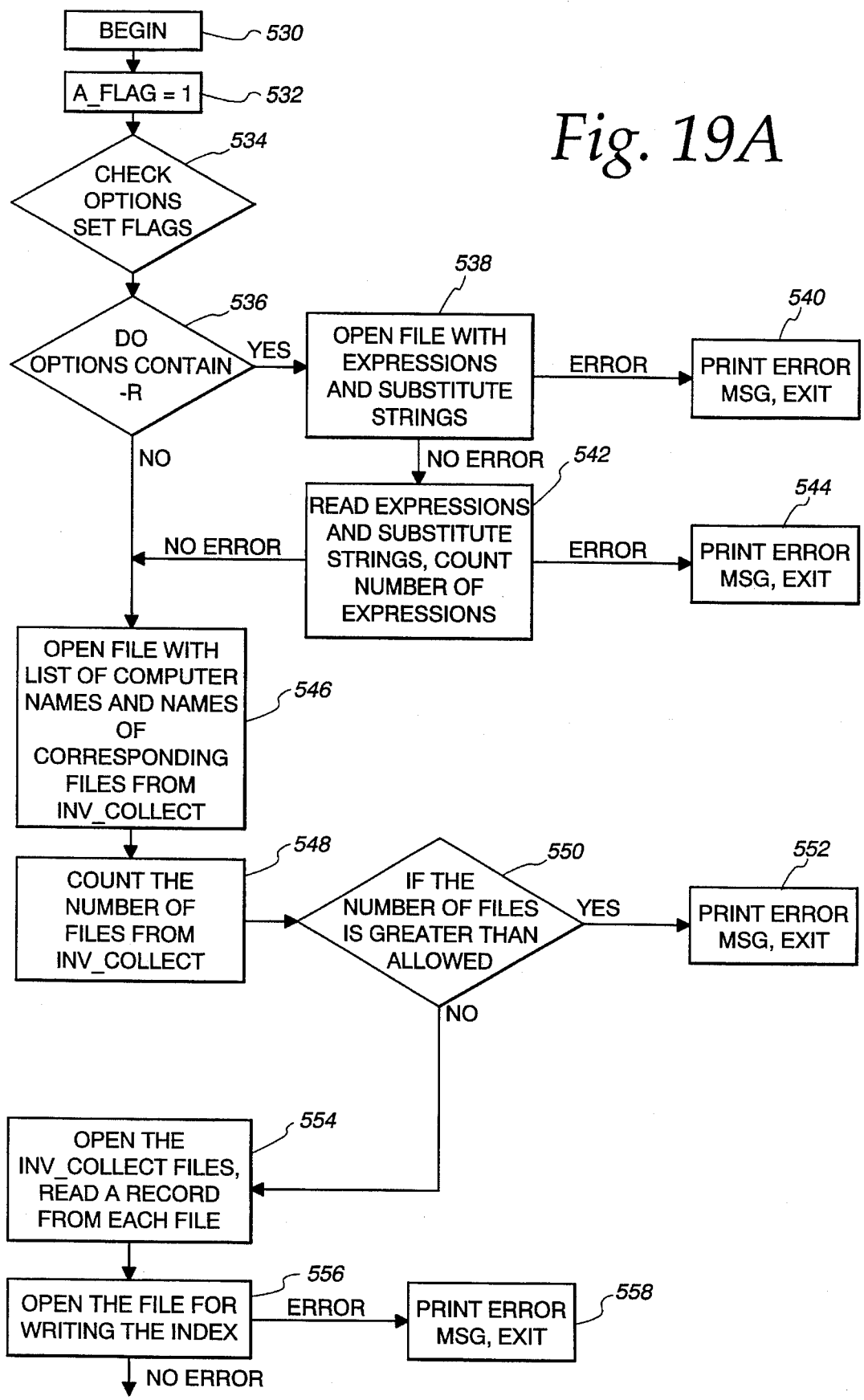
FIGS. 19A, 19B and 19C are a flow diagram of subroutine of the compare station program of FIG. 18 for determining similarities and differences between the files located on a number of computer workstations.
Figure 19B:
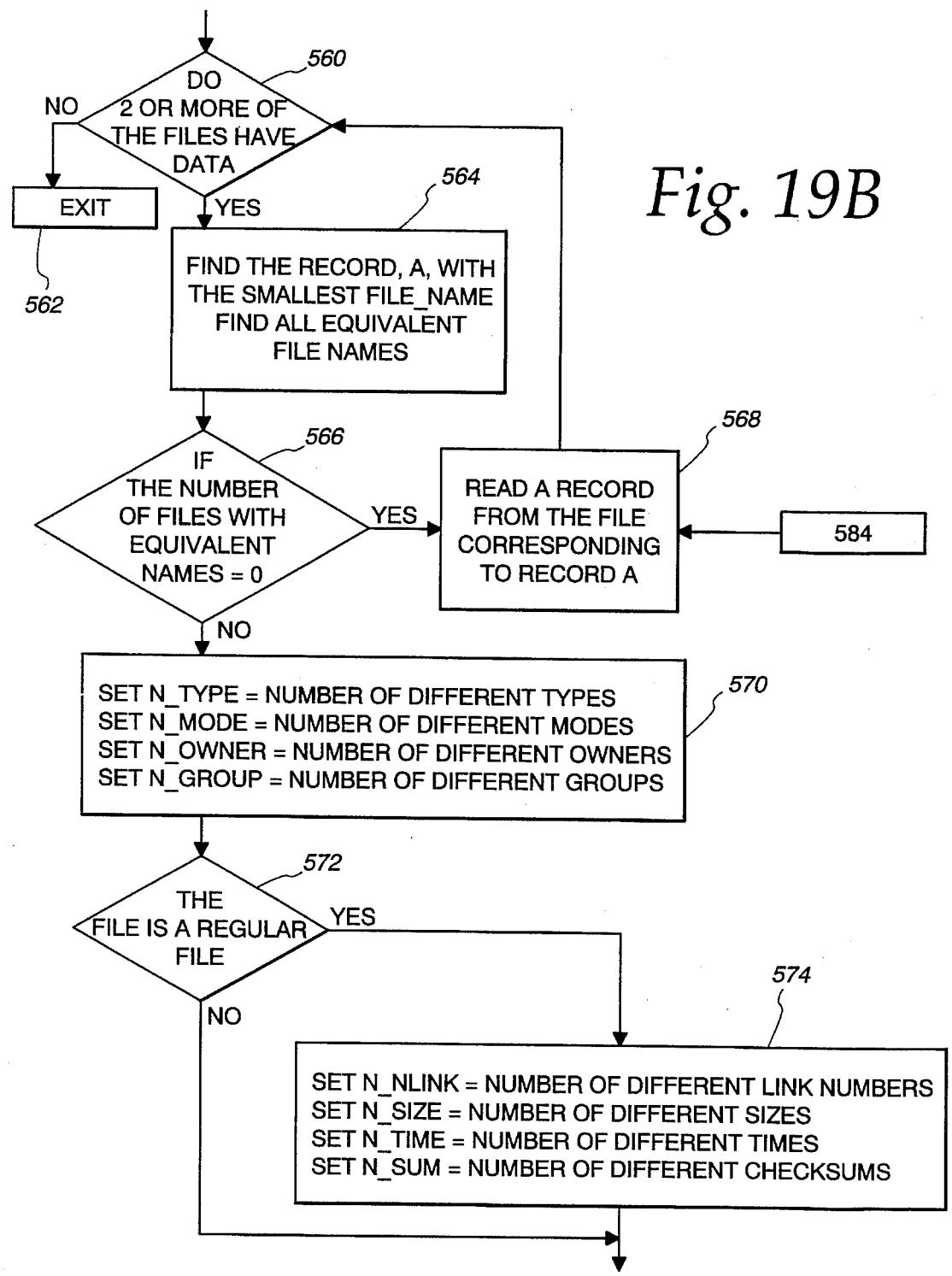
Figures 19, 19A, 19B, 19C:
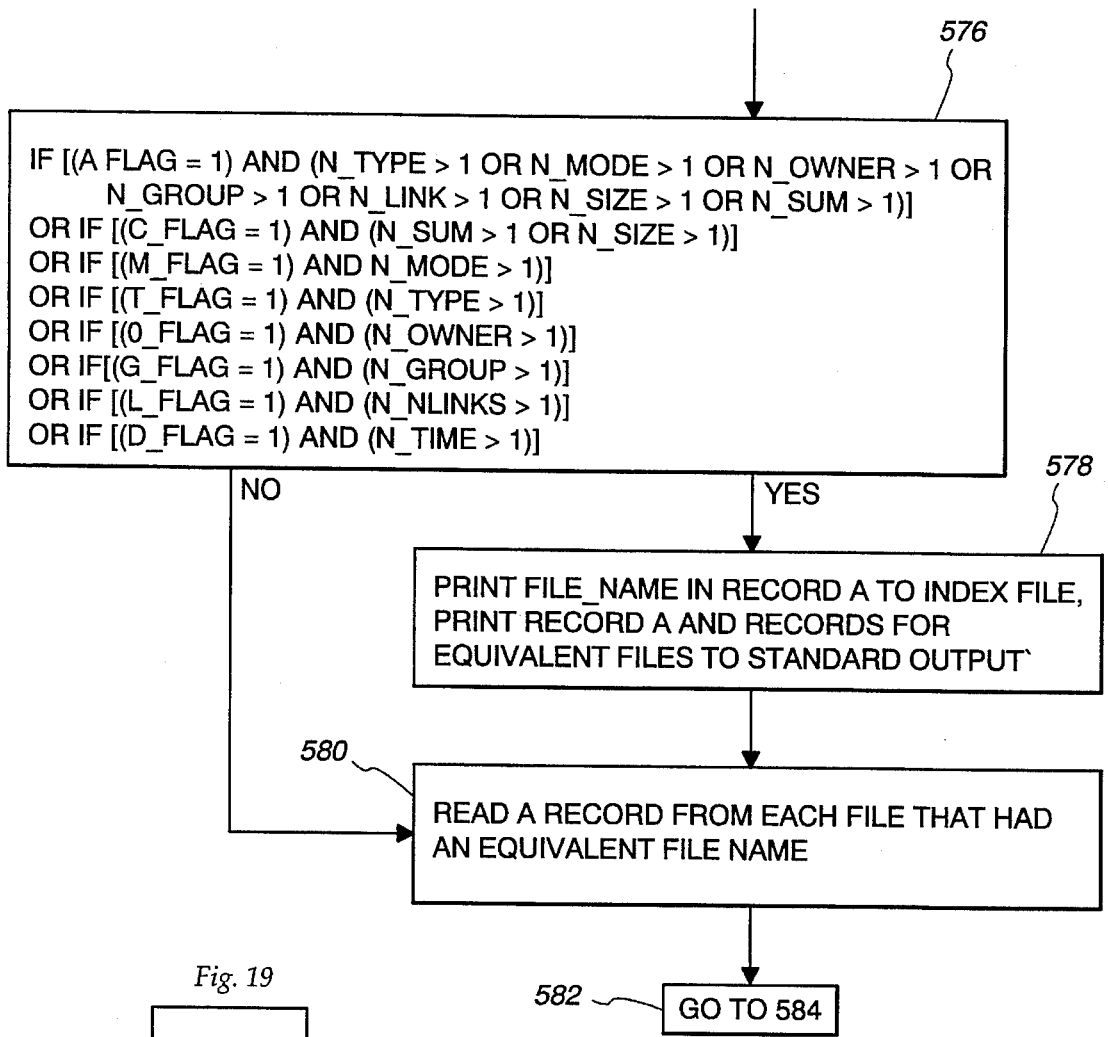

Once the sort has been completed and the files are in alphabetical order, at step 528, the program compare station program (comp_sta_pg) is called and is discussed with reference to FIG. 19. If, however, at step 524, it is determined that one of the options is -r, then all the files appearing in sta_list which have been collected by the inventory collect program are sorted alphabetically by equivalent file name, at step 530, using the previously described program sort regular (sort_reg). Once these files have been sorted, the program proceeds to step 528, where the subroutine compare station program is called.

The subroutine compare station program compares the inventory collect program output from many computers. The program compares the attributes of files that have the same or equivalent names on more than one computer. If there is a difference in any attributes, then the complete record for every computer with that file, is printed. Options to compare station allow checking for specific attributes. The compare station program is illustrated in FIGS. 19A, 19B and 19C. The program begins at step 530, and at step 532 an a_flag is set to 1. Setting the a_flag to 1 means that all options will be set except the -d option. This is the default mode. At step 534, each of the options previously described are checked to see if they have been set and appropriate flags are set. The options c, m, t, o, g, l and d are checked. If any of these options is set, the a_flag is set to zero. For instance, if the c option is specified, then a c_flag is set to 1 and the a_flag is reset to zero, indicating that there is no default mode. Likewise, if the -m option is set, an m_flag is set to 1 and the a_flag is set to zero. Once these options have been checked and the appropriate flags set at step 534, at step 536 the -r option is checked.

If the -r option has been set, at step 538 a file is opened for reading in expressions and substitute strings. In addition, if any error is detected, an error message is printed at step 540 and the program exits. However, if there is no error at step 538, the expressions, as well as the substitute strings, are read into appropriate arrays set up by the program, and the number of expressions are counted at step 542. Again, if an error is detected, an error message is printed at step 544 and the program exits.

Once the expressions and substitute strings have been read and the number of expressions has been counted, and no errors have occurred, at step 546 a file is opened containing a list of computer names and names of corresponding files which have been collected by the inventory collect program. At step 548, the number of files are counted which have been received from the inventory collect program. Once the files have been counted, the number of files is checked to make certain that the number of files does not exceed the number that is allowed, which, in the current case, is 121 files. Of course, this number can be changed, depending upon the number of workstations to be examined, and the amount of memory space available and the comparison techniques used. If the number of files is greater than that allowed, an error message is printed at step 552 and the program exits. If, however, the number of files is not greater than that allowed, then the inventory collect files are opened and a record is read from each file, at step 554.

At step 556, an index file is opened for writing the index. If an error occurs at this step, an error message is printed at step 558, and the program exits. If, however, there is no error in opening the file for writing the index at step 556, at step 560, found on FIG. 19B, a check is made to determine if two or more of the files have data. This check is made to determine if there are any files left on the various computer workstations, so that comparisons between computer workstations can continue. If there are not two or more files having data, the program exits at step 562. If, however, two or more of the files do have data, at step 564, all of the files relating to the various computer workstations, which have previously been put in alphabetical order, are searched to determine record A, the record with the smallest equivalent file name; in addition, any records with equal or equivalent file names are determined.

At step 556, a check is made to determine if the number of files with equivalent file names is equal to zero. If the number of files with equivalent names is equal to zero, then at step 568 a record is read from the file that record A came from. At this point, the program returns to step 560, to determine if two or more of the files have data, thereby indicating that the comparison should proceed. If, however, at step 566, the number of files with equivalent names does not equal zero, then at step 570, a number of variables are set according to comparisons made between the attributes of each of the files with equivalent file names.

As shown in step 570, four types of variables are calculated based on a comparison of file attributes. These are n_type, n_mode, n_owner, and n_group. At this point, a comparison is made between each of the records having the same file names or equivalent file names, to determine if any of these files have different types, different modes, different owners, or different groups. If any are different, then the number of differences is counted and the value is set to the appropriate variable. For instance, if two of the records have the same file name, but one record is for one owner and the other record is for a different owner, a comparison between the owners indicates that there are two different owners. In this case, the variable n_owner will be set to 2. Once the comparisons have been made and the variables have been set at step 570, at step 572 a check is made to determine if the file is a regular file.

If the file is a regular file, then at step 574, four additional variables are calculated based on a comparison of file attributes. These are n_link (the number of links), n_size (the number of different sizes), n_time (the number of different modify times), and the n_sum (the number of different checksums). As in step 570, the attributes of each of the records having the same file name or equivalent file names, are compared with one another. If these attributes are found to be different, the number of differences is counted and is set to the appropriate variable. For instance, if two records exist and have different modify times, this will be counted as 2 and the variable set n_time will be set equal to the number 2. Once the variables in step 574 have been set, or if at step 572, it is determined that the file is not a regular file, step 576, shown in FIG. 19C, is completed.

As shown here, in step 576, each of the flags, the a_flag, the c_flag, the m_flag, the t_flag, the o_flag, the g_flag, the l_flag, and the d_flag, are checked to determine if they have been previously set to a value equal to one. Once it has been determined which flag has been set, then at that point the appropriate checks are made to determine which attributes are different between the files. For instance, if the a_flag has been set to 1, this indicates that all of the attributes are to be compared. As shown, if the a_flag has been set to 1, and if the attributes of type, mode, owner, group, link, size, or sum, have been found to be greater than 1, then at step 578, the file name in record A will be printed to the index file, record A will be printed, and records for equivalent files will also be printed, to the standard output. Likewise, if the a_flag was not set, but any of the other remaining flags were set, a check for that particular attribute is made, and if the numbers for those attributes showing differences are greater than 1, then they likewise will be printed, as dictated at step 578. If, however, no differences are found in step 576, at step 580, a record is read from each file that has an equivalent file name. Once the record has been read from each file that has an equivalent file name, then the program, at step 582, will return to step 584, found in FIG. 19B.

Step 584 returns the program to step 568, where a new record from the file corresponding to record A is read, and then each of these records are compared as before to determine file equivalence.

The present invention also includes a means for automatically updating any files on the target workstation which have been found to have discrepancies. A make program program (make_prog) uses output from the compare model program, to create a new program for the workgroup organized network manager. This new program changes the files on the target computer to match the files on the model computer. The make program program is not, however, limited to use with the workgroup organized network manager, but can be used in other applications. In particular, when used with the workgroup organized network manager, this new program changes the target computer to match the model computer when the model computer is the host of a workgroup and the target computer is one of the clients in the same workgroup. The following command is used in the present invention to cause the make program program to generate a program for the workgroup organized network manager to match the files of the target computer to the files found on the model computer. The usage is as follows:

make_prog -s label comp_model mp_file chmod_prog

Label is a label identifying one of the clients in a workgroup that refers to the client, which is the target computer. Comp_model is the output from the compare model program. Mp_file is the program generated by the make program for the workgroup organized network manager, which will change the files on the target computer to match those files found on the model computer. Chmod_prog is a UNIX program that will be run by the execute command used by the workgroup organized network manager on the target computer.

Figure 20:
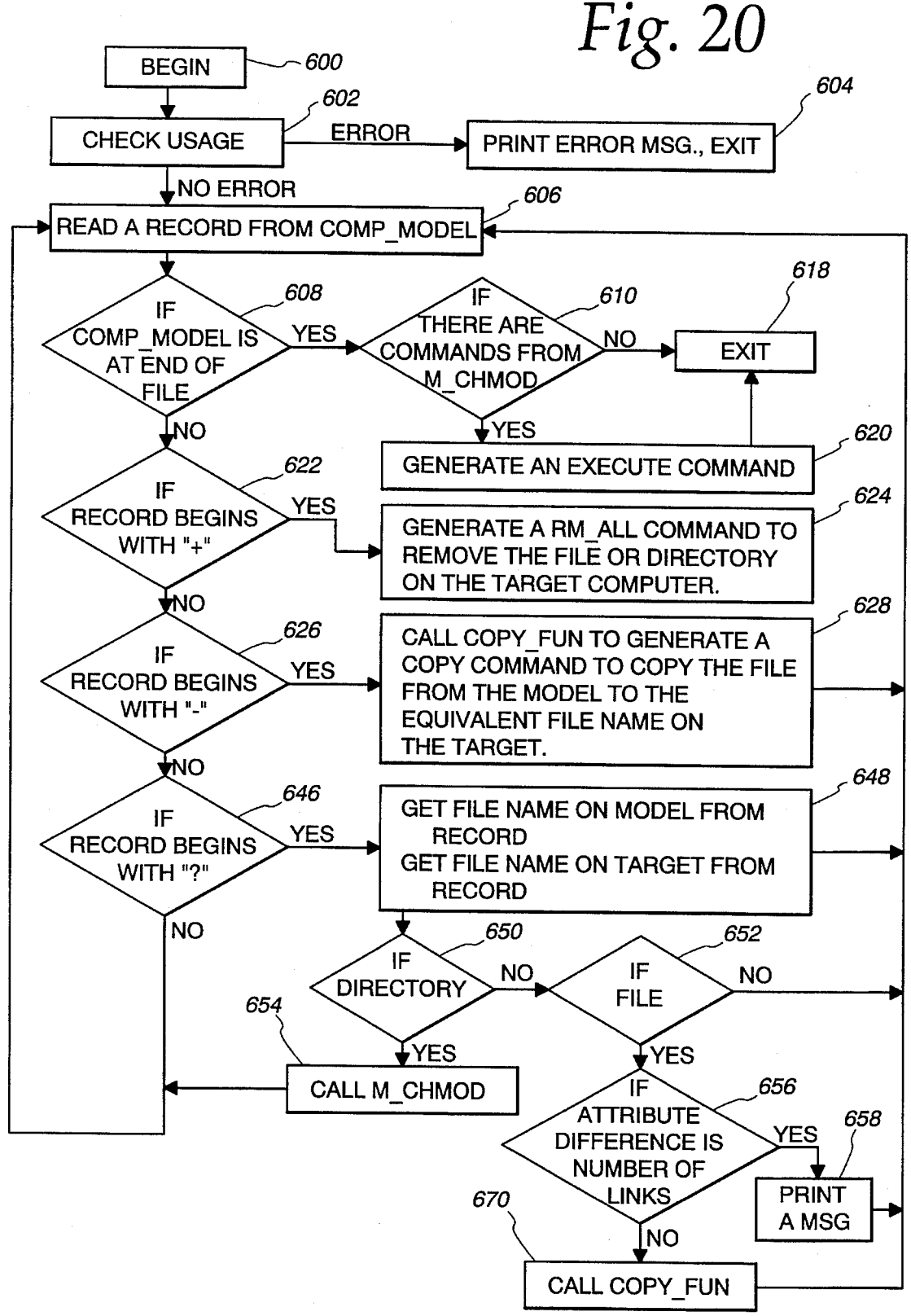
FIG. 20 is a flow diagram of a make program program.

The program make program begins at step 600 of FIG. 20. At step 602, the usage of the command used to run the program make program is checked. If there is an error, at step 604, an error message is printed and the program exits. If, however, there is no error, at step 606, a record is read from the output of the compare model program. Initially, the make program determines whether or not the compare model program output is at the end of file at step 608. If the output is at the end of file, then at step 610 a check is made to determine if there are commands from a subroutine called the change mode subroutine (m_chmod). The change mode program generates a UNIX program that changes the owner, the group, and the mode of a file or directory. This program is executed by the execute command, as previously described. The change mode program gets the name of the file or directory, the owner, the group, and the mode from the calling program.

Figure 21:
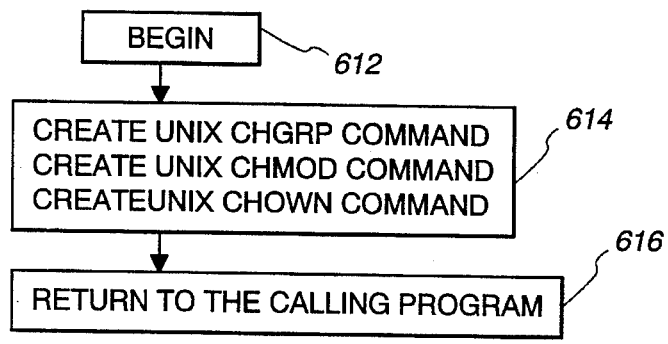
FIG. 21 is a flow diagram of a change mode subroutine.

As seen in FIG. 21, the change mode subroutine begins at step 612. At step 614, a UNIX change group (chgrp) command is created. Additionally, a UNIX change mode (chmod) command is created, and a UNIX change owner (chown) command is created. Once these commands have been created by the change mode subroutine at step 616, the subroutine returns to the calling program. If it is determined at step 610 that there are no commands from the change mode subroutine, then the program exits at step 618. If, however, there are commands from the change mode program, at step 620, an execute command is created, and then at step 618, the program exits. If it is determined at step 608 that the compare model program output is not at the end of the file, then it begins to check each individual record found in the output of the compare model program, to determine whether it is an extra file, a missing file, or a file wth equivalent names on the model and target, but differences in attributes on the model and target.

As previously described, the output listing of the compare model program indicates that files are extra by placing a plus size in front of the file name. Therefore, at step 622, the record is checked to determine whether or not a plus sign exists, indicating that this is an extra file. If it is an extra file, then at step 624, a remove all command is generated to remove the file or directory on the target computer. Once the remove all command is generated, the program returns to step 606, to read a record from the output of the compare model program, and the sequence of checking records begins again. If, however, at step 622, it is determined that the record does not begin with a plus sign, then at step 626, a check is made to determine if the record is a record which does not appear on the target workstation. This is done by checking to see whether or not the record begins with a negative sign. If the record does begin with a negative sign, at step 628, the make program routine calls a copy function (copy_fun) subroutine, to generate a copy command which will copy the file from the model computer to the equivalent file name on the target computer.

Figure 22:
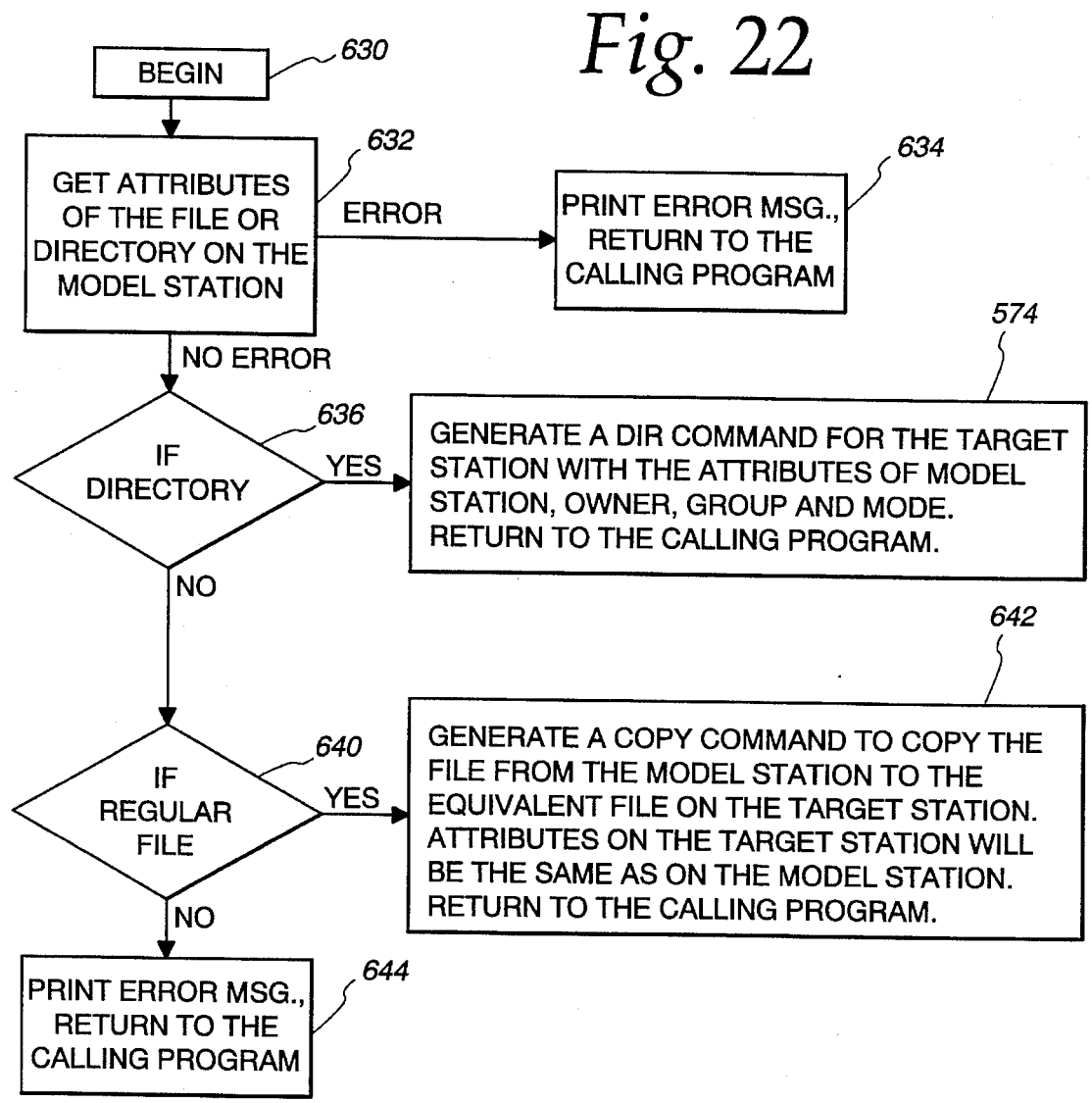
FIG. 22 is a flow diagram of a copy function subroutine.

The copy function subroutine is illustrated in FIG. 22, where the subroutine begins at step 630. At step 632, the attributes of the file or directory contained on the model workstation are retrieved. If there is an error at this time, at step 634, an error message is printed and the subroutine returns to the calling program. If, however, no error occurs, a check is made to determine whether or not the retrieved attributes are for a file, or for a directory. If it is a directory, at step 638, a workgroup organized network manager directory (dir) command is created for the target station, with the attributes of the model workstation, which includes the owner, group, and mode. Once the directory command has been completed, the program returns to the calling program. If it is determined, at step 636, that it is not a directory, then at step 640 a check is made to determine if it is a regular file. If it is a regular file, then the workgroup organized network manager generates a copy command to copy this particular file from the model workstation to the equivalent file on the target workstation. Attributes on the target workstation will now be the same as on the model workstation. Once the copy command has been generated, the subroutine returns to the calling program. As seen at step 642, if it is determined that it is neither a directory or a regular file, an error message is printed at step 644, and the subroutine returns to the calling program. Once returning to the calling program, at step 628, step 606 is repeated to read a new record from the output of the compare model program, to examine the next record in the list.

If it has been determined, at step 626, that the record does not begin with a negative sign, then at step 646, a check is made to determine if the record begins with a question mark. If the record does begin with a question mark, at step 648, the file name for the model workstation and the file name for the target workstation are retrieved. At step 650, a check is made to determine if the file name is a directory. If it is not a directory, it is checked at step 652, to determine if it is a file name. If it is not a file name, the program returns to step 606, to read a new record. If it is determined, at step 650, that it is a directory, then the change mode subroutine illustrated in FIG. 21 is called, the functions are performed there as previously described, and once the change mode program returns to the calling program, the program returns to step 606, to read a new record. If it is not a directory but it is determined that it is a file, then at step 656 a check is made to determine if the attribute difference is in the number of links. If the attribute difference is in the number of links, then at step 658 a message is printed, indicating the difference. Once the message is printed at step 658, the program returns to step 606, to read a new record. If, however, it is determined that the attribute difference is not in the number of links at step 656, then at step 670 the copy function subroutine illustrated in FIG. 22, is called and operates as previously described. Once the copy function subroutine has either printed an error message, generated a directory command, or generated a copy command, the copy function subroutine returns to the calling program, at step 606, to read a new record. The process of reading records and checking records to determine their existence on the target workstation, as compared with the model workstation, continues until it is determined that no more records exist, at step 608, at which point the program exits, at step 618.

The foregoing description of the invention has been presented for purposes of illustration and description. The workgroup organized network manager with file maintenance system has been described in combination with regards to a few possible applications of the invention to illustrate the operation thereof. This description is not intended to limit the invention to the precise forms disclosed, however. Consequently, many modifications and variations are possible in light of the above teachings by those skilled in the art as expressed in the specification and the appended claims.

PROGRAM LISTING

The listings that follow constitute the programming for the Workstation Comparision System described in the specification and shown in FIGS. 13 through 22. The program listings for the Workgroup Organized Network Manager appear in copending application Ser. No. 07/898,191 in a microfiche appendix. To the greatest extent possible, these program listings correspond to the flowcharts presented. However, to ensure that the best mode of the invention is set forth here, the very latest versions of the programs are presented below, and these may differ in some detail from flowcharts just described. These 20 programs are written in C programming language or the programming language and are currently used on the UNIX system.

```
000001 #-----------------------------------------------
000002 #
000003 # File: /usr/mstro_pat2/comp_mod_pg.c
000004 #
000005 #-----------------------------------------------
000006
000007 /* check_in file1 file2 file3 is a program that checks
          one machine
000008    against an inventory from another machine.  file1 is a
          sorted file
000009    from dirwalk on the target machine.  file1 and f2 nd
          f3 are derived from
000010    the inventory program.
000011 */
000012
000013 /* COMPILE WITH cc comp_mod_pg.c -l PW -o comp_mod_pg   */
000014
000015
000016 /*#define PATH_MAX 256*/
000017
000018 int comp_reg();
000019 char *sub_reg();
000020 char *regcmp();
000021 char *regex();
000022 int getopt();
000023
000024 typedef struct {
000025   long size;
000026   long sum;
000027 /*  int device; part of record but not used */
000028 /*  int inode;  part of record but not used */
000029   char *name;
000030 } CHECKSUM;
000031
000032 typedef struct{
000033   unsigned device;
000034   unsigned inode;
000035   char type;
000036   int mode;
000037   short nlinks;
000038   char owner[PASS_MAX+1];
000039   char group[PASS_MAX+1];
000040   long size;
000041   time_t time;
000042   long sum;
000043   char path[PATH_MAX+1];
000044 } STATUS;
000045
000046   typedef struct {
000047   int n_type; /* number of type differences */
```

```
000048    int n_mode; /* number of mode differences */
000049    int n_links; /* number of link differences */
000050    int n_owner; /* number of owner differences */
000051    int n_group; /* number of group differences */
000052    int n_file; /* number of file differences, size or
          checksum */
000053    }ERRORS;
000054
000055    CHECKSUM *read_sums();
000056    /* int split(); */
000057    int read_stat();
000058    int stat_comp();
000059    void print_stat();
000060    void find_match();
000061    int s_compare();
000062    void out_stat();
000063
000064
000065    typedef struct  {
000066                            char *comp_exp;
000067                            char *replace;
000068                    } REG;
000069    REG exp[MAX_EXP];
000070    int  num_reg=0;
000071
000072
000073    main(argc, argv)
000074    int argc;
000075    char *argv[];
000076
000077    {
000078     FILE *f1, *f2, *f3; /* file pointers to file1 file2
           file3 */
000079     FILE *f_reg;  /* File of regular expressions and
           replacement strings */
000080     CHECKSUM *c_file;
000081     STATUS f1_stat, f2_stat;
000082     ERRORS e;
000083
000084     FILE *mf; /* file containing names of files missing from
           target */
000085     FILE *pf; /* file containing names of files extra on
           target */
000086     FILE *nf; /* file of paths that match but attributes
           don't */
000087
000088
000089
000090     int n_m=0; /* n_m number of files missing from from
           target */
```

```
000091  int n_p=0; /* number of files extra on target */
000092  int n_n=0; /* number of files whose names match but
             attributes don't */
000093  int n_e=0; /* number of files that are equal */
000094  unsigned n_sums; /* number checksum records read in
             (from source)*/
000095  int position; /* indicates relative position of file1
             and file2 */
000096  int f1_pos; /* if read_stat does not find a record it
             return EOF */
000097  int f2_pos; /* f1_pos and f2_pos are the return values
             from read_stat */
000098
000099
000100  char msg[LINE_LEN];
000101  /* char *station; */
000102  int search;
000103          char f1_tmp[PATH_MAX+1], f2_tmp[PATH_MAX+1];
000104
000105  /* external variables for regular expression comparison
          */
000106
000107          extern char *optarg;
000108          extern int optind;
000109
000110  /* local variables for regular expression comparison*/
000111          REG *pexp;
000112          char replace[PATH_MAX+1], reg_exp[PATH_MAX+1];
000113          int opt_c;
000114
000115  char *Usage="Usage:comp_model -r reg_file -s sumfile
             target source";
000116
000117  e.n_type=0;
000118  e.n_mode=0;
000119  e.n_links=0;
000120  e.n_owner=0;
000121  e.n_group=0;
000122  e.n_file=0;
000123
000124
000125  /* parse the input parameters */
000126          search=0;
000127          while ((opt_c=getopt(argc,argv,"s:r:")) != EOF)
000128              switch (opt_c){
000129              case 'r':
000130                  if((f_reg=fopen(optarg,"r")) == NULL){
000131                      perror(optarg);
000132                      exit(1);
000133                  }else{              /* READ IN REGULAR
```

```
                EXPRESSIONS */
000134
        for(num_reg=0,pexp=exp;fscanf(f_reg,"%s%s",reg_exp,repla
        ce)
000135                          !=EOF && num_reg < MAX_EXP; ){
000136
        if((pexp->comp_exp=regcmp(reg_exp,(char *)0)) !=
000137                          (char *)NULL){
000138                             pexp->replace=
000139                                strcpy((char
        *)malloc(strlen(replace)+1),replace);
000140                                num_reg++;
000141                                pexp++;
000142                          }else{
000143                                fprintf(stderr,"%s can not
        be compiledn",reg_exp);
000144                                exit(1);
000145                          }
000146                      }
000147                  }
000148                  break;
000149       case 's':
000150       search=1;
000151       f3=fopen(optarg,"r");
000152       if(f3 == NULL){
000153         fprintf(stderr,"could not open %sn",optarg);
000154         exit(1);
000155       }
000156       c_file=read_sums(&n_sums,f3);
000157                  break;
000158              }
000159          if(optind + 2 != argc){
000160              fputs(Usage,stderr);
000161              exit(1);
000162          }
000163  /*
        station=strcpy(malloc(strlen(argv[optind])+1),argv[optin
        d]);
000164          optind++;
000165  */
000166   f1=fopen(argv[optind],"r");
000167   if(f1 == NULL){
000168    fprintf(stderr,"could not open %sn",argv[optind]);
000169              fputs(Usage,stderr);
000170    exit(1);
000171   }
000172          optind++;
000173   f2=fopen(argv[optind],"r");
000174   if(f2 == NULL){
000175    fprintf(stderr,"could not open %sn",argv[2]);
```

```
000176                fputs(Usage,stderr);
000177    exit(1);
000178  }
000179
000180
000181  nf=pf=mf=stdout;
000182
000183
000184
000185 /* f1_pos=split(f1,&f1_stat);*/
000186  f1_pos=read_stat(&f1_stat,f1);
000187
000188 /* f2_pos=split(f2,&f2_stat);*/
000189  f2_pos=read_stat(&f2_stat,f2);
000190
000191  while(f1_pos != EOF && f2_pos != EOF){
000192
        /*position=strncmp(f1_stat.path,f2_stat.path,PATH_MAX);*/
000193     position=comp_reg(&f1_stat,&f2_stat,f1_tmp,f2_tmp);
000194
000195    if(position < 0){  /* there are files on f1 not on f2 */
000196      fprintf(mf,"+ %s\n",f1_stat.path);
000197      /*out_stat(f3,&f1_stat,station);*/
000198      if(search)
000199        find_match(mf,&f1_stat,c_file,n_sums);
000200 /*   f1_pos=split(f1,&f1_stat); */
000201      f1_pos=read_stat(&f1_stat,f1);
000202      n_p++;
000203    }
000204    else if(position == 0){  /* files are equal */
000205      if(stat_comp(&f1_stat,&f2_stat,msg,&e) > 0 ){
000206
        if(strcmp(f1_stat.path,f2_stat.path) != 0)
000207                              fprintf(nf,"? %s
       %s%s",f1_stat.path,
000208                                          f2_stat.path,msg);
000209                          else
000210      fprintf(nf,"? %s%s",f1_stat.path,msg);
000211
000212      print_stat(nf,&f1_stat);
000213      print_stat(nf,&f2_stat);
000214      n_n++;
000215      }
000216      else{
000217        n_e++;
000218      }
000219 /*   f1_pos=split(f1,&f1_stat);
000220      f2_pos=split(f2,&f2_stat);
```

```
000221 */
000222    f1_pos=read_stat(&f1_stat,f1);
000223    f2_pos=read_stat(&f2_stat,f2);
000224   }
000225   else{   /* there are files on f2 not on f1 */
000226     fprintf(pf,"- %s %sn",f2_stat.path,f2_tmp);
000227 /*   f2_pos=split(f2,&f2_stat); */
000228    f2_pos=read_stat(&f2_stat,f2);
000229    n_m++;
000230   }
000231  }
000232  while(f1_pos != EOF){   /* flush record from f1 */
000233   fprintf(mf,"+ %sn",f1_stat.path);
000234   /*out_stat(f3,&f1_stat,station);*/
000235   if(search)
000236     find_match(mf,&f1_stat,c_file,n_sums);
000237 /*   f1_pos=split(f1,&f1_stat); */
000238   f1_pos=read_stat(&f1_stat,f1);
000239   n_p++;
000240  }
000241
000242  while(f2_pos != EOF){   /* flush records from f2 */
000243   fprintf(pf,"- %sn",f2_stat.path);
000244 /*   f2_pos=split(f2,&f2_stat); */
000245   f2_pos=read_stat(&f2_stat,f2);
000246   n_m++;
000247  }
000248
000249 /* printf("tNumber of files missing from target --------
         %dn",n_m);
000250  printf("tNumber of files extra on target ------------
         %dn",n_p);
000251  printf("tNumber of files equal ----------------------
         %dn",n_e);
000252  printf("tNumber of files attributes don't match
         %dn",n_n);
000253  printf("tNumber of type differences -----------------
         %dn",e.n_type);
000254  printf("tNumber of mode differences -----------------
         %dn",e.n_mode);
000255  printf("tNumber of link differences -----------------
         %dn",e.n_links);
000256  printf("tNumber of owner differences ----------------
         %dn",e.n_owner);
000257  printf("tNumber of group differences ----------------
         %dn",e.n_group);
000258  printf("tNumber of file differences -----------------
         %dn",e.n_file);
000259 */
000260 }
```

```
000261 /* ------------------- find_match ---------------- */
000262 void find_match(file,check,sums,nsums)
000263 FILE *file;
000264 STATUS *check;
000265 CHECKSUM *sums;
000266 unsigned nsums;
000267 {
000268   CHECKSUM *spot;
000269 /* is there any match? */
000270   spot=(CHECKSUM *)bsearch((char *)check,(char *)sums,
000271     nsums,sizeof(CHECKSUM),s_compare);
000272   if(spot){
000273     for(spot--;s_compare(check,spot) == 0;spot--)
000274       ;
000275     for(spot++;s_compare(check,spot) == 0 ;spot++)
000276       fprintf(file,"tmay be %s",(*spot).name);
000277   }
000278
000279 }
000280
000281 /* ------------------- s_compare ---------------- */
000282 int s_compare(stat,c_sum)
000283 CHECKSUM *c_sum;
000284 STATUS *stat;
000285
000286 {
000287   int diff;
000288
000289   if((diff=(*c_sum).size - (*stat).size) != 0)
000290     return diff;
000291   else
000292     return ((*c_sum).sum -(*stat).sum);
000293 }
000294
000295 /* ------------------- print_stat ---------------- */
000296 void print_stat(file,l)
000297
000298 FILE *file;
000299 STATUS *l;
000300
000301
000302 {
000303   char * file_time;
000304   char file_sum[SUM_L];
000305
000306 /* convert seconds since 1970 to date and time. drop the
           day */
000307   file_time=ctime((time_t *)&(*l).time) +4;
000308
000309   if((*l).sum > 0) /* if checksum = 0 print a blank */
```

```
000310      sprintf(file_sum,"%d",(*l).sum);
000311    else
000312      file_sum[0]='0';
000313
000314    fprintf(file,"     %c %4d %4hd %-8.8s %-8.8s %6ld %.*s
          %s\n",
000315      (*l).type,(*l).mode,(*l).nlinks,(*l).owner,(*l).group,
000316      (*l).size,strlen(file_time)-1,file_time,file_sum );
000317  }
000318
000319  /* ------------------- stat_comp ----------------- */
000320
000321  int stat_comp(stat1, stat2, msg,e)
000322
000323  STATUS *stat1, *stat2;
000324  char msg[];
000325  ERRORS *e;
000326
000327  {
000328
000329    int s_flag; /* 1 if sizes are equal 0 otherwise */
000330    int t_flag; /* 1 if times are equao 0 otherwise */
000331
000332    msg[0]='0'; /* null out msg */
000333
000334    if((*stat1).type != (*stat2).type){
000335      strcat(msg,"   type");
000336    }
000337    else{
000338      strcat(msg,"       ");
000339      if((*stat1).type == 'd'){
000340      if((*stat1).mode != (*stat2).mode){
000341        e->n_mode++;
000342        strcat(msg," mode");
000343      }else
000344        strcat(msg,"     ");
000345
000346      strcat(msg,"     ");
000347
000348      if(strncmp((*stat1).owner,(*stat2).owner,PASS_MAX) !=
          0)
000349  {
000350      e->n_owner++;
000351      strcat(msg,"    owner");
000352      }else
000353      strcat(msg,"         ");
000354
000355      if(strncmp((*stat1).group,(*stat2).group,PASS_MAX) !=
          0)
000356  {
```

```
000357          e->n_group++;
000358          strcat(msg,"    group");
000359        }else
000360          strcat(msg,"         ");
000361
000362      }
000363      else if ((*stat1).type == 'b' || (*stat1).type == 'c'){
000364        if((*stat1).mode != (*stat2).mode){
000365          e->n_mode++;
000366          strcat(msg," mode");
000367        }else
000368          strcat(msg,"     ");
000369
000370        if((*stat1).nlinks != (*stat2).nlinks){
000371          e->n_links++;
000372          strcat(msg," links");
000373        }else
000374          strcat(msg,"      ");
000375
000376        if(strncmp((*stat1).owner,(*stat2).owner,PASS_MAX) !=
      0)
000377  {
000378          e->n_owner++;
000379          strcat(msg,"    owner");
000380        }else
000381          strcat(msg,"         ");
000382
000383        if(strncmp((*stat1).group,(*stat2).group,PASS_MAX) !=
      0)
000384  {
000385          e->n_group++;
000386          strcat(msg,"    group");
000387        }else
000388          strcat(msg,"         ");
000389  /*
000390        if((*stat1).size != (*stat2).size){
000391          strcat(msg,"   device");     is this the proper
000392  name
000393        }
000394        else{
000395          strcat(msg,"         ");
000396        }
000397  */
000398
000399      }
000400      else{
000401        if((*stat1).mode != (*stat2).mode){
000402          e->n_mode++;
000403          strcat(msg," mode");
000404        }else
```

```
000405      strcat(msg,"         ");
000406
000407      if((*stat1).nlinks != (*stat2).nlinks){
000408       e->n_links++;
000409       strcat(msg," links");
000410      }else
000411       strcat(msg,"         ");
000412
000413      if(strncmp((*stat1).owner,(*stat2).owner,PASS_MAX) !=
       0)
000414  {
000415       e->n_owner++;
000416       strcat(msg,"   owner");
000417      }else
000418       strcat(msg,"         ");
000419
000420      if(strncmp((*stat1).group,(*stat2).group,PASS_MAX) !=
       0)
000421  {
000422       e->n_group++;
000423       strcat(msg,"   group");
000424      }else
000425       strcat(msg,"         ");
000426
000427      if((*stat1).size != (*stat2).size){
000428       strcat(msg,"    size");
000429       s_flag=0;
000430       e->n_file++;
000431      }
000432      else{
000433       strcat(msg,"         ");
000434       s_flag=1;
000435      }
000436
000437      if((*stat1).time != (*stat2).time){
000438       t_flag=0;
000439      }
000440      else
000441       t_flag=1;
000442       strcat(msg,"         ");
000443
000444      if((*stat1).sum != (*stat2).sum){
000445       strcat(msg,"            check");
000446
000447       if(s_flag == 1)
000448        e->n_file++;  /* count if not counted before
000449  */
000450       if(s_flag && t_flag)
000451        strcat(msg,"n FILE MAY BE CORRUPTED");
000452      }
```

```
000453    }
000454   }
000455   return(strlen(msg) - strspn(msg," "));
000456  }
000457  /* ----------- read_stat ------------- */
000458
000459  int read_stat(rec,file)
000460  STATUS *rec;
000461  FILE *file;
000462  {
000463   int stat;
000464   char line[MAX_LINE];
000465
000466
000467   if(fgets(line,MAX_LINE,file) == NULL)
000468    return EOF;
000469   stat=sscanf(line,"%u %u %c %d %hd %s %s %ld %ld %ld %s",
000470   &rec->device,&rec->inode,
000471
          &rec->type,&rec->mode,&rec->nlinks,rec->owner,rec->group, 000472   &rec->size,&rec->time,&rec->sum,rec->path);
000473   return stat;
000474  }
000475
000476
000477
000478  /* ------------------- read_sums ----------------*/
000479
000480  CHECKSUM *read_sums(num,file)
000481
000482  int *num;
000483  FILE *file;
000484
000485  {
000486
000487   int n;
000488   CHECKSUM *sums;
000489   char line[MAX_LINE];
000490   size_t length;
000491   STATUS rec;
000492
000493   for(n=0;fgets(line,MAX_LINE,file) != NULL;n++)
000494    ;
000495   rewind(file);
000496
000497   sums=(CHECKSUM *)calloc(n,sizeof(CHECKSUM));
000498   if(sums == NULL){
000499    fprintf(stderr,"not enough space for checksum datan");
000500    *num=0;
```

```
000501    return NULL;
000502  }
000503  for(n=0;read_stat(&rec,file) != EOF;n++){
000504    sums[n].size=rec.size;
000505    sums[n].sum=rec.sum;
000506    length=strlen(rec.path)+1;
000507    sums[n].name=strncpy(malloc(length),rec.path,length);
000508  }
000509
000510  *num=n;
000511  return sums;
000512 }
000513 /* ------------------ out_stat ------------------ */
000514 void out_stat(file,rec,station)
000515 FILE *file;
000516 STATUS *rec;
000517 char *station;
000518
000519 {
000520
000521   fprintf(file,"%u %u %c %d %hd %s %s %ld %ld %ld %s %sn",
000522     rec->device,rec->inode,rec->type,rec->mode,
000523     rec->nlinks,rec->owner,rec->group,rec->size,
000524     rec->time,rec->sum,rec->path,station);
000525
000526   return;
000527 }
000528 /* ------------------ comp_reg ------------ */
000529 /*   this routine compares two records that may contain
         regular expressions
000530       The regular expressions are replaced by a string for
         the purpose of
000531       the sort.
000532 */
000533 int comp_reg(r1,r2,tmp1,tmp2)
000534 STATUS *r1, *r2;
000535 char *tmp1, *tmp2;
000536
000537 {
000538 extern int num_reg;
000539
000540   if(num_reg){
000541     sub_reg(r1->path,tmp1);
000542     sub_reg(r2->path,tmp2);
000543     return(strcmp(tmp1,tmp2));
000544   }else
000545     return(strcmp(r1->path,r2->path));
000546 }
000547 /* ******************** sub_reg ****************** */
000548 char *sub_reg(rec,buf)
```

```
000549 char *rec;
000550 char *buf;
000551
000552 {
000553
000554 extern char *__loc1;
000555
000556 extern REG exp[];
000557 extern int num_reg;
000558
000559 int i;
000560 char *k;
000561 REG *ptr;
000562 char *next, *p_t;
000563 char tmp[PATH_MAX+1];
000564
000565     strcpy(buf,rec);
000566
000567     for(i=0,ptr=exp; i<num_reg; i++,ptr++){
000568         if((next=regex(ptr->comp_exp,buf)) != (char *)NULL){
000569             /* add initial string */
000570             for(k=buf, p_t=tmp; k < __loc1; k++,p_t++)
000571                 *p_t = *k;
000572
000573             /* add replacement string */
000574             for(k=ptr->replace; *k != NULL; k++,p_t++)
000575                 *p_t = *k;
000576
000577             /* Add anything that is left */
000578             for( ; *next != NULL && (p_t - tmp) < PATH_MAX; next++,p_t++)
000579                 *p_t = *next;
000580
000581             *(p_t)='0';
000582             strcpy(buf,tmp);
000583         }
000584     }
000585     return(buf);
000586 }
000587
000588 #----------------------------------------
000589 #
000590 # File: /usr/mstro_pat2/comp_model
000591 #
000592 #----------------------------------------
000593
000594 REG=
000595 USAGE="Usage: comp_model  -r reg_list target model"
000596
```

```
000597 set -- `getopt r: $*`
000598 if [ $? != 0 ]
000599 then
000600       echo ">$USAGE"
000601       exit 1
000602 fi
000603
000604 while [ $# != 0 ]
000605 do
000606
000607   case $1 in
000608
000609     -r) REG=$2
000610         if [ ! -f "$REG" -o ! -r "$REG" ]
000611                then
000612                    echo "Cannot access $REG" >&2
000613           exit 1
000614         fi
000615         shift 2;;
000616
000617     --) shift ; break;;
000618
000619     *) echo "$USAGE" >&2 ; exit 1 ;;
000620   esac
000621 done
000622
000623 if [ $# = 2 ]
000624 then
000625   TARGET=$1
000626   if [ ! -f "$TARGET" -o ! -r "$TARGET" ]
000627           then
000628         echo "Cannot access $TARGET" >&2
000629         exit 1
000630   fi
000631
000632   MODEL=$2
000633   if [ ! -r $MODEL -o ( ! -f "$MODEL" ) ]
000634           then
000635         echo "Cannot access $MODEL" >&2
000636         exit 1
000637   fi
000638 else
000639   echo "$USAGE" >&2
000640   exit 1
000641 fi
000642
000643
000644       for f in $TARGET $MODEL
000645       do
000646             if [ -n "$REG" ]
```

```
000647        then
000648                    out=/usr/tmp/$$.tmp
000649              /usr/Maestro/UTL/sort_reg $REG <$f >$out
000650                    mv $out $f
000651              else
000652    /bin/sort +10  -o $f $f
000653       fi
000654
000655    done
000656
000657    if [ -n "$REG" ]
000658    then
000659    REG="-r $REG"
000660       fi
000661
000662 cat $MODEL | awk '{print $8,$10,$11}' | sort -n +0 -2 -o
       ${MODEL}.s
000663
000664
000665 /usr/Maestro/UTL/comp_mod_pg $REG -s ${MODEL}.s $TARGET
       $MODEL
000666 #-------------------------------------------------
000667 #
000668 # File: /usr/mstro_pat2/comp_sta
000669 #
000670 #-------------------------------------------------
000671
000672 OPTION=
000673 REG=
000674 USAGE="Usage: comp_sta [-cmtogld] -r reg_list sta_list
       index_file"
000675 STA_LIST=
000676 export REG OPTION USAGE STA_LIST
000677
000678 set -- `getopt r:cmtogld $*`
000679 if [ $? != 0 ]
000680 then
000681    echo ">$USAGE"
000682    exit 1
000683 fi
000684
000685
000686 while [ $# != 0 ]
000687 do
000688
000689   case $1 in
000690    -c | -m | -t | -o | -g | -l | -d) OPTION="${OPTION} $1"
       ; shift;;
000691
000692    -r) REG=$2
```

```
000693          if [ ! -f "$REG" -o ! -r "$REG" ]
000694              then
000695           echo "Cannot access $REG"
000696           exit 1
000697          fi
000698          shift 2;;
000699
000700    --) shift ; break;;
000701
000702    *) echo "$USAGE" >&2 ; exit 1 ;;
000703   esac
000704 done
000705
000706 if [ $# = 2 ]
000707 then
000708   STA_LIST=$1
000709   if [ ! -f "$STA_LIST" -o ! -r "$STA_LIST" ]
000710          then
000711        echo "Cannot access $STA_LIST"
000712        exit 1
000713   fi
000714
000715   F_INDEX=$2
000716   if [ -w $F_INDEX -a  ! -f "$F_INDEX"  ]
000717          then
000718        echo "Cannot access $F_INDEX"
000719        exit 1
000720   fi
000721 else
000722   echo "$USAGE" >&2
000723   exit 1
000724 fi
000725
000726 num=0
000727   while read LINE
000728   do
000729      set --   $LINE
000730      if [ $# != 2 ]
000731      then
000732    echo "Error in line $num in $STA_LIST" >&2
000733      exit 1
000734      fi
000735            if [ -n "$REG" ]
000736      then
000737                  out=/usr/tmp/$$.tmp
000738              /usr/Maestro/UTL/sort_reg $REG <$2 >$out
000739                mv $out $2
000740                else
000741    /bin/sort +10  -o $2 $2
000742        fi
```

```
000743
000744   done < $STA_LIST
000745
000746   if [ -n "$REG" ]
000747   then
000748    REG="-r $REG"
000749   fi
000750
000751
000752 /usr/Maestro/UTL/comp_sta_pg $OPTION $REG $STA_LIST
          $F_INDEX
000753 #-------------------------------------------------
000754 #
000755 # File: /usr/mstro_pat2/comp_sta_pg.c
000756 #
000757 #-------------------------------------------------
000758 /* This program compares the files from many computers.
          The files are
000759   compared by name.  The comparison is from the right by
          name, not from
000760   the left.  The names are delimited by / es.
000761 */
000762
000763 /* COMPILE WITH acc comp_sta.c -1 PW -o comp_sta   */
000764
000765 /* Proceedure:
000766    1. Read a line, the line contains type, mode, links,
          owner,
000767      group, size, date, sum, path, computer.
000768    2. compare the name with the name in the last record.
000769      If the basenames are not the same, then no match.
000770      If the basenames are the same, then continue to match
000771      parts of the name untill end of the record or
000772      there is no match.  The more of the match, the more
000773      likelyhood that the records are the same.
000774
000775 */
000776 /* #include <stdlib.h>   not on Intergraph */
000777
000778
000779 int read_sort();
000780 int comp_reg();
000781 char *sub_reg();
000782 char *regcmp();
000783 char *regex();
000784 int getopt();
000785
000786 typedef struct{
000787                 unsigned device;
000788                 unsigned inode;
```

```
000789      char type;
000790      int mode;
000791      short nlinks;
000792      char owner[PASS_MAX+1];
000793      char group[PASS_MAX+1];
000794      long size;
000795      time_t time;
000796      long sum;
000797      char path[PATH_MAX+1];
000798 /*   char station[SYS_NMLN]; */
000799 } SORT;
000800
000801 typedef struct{
000802     char sta[SYS_NMLN];
000803     FILE *f_p;
000804     SORT s;
000805     int eof;
000806 } STATION;
000807
000808
000809
000810 typedef struct  {
000811                     char *comp_exp;
000812                     char *replace;
000813                 } REG;
000814 REG exp[MAX_EXP];
000815 int  num_reg=0;
000816
000817 char USAGE[] = "Usage: comp_sta -cmtogld -r reg_file
          sta_list index_filen";
000818
000819 main(argc,argv)
000820 int argc;
000821 char *argv[];
000822
000823 {
000824   STATION *c, *c_t;
000825   FILE *f_in, *f_err, *f_reg, *f_stat, *f_index;
000826        char f_time[26];
000827   char file_name[PATH_MAX];
000828   int i, j;
000829   int n;   /* n is station in file_name */
000830   int e;   /* e is the number of files not at EOF */
000831   int *match; /* is an array of the matching paths */
000832   int num;  /* num is the number of matching paths */
000833   int k;
000834   char *msg1;
000835   long *l_array;
000836   char c_array[FOPEN_MAX][PASS_MAX+1];
000837   int n_type, n_mode, n_nlinks, n_owner, n_group, n_size,
```

```
           n_time, n_sum;
000838 int l, m;
000839 int test;
000840 char line[MAX_LINE];
000841 long *d_error, *f_error, *sum_error; /* distribution of
           errors */
000842 long e_type, e_mode, e_owner, e_group, e_nlinks, e_size,
           e_time, e_sum;
000843 int err; /* this is flag set to zero for no errors, 1
           for an error */
000844         REG *pexp;
000845         char replace[PATH_MAX], reg_exp[PATH_MAX];
000846         int opt_c;
000847
000848         extern char *optarg;
000849         extern int optind;
000850
000851 /* flags that define the errors that cause output to
       f_err ( -e file) */
000852         int
       a_flag,c_flag,m_flag,t_flag,o_flag,g_flag,l_flag,d_flag;

000853         int e_flag; /* flag to show if a file for errs is
           defined. */
000854         int s_flag; /* flag to show if a file for
           statistics is defined */
000855
000856 /*
000857  STATION c[OPEN_MAX], *c_t;
000858  FILE *f_in;
000859  char file_name[PATH_MAX];
000860  int i, j;
000861  int n;    n is station in file_name
000862  int e;    e is the number of files not at EOF
000863  int match[OPEN_MAX];  is an array of the matching paths
000864  int num;  num is the number of matching paths
000865  int k;
000866  char msg1[OPEN_MAX*(SYS_NMLN+2)+10];
000867  long l_array[OPEN_MAX];
000868  char c_array[OPEN_MAX][PASS_MAX+1];
000869  int n_type, n_mode, n_nlinks, n_owner, n_group, n_size,
           n_time, n_sum;
000870  int l, m;
000871  int test;
000872  char line[MAX_LINE];
000873  long hist[OPEN_MAX], dhist[OPEN_MAX];   data on
           distribution of files and directories
000874  long d_error[OPEN_MAX], f_error[OPEN_MAX]; distribution
           of errors
000875  long sum_error[OPEN_MAX];
```

```
000876   long e_type, e_mode, e_owner, e_group, e_nlinks, e_size,
         e_time, e_sum;
000877   */
000878
         e_type=e_mode=e_owner=e_group=e_nlinks=e_size=e_time=e_su
         m=0;
000879
         a_flag=c_flag=m_flag=t_flag=o_flag=g_flag=l_flag=d_flag=
         e_flag=s_flag=0;
000880
000881
000882   /* parse the input parameters */
000883           a_flag=1; /* The default is all differences */
000884           while ((opt_c=getopt(argc,argv,"cmtogldr:")) !=
         EOF)
000885              switch (opt_c){
000886              case 'c':
000887                  c_flag = 1;  /* print files if content
         is different */
000888          a_flag = 0;
000889                  break;
000890              case 'm':
000891                  m_flag = 1;  /* print files if mode is
         different */
000892          a_flag = 0;
000893                  break;
000894              case 't':
000895                  t_flag = 1;  /* print files if type is
         different */
000896          a_flag = 0;
000897                  break;
000898              case 'o':
000899                  o_flag = 1;  /* print files if owner is
         different */
000900          a_flag = 0;
000901                  break;
000902              case 'g':
000903                  g_flag = 1;  /* print files if group is
         different */
000904          a_flag = 0;
000905                  break;
000906              case 'l':
000907                  l_flag = 1;  /* print files if number
         of links is different */
000908          a_flag = 0;
000909                  break;
000910              case 'd':
000911                  d_flag = 1;  /* print files if date is
         different */
000912          a_flag = 0;
```

```
000913                    break;
000914             case 'r':
000915                  if((f_reg=fopen(optarg,"r")) == NULL){
000916                       perror(optarg);
000917                       exit(1);
000918                  }else{                      /* READ IN REGULAR
        EXPRESSIONS */
000919
        for(num_reg=0,pexp=exp;fscanf(f_reg,"%s%s",reg_exp,repla
        ce)
000920                    !=EOF && num_reg < MAX_EXP; ){
000921
        if((pexp->comp_exp=regcmp(reg_exp,(char *)0)) !=
000922                             (char *)NULL){
000923                              pexp->replace=
000924                               strcpy((char
        *)malloc(strlen(replace)+1),replace);
000925                              num_reg++;
000926                              pexp++;
000927                         }else{
000928                              fprintf(stderr,"%s can not
        be compiledn",reg_exp);
000929                              exit(1);
000930                         }
000931                    }
000932                    fclose(f_reg);
000933                  }
000934                  break;
000935             default :
000936               fputs(USAGE,stderr);
000937                  exit(1);
000938             }
000939
000940
000941         if(optind == (argc-2)){ /* There should be
        one more argument */
000942           f_in=fopen(argv[optind],"r");
000943           if(f_in == NULL){
000944      perror(argv[optind]);
000945      exit(1);
000946         }
000947   optind++;
000948         }else{
000949            fputs(USAGE, stderr);
000950                 exit(1);
000951         }
000952
000953  /* OPEN THE FILES FOR EACH STATION */
000954
000955  for(n=0;fgets(line,MAX_LINE,f_in) != NULL; n++)
```

```
000956  ;
000957          if( n > (FOPEN_MAX-4) ){
000958                  fprintf(stderr,"The maximum number of stations
        that can be compared is %d",FOPEN_MAX-4);
000959                  exit(1);
000960          }
000961
000962  c=(STATION *)calloc(n,sizeof(STATION));
000963  match=(int *)calloc(n,sizeof(int));
000964  d_error=(long *)calloc(n,sizeof(long));
000965  f_error=(long *)calloc(n,sizeof(long));
000966  sum_error=(long *)calloc(n,sizeof(long));
000967  msg1=malloc(10 + n * (SYS_NMLN + 2));
000968  /* c_array=(char **)malloc(n*(PASS_MAX + 1)); */
000969  l_array=(long *)calloc(n,sizeof(long));
000970
000971  rewind(f_in);
000972
000973  for(c_t=c;fscanf(f_in,"%s %s",c_t->sta,file_name) !=
        EOF;c_t++){
000974   c_t->f_p=fopen(file_name,"r");
000975   if(c_t->f_p == NULL){
000976    perror(file_name);
000977    exit(1);
000978   }
000979   c_t->eof=read_sort(&c_t->s,c_t->f_p);
000980   if(c_t->eof == EOF){
000981    fprintf(stderr,"%s is emptyn",file_name);
000982    n--;
000983   }
000984  }
000985  fclose(f_in);
000986          if(n <= 1){
000987                  fputs("There must be data for at least two node
        to proceed",stderr);
000988                  exit(1);
000989          }
000990
000991  f_index=fopen(argv[optind],"w"); /* open the index file
        */
000992      if(f_index == NULL){
000993          perror(argv[optind]);
000994          exit(1);
000995      }
000996
000997  /* ALL THE FILES ARE OPEN AND ONE RECORD HAS BEEN READ */
000998  e=n;
000999
001000  while( e > 1 ){    /* e is the number of files not at EOF
        */
```

```
001001  err=0;
001002  for(i=0;c[i].eof == EOF; i++) /* find the first file
         with a record */
001003   ;
001004  for(j=i+1,num=0;j<n;j++){   /* find the min record. i is
         min record */
001005   if(c[j].eof !=EOF){
001006    test=comp_reg(&c[i].s,&c[j].s);
001007    if(test > 0){
001008     i=j;
001009     num=0;
001010    }else if(test == 0){
001011     match[num]=j;
001012                                         num++;
001013                               }
001014   }
001015  }
001016  if(num == 0){
001017   c[i].eof=read_sort(&c[i].s,c[i].f_p); /* read in next
         record */
001018   if(c[i].eof == EOF)
001019    e--;
001020   continue;  /* could print out record to another station
         file */
001021  }
001022 /* find number of types */
001023  for(k=0,n_type=1,c_array[0][0]=c[i].s.type; k < num;
         k++){
001024   for(l=0; l < n_type; l++){
001025    if(c[match[k]].s.type == c_array[l][0])
001026     break;
001027   }
001028   if(l == n_type){
001029    c_array[n_type][0]=c[match[k]].s.type;
001030    n_type++;
001031    err=1;
001032   }
001033  }
001034  e_type += (n_type -1);
001035 /* find number of modes */
001036  for(k=0,n_mode=1,l_array[0]=c[i].s.mode; k < num; k++){
001037   for(l=0; l < n_mode; l++){
001038    if(c[match[k]].s.mode == l_array[l])
001039     break;
001040   }
001041   if(l == n_mode){
001042    l_array[n_mode]=c[match[k]].s.mode;
001043    n_mode++;
001044    err=1;
001045   }
```

```
001046  }
001047  e_mode += n_mode - 1;
001048  /* find number of owner */
001049  for(k=0,n_owner=1,strcpy(c_array[0],c[i].s.owner); k <
        num; k++){    for(l=0; l < n_owner; l++){
001050    if(strcmp(c[match[k]].s.owner,c_array[l]) == 0)
001051      break;
001052  }
001053  if(l == n_owner){
001054    strcpy(c_array[n_owner],c[match[k]].s.owner);
001055    n_owner++;
001056    err=1;
001057  }
001058  }
001059  e_owner += n_owner - 1;
001060  /* find number of group */
001061  for(k=0,n_group=1,strcpy(c_array[0],c[i].s.group); k <
        num; k++){    for(l=0; l < n_group; l++){
001062    if(strcmp(c[match[k]].s.group,c_array[l]) == 0)
001063      break;
001064  }
001065  if(l == n_group){
001066    strcpy(c_array[n_group],c[match[k]].s.group);
001067    n_group++;
001068    err=1;
001069  }
001070  }
001071  e_group += n_group - 1;
001072  if(c[i].s.type == '-'){
001073  /* find number of links */
001074      for(k=0,n_nlinks=1,l_array[0]=c[i].s.nlinks; k <
        num; k++){
001075        for(l=0; l < n_nlinks; l++){
001076    if(c[match[k]].s.nlinks == l_array[l])
001077      break;
001078  }
001079  if(l == n_nlinks){
001080    l_array[n_nlinks]=c[match[k]].s.nlinks;
001081    n_nlinks++;
001082        err=1;
001083  }
001084      }
001085      e_nlinks += n_nlinks - 1;
001086  /* find number of sizes*/
001087      for(k=0,n_size=1,l_array[0]=c[i].s.size; k < num;
        k++){
001088  for(l=0; l < n_size; l++){
001089    if(c[match[k]].s.size == l_array[l])
001090      break;
001091  }
```

```
001092      if(l == n_size){
001093       l_array[n_size]=c[match[k]].s.size;
001094       n_size++;
001095           err=1;
001096      }
001097        }
001098        e_size += n_size - 1;
001099 /* find number of time */
001100        for(k=0,n_time=1,l_array[0]=c[i].s.time; k < num;
       k++){
001101      for(l=0; l < n_time; l++){
001102       if(c[match[k]].s.time == l_array[l])
001103        break;
001104      }
001105      if(l == n_time){
001106       l_array[n_time]=c[match[k]].s.time;
001107       n_time++;
001108      }
001109        }
001110        e_time += n_time - 1;
001111 /* find number of sum */
001112        for(k=0,n_sum=1,l_array[0]=c[i].s.sum; k < num;
       k++){
001113      for(l=0; l < n_sum; l++){
001114       if(c[match[k]].s.sum == l_array[l])
001115        break;
001116      }
001117      if(l == n_sum){
001118       l_array[n_sum]=c[match[k]].s.sum;
001119       n_sum++;
001120       err=1;
001121      }
001122        }
001123          }
001124        e_sum += n_sum - 1;
001125    if(err == 1){
001126
001127    if(c[i].s.type == '-'){
001128          f_error[num]++;  /* for a histogram of errors */
001129                 if(n_sum > 1 || n_size > 1)
001130           sum_error[num]++;
001131
001132        if(a_flag
001133                      || (c_flag && (n_sum >1 || n_size >
       1))
001134                      || (m_flag && (n_mode > 1))
001135                      || (t_flag && (n_type > 1))
001136                      || (o_flag && (n_owner > 1))
001137                      || (g_flag && (n_group > 1))
001138                      || (l_flag && (n_nlinks > 1))
```

```
001139                      || (d_flag && (n_time > 1))
001140                    ){
001141
        strncpy(f_time,ctime(&c[i].s.time),26);
001142                       f_time[24]='0';
001143 /*            fprintf(f_err,"%u %u %c %d %hd %s %s
       %ld %s %ld %s %sn",
001144                       c[i].s.device, c[i].s.inode,
001145  do not print device or inode*/
001146 /*            fprintf(f_err,"%4d %2hd %8s %8s %7ld %s
       %5ld %s %sn",*/
001147             printf("%4d %2hd %8s %8s %7ld %s %5ld %s
       %sn",
001148           c[i].s.mode,
001149                          c[i].s.nlinks,
001150                          c[i].s.owner,c[i].s.group,
001151           c[i].s.size,&f_time[4],
001152                   c[i].s.sum,c[i].s.path,
001153                   c[i].sta);
001154
        fprintf(f_index,"%sn",c[i].s.path); /* print the index
        */
001155                    for(k=0;k < num; k++){
001156                       strncpy(f_time,
001157     ctime(&c[match[k]].s.time),26);
001158                       f_time[24]='0';
001159 /*            fprintf(f_err,"%u %u %c %d %hd %s %s
       %ld %s %ld %s %sn",
001160                       c[match[k]].s.device,
       c[match[k]].s.inode,
001161  do not print device or inode*/
001162 /*            fprintf(f_err,"%4d %2hd %8s %8s %7ld %s
       %5ld %s %sn",*/
001163             printf("%4d %2hd %8s %8s %7ld %s %5ld %s
       %sn",
001164           c[match[k]].s.mode,
001165                          c[match[k]].s.nlinks,
001166
       c[match[k]].s.owner,c[match[k]].s.group,
001167           c[match[k]].s.size,&f_time[4],
001168
       c[match[k]].s.sum,c[match[k]].s.path,
001169                   c[match[k]].sta);
001170                    }
001171 /*              fputs("n",f_err); */
001172                    putchar('n');
001173                 }
001174
001175     }
001176    else
```

```
001177              d_error[num]++;
001178       /* num = 0 when a file is on one station */
001179     }
001180
001181
001182 /* read in new records for files containing the minimum
           path*/
001183     c[i].eof=read_sort(&c[i].s,c[i].f_p);
001184     if(c[i].eof == EOF)
001185      e--;
001186     for(k=0;k < num; k++){
001187
          c[match[k]].eof=read_sort(&c[match[k]].s,c[match[k]].f_p
          );
001188     if(c[match[k]].eof == EOF)
001189       e--;
001190    }
001191   }
001192
001193  }
001194
001195
001196 /* ------------ read_sort ------------- */
001197
001198 int read_sort(rec,file)
001199 SORT *rec;
001200 FILE *file;
001201 {
001202  int stat;
001203  char line[MAX_LINE];
001204
001205
001206  if(fgets(line,MAX_LINE,file) == NULL){
001207 /*  fprintf(stderr,"reached one end of filen");*/
001208    return EOF;
001209  }
001210  stat=sscanf(line,"%u %u %c %d %hd %s %s %ld %ld %ld %s",
001211                 &rec->device, &rec->inode,
001212
         &rec->type,&rec->mode,&rec->nlinks,rec->owner,rec->group
         ,
001213    &rec->size,&rec->time,&rec->sum,rec->path);
001214  if(stat != 11)
001215    fprintf(stderr,"%s does not contain 11 itemsn",line);
001216  return stat;
001217 }
001218
001219
001220 /* ------------------ comp_reg ------------ */
001221 /*   this routine compares two records that may contain
```

```
              regular expressions
001222           The regular expressions are replaced by a string for
              the purpose of
001223           the sort.
001224 */
001225 int comp_reg(r1,r2)
001226 SORT *r1, *r2;
001227
001228 {
001229     char tmp1[PATH_MAX], tmp2[PATH_MAX];
001230
001231     if(num_reg){
001232        sub_reg(r1->path,tmp1);
001233        sub_reg(r2->path,tmp2);
001234        return(strcmp(tmp1,tmp2));
001235     }else
001236        return(strcmp(r1->path,r2->path));
001237 }
001238 /* ******************** sub_reg ****************** */
001239 char *sub_reg(rec,buf)
001240 char *rec;
001241 char *buf;
001242
001243 {
001244
001245 extern char *__loc1;
001246
001247 extern REG exp[];
001248 extern int num_reg;
001249
001250 int i;
001251 char *k;
001252 REG *ptr;
001253 char *next, *p_t;
001254 char tmp[PATH_MAX];
001255
001256     strcpy(buf,rec);
001257
001258     for(i=0,ptr=exp; i<num_reg; i++,ptr++){
001259        if((next=regex(ptr->comp_exp,buf)) != (char
       *)NULL){
001260              /* add initial string */
001261           for(k=buf,p_t=tmp;k < __loc1; k++,p_t++)
001262              *p_t = *k;
001263
001264              /* add replacement string */
001265           for(k=ptr->replace; *k != NULL; k++,p_t++)
001266              *p_t = *k;
001267
001268              /* Add anything that is left */
```

```
001269              for( ; *next != NULL && (p_t - tmp) < PATH_MAX;
            next++,p_t++)
001270                  *p_t = *next;
001271
001272              *(p_t)='0';
001273              strcpy(buf,tmp);
001274          }
001275      }
001276      return(buf);
001277 }

001696 #----------------------------------------------
001697 #
001698 # File: /usr/mstro_pat2/make_prog
001699 #
001700 #----------------------------------------------
001701
001702
001703 copy_fun ()
```

```
001704 {
001705 set -- `ls -ld $FILE_H 2> /dev/null`
001706 if [ $? -ne 0 ]
001707 then
001708     echo "Can not access $FILE_H." >&2
001709     return 1
001710 fi
001711 prot=`echo $1 | cut -c2-`
001712
001713 case $1 in
001714     d*)
001715         echo dir -c $FILE_C -o $3 -g $4 -p $prot -s $s_opt
        -d ${DATE}.d${num}
001716         ;;
001717     -*)
001718 echo copy -h $FILE_H -c $FILE_C -o $3 -g $4 -p $prot -s
        $s_opt -d ${DATE}.c${num}
001719         ;;
001720     *)
001721         echo "$FILE_H is not a directory of regular
        file." >&2
001722         ;;
001723 esac
001724 return
001725
001726 }
001727
001728 m_chmod ()
001729 {
001730 set -- $LINEB
001731
001732 echo "chgrp $5 $FILE_C"
001733 echo "chmod $2 $FILE_C"
001734 echo "chown $4 $FILE_C"
001735 }
001736 USAGE="make_prog -s label comp_model_file mp_file
        chmod_prog"
001737 set -- `getopt s: $*`
001738
001739 if [ $? != 0 ]
001740 then
001741     echo $USAGE
001742     exit 2
001743 fi
001744 for i in $*
001745 do
001746     case $i in
001747
001748         -s) s_opt=$2; shift 2 ;;
001749
```

```
001750        --) shift; break;;
001751
001752     esac
001753 done
001754 if [ $# != 3 ]
001755 then
001756      echo $USAGE
001757      exit 1
001758 fi
001759
001760 comp_file=$1
001761 ex_file=$3
001762 case $2 in
001763    *.mp) prog_file=$2;;
001764    *) echo Maestro programs must be of the form file.mp
       >&2 ;;
001765 esac
001766
001767 > $prog_file
001768 > $ex_file
001769 num=0
001770 export num
001771 DATE="`/bin/date +%D-%T`"
001772
001773    while read LINE
001774    do
001775        case $LINE in
001776            +* )
001777                set -- $LINE
001778                FILE=$2
001779                #FILE=`echo $LINE | cut -d" " -f2`
001780                echo rm_all -c $FILE -s $s_opt -d
       ${DATE}.r${num} >>$prog_file
001781                num=`expr $num + 1`
001782                ;;
001783            -* )
001784                set -- $LINE
001785                FILE_H=$2
001786                if [ $# = 3 ]
001787                then
001788                    FILE_C=$3
001789                else
001790                    FILE_C=$FILE_H
001791                fi
001792                copy_fun $FILE_H $FILE_C >>$prog_file
001793                num=`expr $num + 1`
001794                ;;
001795            ?* )
001796                set -- $LINE
001797                FILE_C=$2
```

```
001798              read LINEA
001799              case $LINEA in
001800                  /*)
001801                      FILE_H=$LINEA
001802                      read LINEA
001803                      ;;
001804                  *)
001805                      FILE_H=$FILE_C
001806                      ;;
001807              esac
001808              read LINEB
001809              read LINEB
001810
001811              case "${LINEB}" in
001812                  -*)
001813                      set -- $LINEA
001814                      COPY=1
001815                      for PROB in $*
001816                      do
001817                          case $PROB in
001818                              links)
001819                                  echo "$FILE_H and $FILE_C are linked differently" >&2
001820                                  ;;
001821                              *)
001822                                  COPY=0
001823                                  ;;
001824                          esac
001825                      done
001826                      if [ $COPY = 0 ]
001827                      then
001828                          copy_fun $FILE_H $FILE_C >>$prog_file
001829                          num=`expr $num + 1`
001830                      fi
001831                      ;;
001832                  d*)
001833                      m_chmod >> $ex_file
001834                      ;;
001835              esac
001836              ;;
001837          esac
001838  done < $1
001839
001840
001841  if [ -s $ex_file ]
001842  then
001843      case $ex_file in
001844          /*)
001845              ;;
```

```
001846              *)
001847                  ex_file="`pwd`/$ex_file"
001848                  ;;
001849           esac
001850
001851           echo "execute -h $ex_file -l ksh -s $s_opt" -d
          ${DATE}.e${num} >>$prog_file
001852       fi
001853 #-----------------------------------------------------------
001854 #
001855 # File: /usr/mstro_pat2/sort_reg.c
001856 #
001857 #-----------------------------------------------------------
001858 /* program to sort and write a file by path.  The
          comparison of the
001859      path allows wildcard.  The matches for the wildcards
          are replaced
001860      with a string constant.  For example /usr[1-9]/
          might be replaced
001861      for sorting purposes with /usr/.
001862 */
001863
001864 /* Steps:
001865         1. Read the records in the file into an array.
001866
001867         2. Sort the array.
001868
001869         3. Write the array to a file.
001870 */
001871
001872 /* #include <stdlib.h> not on Intergraph */
001873
001874 /*  For power c
001875 */
001876
001877 typedef struct{
001878                     unsigned device;
001879                     unsigned inode;
001880                     char type;
001881                     int mode;
001882                     short nlinks;
001883                     char owner[PASS_MAX+1];
001884                     char group[PASS_MAX+1];
001885                     long size;
001886                     time_t time;
001887                     long sum;
001888                     char path[PATH_MAX+1];
001889 } STATUS;
001890
001891 typedef struct{
```

```
001892                  unsigned device;
001893                  unsigned inode;
001894                  char type;
001895                  int mode;
001896                  short nlinks;
001897                  char owner[PASS_MAX+1];
001898                  char group[PASS_MAX+1];
001899                  long size;
001900                  time_t time;
001901                  long sum;
001902                  char *path;
001903 } SORT;
001904
001905 typedef struct {
001906                   char *comp_exp;
001907                   char *replace;
001908                  } REG;
001909 REG exp[MAX_EXP];
001910 int  num_reg=0;
001911
001912 int comp_reg();
001913 int read_stat();
001914 void out_sort();
001915 char *calloc();
001916 char *sub_reg();
001917 char *regcmp();
001918 char *regex();
001919
001920 main(argc, argv)
001921 int argc;
001922 char *argv[];
001923
001924 {
001925
001926         FILE *f_in, *f_out, *f_reg;
001927         SORT *sort_a, *tmp_a;
001928         STATUS rec;
001929
001930         extern REG exp[];
001931
001932         int n, i ;
001933         char line[MAX_LINE];
001934         char *ptr;
001935         REG *pexp;
001936         char replace[PATH_MAX], reg_exp[PATH_MAX];
001937
001938         int rec_num, num_field;
001939
001940
001941         if(argc != 1 && argc !=2) {
```

```
001942              fputs("Usage: sort_reg (reg_file)n",stderr);
001943         exit(1);
001944         }
001945         f_in=stdin;
001946         f_out=stdout;
001947
001948         if(argc == 2)
001949                 if((f_reg=fopen(argv[1],"r")) == NULL){
001950                         perror(argv[1]);
001951                         exit(1);
001952                 }else{                       /* READ IN REGULAR EXPRESSIONS */
001953         for(num_reg=0,pexp=exp;fscanf(f_reg,"%s%s",reg_exp,replace)
001954                         !=EOF && num_reg < MAX_EXP; ){
001955         if((pexp->comp_exp=regcmp(reg_exp,(char *)0)) !=
001956                         (char *)NULL){
001957         pexp->replace=strcpy(malloc(strlen(replace)+1),replace);
001958                         num_reg++;
001959                         pexp++;
001960                 }else{
001961                         fprintf(stderr,"%s can not be compiledn",reg_exp);
001962                         exit(1);
001963                 }
001964                 }
001965                 }
001966
001967
001968 /* READ IN THE DATA */
001969         for(n=0;fgets(line,MAX_LINE,f_in) !=NULL;n++)
001970                 ;
001971         rewind(f_in);
001972
001973         sort_a=(SORT *)calloc(n,sizeof(SORT));
001974
001975         for(rec_num=1,tmp_a=sort_a;(num_field=read_stat(&rec,f_in)) != EOF;
001976                 rec_num++, tmp_a++){
001977                 if(num_field == NUM_SORT_FIELD){
001978                         tmp_a->device=rec.device;
001979                         tmp_a->inode=rec.inode;
001980                         tmp_a->type=rec.type;
001981                         tmp_a->mode=rec.mode;
001982                         tmp_a->nlinks=rec.nlinks;
```

```
001983          strncpy(tmp_a->owner,rec.owner,PASS_MAX+1);
001984          strncpy(tmp_a->group,rec.group,PASS_MAX+1);
001985                  tmp_a->size=rec.size;
001986                  tmp_a->time=rec.time;
001987                  tmp_a->sum=rec.sum;
001988          tmp_a->path=strcpy(malloc(strlen(rec.path)+1),rec.path);
001989              }else{
001990                  fprintf(stderr,"error in record %d\n",rec_num);
001991                  n--;
001992              }
001993          }
001994
001995          qsort(sort_a,n,sizeof(SORT),comp_reg);   /* sort the data */
001996
001997          for(i=0;i<n;i++)
001998                  out_sort(f_out,&sort_a[i]);
001999 }
002000
002001 /* ------------------ comp_reg ------------ */
002002 /*   this routine compares two records that may contain regular expressions
002003       The regular expressions are replaced by a string for the purpose of
002004       the sort.
002005 */
002006 int comp_reg(r1,r2)
002007 SORT *r1, *r2;
002008
002009 {
002010      char tmp1[PATH_MAX], tmp2[PATH_MAX];
002011
002012      sub_reg(r1->path,tmp1);
002013      sub_reg(r2->path,tmp2);
002014
002015
002016 return(strncmp(tmp1,tmp2,PATH_MAX));
002017 }
002018
002019 /* ----------- read_stat ------------- */
002020
002021 int read_stat(rec,file)
002022 STATUS *rec;
002023 FILE *file;
002024 {
```

```
002025              int stat;
002026              char line[MAX_LINE];
002027
002028
002029              if(fgets(line,MAX_LINE,file) == NULL)
002030                      return EOF;
002031              stat=sscanf(line,"%u %u %c %d %hd %s %s %ld %ld %ld %s",
002032          &rec->device,&rec->inode,
002033
        &rec->type,&rec->mode,&rec->nlinks,rec->owner,rec->group,
002034          &rec->size,&rec->time,&rec->sum,rec->path);
002035              return stat;
002036 }
002037 /* -------------- out_sort -------------------- */
002038 void out_sort(file,rec)
002039 FILE *file;
002040 SORT *rec;
002041
002042 {
002043
002044          fprintf(file,"%u %u %c %d %hd %s %s %ld %ld %ld %s\n",
002045                  rec->device, rec->inode,
        rec->type,rec->mode,
002046
        rec->nlinks,rec->owner,rec->group,rec->size,
002047                  rec->time,rec->sum,rec->path);
002048
002049          return;
002050 }
002051 /* ******************** sub_reg ****************** */
002052 char *sub_reg(rec,buf)
002053 char *rec;
002054 char *buf;
002055
002056 {
002057
002058 extern char *__loc1;
002059
002060 extern REG exp[];
002061 extern int num_reg;
002062
002063 int i;
002064 char *k;
002065 REG *ptr;
002066 char *next, *p_t;
002067 char tmp[PATH_MAX+1];
002068
```

```
002069      strcpy(buf,rec);
002070
002071      for(i=0,ptr=exp; i<num_reg; i++,ptr++){
002072          p_t=tmp;
002073          if((next=regex(ptr->comp_exp,buf)) != (char *)NULL){
002074              /* add initial string */
002075              for(k=buf;k < __loc1; k++,p_t++)
002076                  *p_t = *k;
002077
002078              /* add replacement string */
002079              for(k=ptr->replace; *k != NULL; k++,p_t++)
002080                  *p_t = *k;
002081
002082              /* Add anything that is left */
002083              if( next != NULL)
002084                  for( ; *next != '0' && (p_t - tmp) < PATH_MAX; next++,p_t++)
002085                      *p_t = *next;
002086
002087              *(p_t)='0';
002088              strncpy(buf,tmp,PATH_MAX);
002089          }
002090      }
002091      return(buf);
002092  }
```

What is claimed is:

1. A method of analyzing files located at a first land a second workstation to determine the differences between the first and second workstations, each file located at the first and second workstation having attributes identifying the characteristics of the files including the file name and other attributes, said method comprising:

at each workstation, and for each file on the workstation that is to be analyzed, computing a check value as an additional file attribute, the check value attribute for each file being computed from the entire file contents of each file, and being suitable for comparison use in determining whether a given file is identical in content to another file;

selecting a workstation to be a collection workstation;

retrieving said check value attributes of files located at the first workstation and storing the check value attributes on the collection workstation in a first workstation file attribute record;

retrieving said check value attributes of files located at the second workstation and storing the check value attributes on the collection workstation in a second workstation file attribute record;

comparing the file names and at least one check value attribute of each file in the first workstation file attribute record to the file names and the corresponding check value attribute in the second workstation file attribute record to determine if the same files exist at both workstations and whether the files located at the first and second workstation are different with respect to said check value attributes; and producing an exception report indicating the existence of differences between corresponding files on the two workstations.

2. The method of analyzing files located at a first and second workstation as recited in claim 1, said method further comprising the steps of:

modifying said exception report by eliminating the references to differences that are intentional and not to be corrected;

generating from the exception report so modified a set of commands designed to adjust the files on the second workstation to match those on the first workstation, thereby correcting the differences; and executing said commands to bring the files in the two workstations into substantial agreement with each other.

3. The method of analyzing files located at a first_and second workstation as recited in claim 2, said method further comprising the steps of:

substituting replacement file or file path names for the file or file path names found in at least one of said workstation file attribute records prior to said comparison step.

4. The method of analyzing files located at a first and a second workstation as recited in claim 2, said method further comprising the steps of:

determining which files are located at the first workstation and not at the second workstation based on said file name comparison step; and adding files determined to be located at the first workstation and not at the second workstation based on said determining step to the second workstation.

5. The method of analyzing files located at a first and a second workstation as recited in claim 2, said method further comprising the steps of:

determining which files are located at the second workstation and not at the first workstation based on said file name comparison step; and moving the files located at the second workstation and not at the first workstation from the second workstation.

6. The method of analyzing files as recited in claim 1, said method further comprising the steps of:

saving at least one of said workstation file attribute records as a record of the state of the corresponding workstation for use in later analysis of the workstations;

on at least one later date, once again generating workstation file attribute records for the workstations;

carrying out said comparison step by comparing the once again generated workstation file attribute records with the saved workstation file attribute records; and following each such comparison, generating an exception report indicating changes that have occurred to the files on the workstation over time.

7. A method of analyzing files in a computer network comprising a plurality of computer workstations to determine the differences between the workstations, each file located at the individual workstations having attributes identifying the characteristics of the files including the file name and other attributes, said method comprising:

at each workstation, and for each file on the workstation that is to be analyzed, computing a check value as an additional file attribute, the check value attribute for each file being computed from the entire file contents of each file, and being suitable for comparison use in determining whether a given file is identical in content to another file;

selecting a workstation to be a collection workstation;

retrieving said check value attributes of files located at the individual workstations and storing the check value attributes on the collection workstation in workstation file attribute records:

comparing the file names and at least one check value attribute of each file in each workstation file attribute record to those in the other workstation file attribute records to determine if the same files exist at all workstations and whether the files located at the individual workstations are different with respect to said at least one check value attribute; and producing an exception report indicating the existence of differences between corresponding files on the individual workstations.

8. The method of analyzing files as recited in claim 7, said method further comprising the steps of:

modifying said exception report by eliminating the references to differences that are intentional and not to be corrected;

generating from the exception report so modified a set of commands designed to adjust the files on the individual workstations to match those on the other workstations, thereby correcting the differences; and executing said commands to bring the files in the workstations into substantial agreement with each other.

9. The method of analyzing files as recited in claim 8, said method further comprising the steps of:

substituting replacement file of file path names for the file or file path names found in at least one of said workstation file attribute records prior to said comparison step.

10. The method of analyzing files as recited in claim 8, said method further comprising the steps of:

establishing a desired configuration which specifies what files are to be present on each workstation;

determining which files are located at any workstations and are not specified in the desired configuration based on said file name comparison step; and adding files determined to be located at many workstations and not at one or a few workstations based on said determining step to the one or a few workstations.

11. The method of analyzing files as recited in claim 8, said method further comprising the steps of:

establishing a desired configuration which specifies what files are to be present on each workstation;

determining which files are located at any workstations and are not specified in the desired configuration based on said file name comparison step; and removing the files located at one or a few workstation and not at many workstations from the one or a few workstations.

12. The method of analyzing files as recited in claim 7, said method further comprising the steps of:

saving at least one of said workstation file attribute records as a record of the state of the corresponding workstation for use in later analysis of the workstations;

on at lest one later date, once again generating workstation file attribute records for the workstations;

carrying out said comparison step by comparing the once again generated workstation file attribute records with the at least one saved workstation file attribute records; and following each such comparison generating an exception report indicating changes that have occurred to the files on the workstations over time.

13. A system for analyzing files located on plural workstations to determine any differences in such files, each file having attributes identifying characteristics including the file name and other attributes, said system comprising;

a first workstation having first files located thereon;

a second workstation having second files located thereon;

first means for computing a first set of check values as additional file attributes, at said first workstation for each file to be analyzed, the check value attributes being computed from the entire file contents of each of said files;

second means for computing a second set of check values as additional file attributes, at said second workstation for each file to be analyzed, the check value attributes being computed from the entire file contents of each of said files, said first and second check value attributes being suitable for comparison use in determining whether two of said files are identical in content;

a workstation selected as a collection workstation for retrieving said check value attributes of files located at the first workstation and storing the check value attributes on the collection workstation in a first workstation file attribute record, and for retrieving said check value attributes of files located at the second workstation and storing the check value attributes on the collection workstation in a second workstation file attribute record;

collection workstation means for comparing the file names and the check value attribute of each file in the first workstation file attribute record to the file names and the corresponding check value attribute in the second workstation file attribute record to determine if the same files exist at both workstations and whether the files located at the first and second workstation are different with respect to said check value attributes; and collection workstation means indicating the existence of differences between corresponding files on said first and second workstations for adjusting the files on the second workstation to match those on the first workstation, thereby correcting the differences to bring the files in said workstations into substantial agreement with each other.

14. A system for analyzing files located on plural workstations in accordance with claim 13, wherein said collection workstation comprises one of either said first workstation or said second workstation.

15. A system for analyzing files located on plural workstations in accordance with claim 13, wherein said collection workstation comprises a third workstation having third files located thereon.

\* \* \* \* \*

UNITED STATES PATENT AND TRADEMARK OFFICE
CERTIFICATE OF CORRECTION

PATENT NO. : 5,586,322
DATED : December 17, 1996
INVENTOR(S) : Robert E. BECK, et al.

It is certified that error appears in the above-indentified patent and that said Letters Patent is hereby corrected as shown below:

In Column 109, line 2, (Claim 1, line 1) change "land" to read --and--.

In Column 109, line 48 (Claim 3, line 1), change "first ___ and" to read --first and --.

In Column 110, line 4, (Claim 5, line 7) change "moving" to read --removing--.

In Column 110, line 37 (Claim 7, line 18) change the colon ":" to a semicolon --;--.

In Column 110, line 62, (Claim 9, line 3) change "of" to read --or--.

In Column 111, line 39, (Claim 13, line 4) change the semicolon ";" to a colon --:--.

Signed and Sealed this

Twenty-seventh Day of May, 1997

BRUCE LEHMAN

*Attest:*

*Attesting Officer*     *Commissioner of Patents and Trademarks*